(12) United States Patent
Asada

(10) Patent No.: US 6,885,809 B1
(45) Date of Patent: Apr. 26, 2005

(54) RECORDING APPARATUS THAT RECORDS A BROADCAST PROGRAM AND ID INFORMATION FOR A BROADCAST STATION ON A RECORDING MEDIUM, AND A PLAYBACK APPARATUS FOR RECORDED PROGRAMS

(75) Inventor: Shin Asada, Neyagawa (JP)

(73) Assignee: Matsushita Electric Industrial Co., Ltd., Osaka-Fu (JP)

( * ) Notice: Subject to any disclaimer, the term of this patent is extended or adjusted under 35 U.S.C. 154(b) by 707 days.

(21) Appl. No.: 09/679,621

(22) Filed: Oct. 5, 2000

(30) Foreign Application Priority Data

Oct. 5, 1999 (JP) .......................................... 11-284358
Jun. 26, 2000 (JP) ....................................... 2000-191205

(51) Int. Cl.[7] .............................. H04N 5/91; H04N 7/00
(52) U.S. Cl. ......................................... 386/46; 386/26
(58) Field of Search ............................... 346/46, 16, 23

(56) References Cited

U.S. PATENT DOCUMENTS

| | | | |
|---|---|---|---|
| 5,541,738 A | | 7/1996 | Mankovitz |
| 5,550,576 A | * | 8/1996 | Klosterman ..................... 348/6 |
| 5,661,526 A | | 8/1997 | Hamamoto et al. |
| 5,809,204 A | * | 9/1998 | Young et al. ................... 386/83 |
| 6,003,041 A | * | 12/1999 | Wugofski ..................... 707/104 |
| 6,466,735 B1 | * | 10/2002 | Kozuka et al. ............. 386/126 |
| 2003/0175011 A1 | * | 9/2003 | Nagai et al. ................... 386/52 |

FOREIGN PATENT DOCUMENTS

| | | | | |
|---|---|---|---|---|
| EP | WO9222983 | * | 12/1992 | .......... H04N/5/781 |
| EP | 0 725 542 | | 8/1996 | |
| EP | 0 763 938 | | 3/1997 | |
| EP | 0 773 682 | | 5/1997 | |
| EP | 0849954 A2 | * | 12/1997 | ............ H04N/5/00 |
| EP | 0967609 | | 12/1999 | |
| JP | 2000-57745 | | 2/2000 | |

* cited by examiner

*Primary Examiner*—Thai Tran
*Assistant Examiner*—Alicia M Duggins
(74) *Attorney, Agent, or Firm*—Wenderoth, Lind & Ponack, L.L.P.

(57) ABSTRACT

A recording apparatus includes a reception unit and a recording unit. The reception unit receives a broadcast signal, out of a plurality of broadcast signals that can be specified by conditions made up of broadcast frequencies and other items such as reception areas. The recording unit records the broadcast signal received by the reception unit and broadcast ID information that enables the broadcast signal to be identified out of a plurality of broadcast signals, onto a recording medium in an interrelated manner. A playback apparatus includes a reading unit, a display unit and a playback unit. The reading unit reads a program, which is a broadcast signal during a certain period, and at least part of broadcast ID information. The display unit displays at least part of the read broadcast ID information and the playback unit plays back the read program.

4 Claims, 32 Drawing Sheets fig. 7

| OPERATION CHANNEL | BROADCAST CHANNEL | |
|---|---|---|
| | BROADCAST FORMAT | BROADCAST CHANNEL NUMBER |
| 1 | TA | 2 |
| 2 | TA | 12 |
| 3 | BA | 7 |
| 4 | BA | 11 |
| 5 | TA | 6 |
| 6 | BA | 150 |
| 7 | CA | 16 | fig. 8

| SORT CODE | RECEPTION CONDITION |
|---|---|
| 0001 | HOKKAIDO |
| ⋮ | ⋮ |
| 0013 | TOKYO |
| ⋮ | ⋮ |
| 0027 | OSAKA |
| ⋮ | ⋮ |
| 0101 | XYZ CABLE TV |
| ⋮ | ⋮ |
| 1001 | DIRECTV SPORTS |
| 1002 | DIRECTV MUSIC |
| ⋮ | ⋮ | fig. 9

| RECEPTION CONDITION | BROADCAST CHANNEL | | BROADCAST STATION CODE | BROADCAST STATION NAME |
|---|---|---|---|---|
| | BROADCAST FORMAT | BROADCAST CHANNEL NUMBER | | |
| TOKYO | TA | 2 | 0x0001 | NHK GENERAL (TOKYO) |
| TOKYO | TA | 12 | 0x0002 | NHK EDUCATIONAL (TOKYO) |
| OSAKA | TA | 2 | 0x0011 | NHK GENERAL (OSAKA) |
| OSAKA | TA | 12 | 0x0012 | NHK EDUCATIONAL (OSAKA) |
| OSAKA | TA | 6 | 0x0015 | ABC |
| NATIONWIDE | BA | 7 | 0x0003 | NHK SATELLITE 1 |
| NATIONWIDE | BA | 11 | 0x0004 | NHK SATELLITE 2 |
| NATIONWIDE | BA | 150 | 0x0100 | WOWOW |
| XYZ CABLE TV | CA | 16 | 0x0100 | WOWOW | fig. 10

| ITEM | SIZE (BYTES) | EXAMPLE SETTING |
|---|---|---|
| IDCD | 1 | 0x90 |
| TXT_SZ | 1 | 0x23 |
| DATA APPLICATION ID | 9 | "dvdvrx010" |
| USE | 2 | "BC" |
| CHANNEL ID | 2 (VARIABLE) | "11" |
| BROADCAST STATION ID | 4 (VARIABLE) | "0004" |
| NAME | 11 (VARIABLE) | "NHK SATELLITE 2" |
| COUNTRY | 3 | "JPN" |
| BROADCAST FORMAT | 2 | "BA" |
| CHANNEL ID BYTE NUMBER | 1 | "2" |
| BROADCAST STATION BYTE NUMBER | 1 | "4" | fig. 12

| CLASSIFICATION | ITEM | SIZE (byte) | EXAMPLE SETTING |
|---|---|---|---|
| EXTERNAL APPLICATION AREA | DATA APPLICATION ID | 9 | "dvdvrx010" |
| INTERNAL APPLICATION AREA | COMPANY CODE | 9 | "panasonic" |
| | INTERNAL VERSION | 2 | "01" |
| | PRODUCT TYPE | 1 | "0" |
| | PUBLIC/COMMERCIAL USE | 1 | "0" |
| | SERIAL NUMBER | 10 | "0125967012" | fig. 17

| 1 | NHK GENERAL (TOKYO) | TA | 2ch |
|---|---|---|---|
| 2 | NHK EDUCATIONAL (OSAKA) | TA | 12ch |
| 3 | ABC | TA | 6ch |
| 4 | wowow | CA | 16ch |
| 5 | NHK SATELLITE 1 | BA | 7ch |

▽ fig. 19

| 1 | NHK GENERAL (TOKYO) | TA | 2ch |
|---|---|---|---|
| 2 | NHK EDUCATIONAL (OSAKA) | TA | 12ch |
| 3 | ABC | TA | 6ch |
| 4 | NHK SATELLITE 1 | BA | 7ch |
| 5 | NHK SATELLITE 2 | BA | 11ch |

▽ fig. 20

| RECEPTION CONDITION | BROADCAST CHANNEL | | BROADCAST ID INFORMATION | |
|---|---|---|---|---|
| | BROADCAST FORMAT | BROADCAST CHANNEL NUMBER | GROUP | VARIATION |
| TOKYO | TA | 2 | NHK | GENERAL TOKYO |
| TOKYO | TA | 12 | NHK | EDUCATIONAL TOKYO |
| OSAKA | TA | 2 | NHK | GENERAL OSAKA |
| OSAKA | TA | 12 | NHK | EDUCATIONAL OSAKA |
| OSAKA | TA | 6 | ABC | VHF |
| NATIONWIDE | BA | 7 | NHK | SATELLITE 1 |
| NATIONWIDE | BA | 11 | NHK | SATELLITE 2 |
| NATIONWIDE | BA | 150 | WOWOW | DIRECTV |
| XYZ CABLE TV | CA | 16 | WOWOW | XYZ CABLE TV | fig. 22

| BROADCAST ID INFORMATION | | BROADCAST CHANNEL | |
|---|---|---|---|
| GROUP | VARIATION | BROADCAST FORMAT | BROADCAST CHANNEL NUMBER |
| NHK | OSAKA GENERAL | TA | 2 |
| NHK | OSAKA EDUCATIONAL | TA | 12 |
| ABC | VHF | TA | 6 |
| NHK | SATELLITE 1 | BA | 7 |
| NHK | SATELLITE 2 | BA | 11 | fig. 27

| RECORDING MODE | AVERAGE BITRATE(Mbps) | ASCII | SJIS | ... |
|---|---|---|---|---|
| XP (HIGH QUALITY) | 10.08 | 'X' = 0x58 | 'X' = 0x58 | |
| SP (STANDARD PLAY) | 5.04 | 'S' = 0x53 | 'S' = 0x53 | |
| LP (EXTENDED PLAY) | 2.52 | 'L' = 0x4c | 'L' = 0x4c | |
| FR (FREE SETTING) | 2.52 ~ 10.08 | 'F' = 0x46 | 'F' = 0x46 | | fig. 28

| ITEM | SIZE(byte) | EXAMPLE SETTING |
|---|---|---|
| IDCD | 1 | 0x90 |
| TXT_SZ | 1 | 0x1b |
| DATA APPLICATION IDENTIFIER | 9 | "dvdvrx010" |
| USE | 2 | "BR" |
| TIME | 12 | "200001010000" |
| RECORDING MODE | 1 | 0x58('X') |
| BITRATE | 3 | 0x004e60 |

4501 4502 4503

RECORDING APPARATUS THAT RECORDS A BROADCAST PROGRAM AND ID INFORMATION FOR A BROADCAST STATION ON A RECORDING MEDIUM, AND A PLAYBACK APPARATUS FOR RECORDED PROGRAMS

This application is based on an application Nos. H11-284358 and 00.191205 filed in Japan, the contents of which ar hereby incorporated by reference.

BACKGROUND OF THE INVENTION (1) Field of the Invention

The present invention relates to a recording apparatus that records a broadcast program and to a playback apparatus that plays back a recorded program.

(2) Description of the Prior Art

Broadcast stations transmit television broadcasts using broadcast frequencies that are assigned by a government agency or the like. In Japan, for example, broadcast frequencies are assigned by the Ministry of Posts and Telecommunications.

The expression "television broadcast" here refers to when a broadcast station broadcasts a program on a specific frequency using a specific broadcast format. As examples, the broadcast format shows whether the broadcast is analog or digital, and whether the broadcast is being transmitted via terrestrial waves or via satellite broadcasting. In the following explanation, channel numbers that are exclusively assigned to specify broadcast frequencies are called "broadcast channel numbers", and combinations of a broadcast channel number and a broadcast format are called "broadcast channels".

When different broadcast frequencies are assigned, terrestrial television broadcasts that can be received within a given area may each be assigned a different broadcast channel number. However, to make effective use of the available frequencies, there are cases where different television broadcasts are assigned the same broadcast channel number in areas that are distant from one another.

This means that it is not always possible to identify a television broadcast and the broadcast station that made the broadcast from a broadcast channel number.

Many television sets and video recorders have a function that allows users to freely assign numbers to broadcast channel numbers. Users thereafter select which channel is to be received using these freely assigned numbers. This means that users tend to think of these numbers as being the same as broadcast channel numbers. Hereafter, these freely assigned numbers are referred to as "operation channel numbers".

When recording a broadcast program, some conventional analog video recorders record the operation channel numbers corresponding to the channel being received by the tuner onto the recording medium (here, video tape) used for recording the broadcast program. The operation channel number recorded in this way is then referred to during playback. Referring to the operation channel number in this way enables a variety of operations to be performed, such as displaying the operation channel number when playing back the program. Alternatively, the user can indicate an operation channel number to have the video recorder search for corresponding programs on the video tape.

However, the function of an analog video recorder that records an operation channel number on a recording medium has the following problems.

(1) When an analog video recorder has recorded the operation channel number used during recording onto a recording medium and the recording medium is then set in a different analog video recorder, the operation channel number given on the recording medium will be meaningless if the settings of the operation channel numbers are different in the two analog video recorders. As one example, suppose that A records a program onto a recording medium using his own analog video recorder and then gives the recording medium to B, who proceeds to play back the recorded program using his own analog video recorder. In this case, even if an operation channel number is displayed according to A's settings, B will not be able to know which television channel corresponds to this operation channel number.

(2) This problem also exists even if it is assumed that the operation channel number and the broadcast numbers have been set at the same numbers. Suppose that an analog video recorder present in a given area records a terrestrial television broadcast onto a recording medium along with an operation channel number, and that the recording medium is then set in an analog video recorder located in another area at some distance from the given area. When the broadcast is played back on this analog video recorder, there is the possibility of the recorded operation channel number being meaningless to the user of this second analog video reorder. This is because broadcast channel numbers are assigned to different television broadcasts in distant areas due to the need to make effective use of scarce broadcasting frequencies.

Even when it is further assumed that an analog video recorder is capable of recording a broadcast channel number corresponding to a broadcast frequency on a recording medium, there is still the possibility of the problem (2) described above occurring. This problem can occur even if the same analog video recorder with this function is used for recording and playback. If the user moves to a distant area and then plays back a recorded broadcast, the broadcast channel number used when the broadcast was recorded may differ from the broadcast channel number used in the new area. In this case, referring to a recorded broadcast channel number is invalid.

Overall, techniques that record an operation channel number or a broadcast channel number onto a recording medium when a program is recorded are capable of identifying the original television broadcast only under certain conditions. When the recording medium is used in a different area, when a recorded program is transferred on a network, when the user moves to a new house, or when the user changes the assignment of operation channel numbers, it is no longer possible to identify the original television broadcast or the broadcast station.

Since programs and broadcast channel numbers are conventionally recorded using analog methods, there are limits on the amount of information that can be recorded and a lack of compatibility between analog video recorders produced by makers that use different recording methods. Increasing use is expected for digital recording media, such as DVD-RAM (Digital Versatile Disc-Random Access memory) discs that have been developed with compatibility in mind for distribution and use over wide areas. Various kinds of information can be recorded on a digital recording medium, so that if a broadcast program is recorded onto a digital recording medium, playback can thereafter be performed on a variety of devices. This means that the recorded material may be distributed and used over a wider area that conventional media. This makes it more likely that the problems described above will occur, and heightens the demand for a solution that makes effective use of the large storage capacities of digital recording media.

SUMMARY OF THE INVENTION

The present invention was conceived in view of the above problems, and has a first object of providing a recording apparatus that records a program on a recording medium in such a way that a playback apparatus that plays back the recorded program is able to specify the television broadcast or broadcast station that provided the program out of a plurality of television broadcasts that cannot be specified by a channel number alone. The second object of the present invention is to provide a playback apparatus that plays back a program that has been recorded on a recording medium by the above recording apparatus.

It is a third object of the present invention to provide a recording apparatus that records a program and attribute information, including information that enables a television broadcast that supplied the program to be specified from a plurality of television broadcasts, onto a recording medium. It is a fourth object of the present invention to provide a playback apparatus that reads the attribute information recorded onto a recording medium by the above recording apparatus and plays back the program recorded on the recording medium.

It is a fifth object of the present invention to provide a data recording medium on which a program and information are recorded, the information enabling a television broadcast or broadcast station that provided the program to be specified out of a plurality of television broadcasts that cannot be identified by a channel number alone.

It is a sixth object of the present invention to provide a recording medium that records a program and attribute information for the program, the attribute information including information that enables a television broadcast or broadcast station that provided the program to be specified out of a plurality of television broadcasts.

The first object of the present invention is achieved by a recording apparatus, including: a reception unit for receiving one broadcast signal, out of a plurality of broadcast signals, each broadcast signal being specified using a condition, the condition including a broadcast frequency and at least one other item; and a recording unit for recording (1) the broadcast signal received by the reception unit, and (2) broadcast ID information that is based on a channel number and other information and enables the received broadcast signal to be identified out of the plurality of broadcast signals, on a recording medium in an interrelated manner.

With the stated construction, broadcast ID information is recorded on a recording medium so as to be related to a broadcast signal. An apparatus that reads data from the recording medium can therefore obtain broadcast ID information corresponding to the recorded program signal. The apparatus can then display the broadcast ID information on a screen to inform a user of the television broadcast corresponding to each broadcast signal recorded on the recording medium. Note that (1) the broadcast ID information referred to here is specified from a channel number and other information and (2) that a television broadcast can be identified out of a plurality of television broadcasts based on this broadcast ID information, the plurality of television broadcasts having such a range that it is not possible to specify a channel using a channel number alone. As one example, the broadcast ID information enables a television broadcast to be identified out of a group of television broadcasts made by different broadcast stations using the same broadcast channels in different areas.

Here, the broadcast ID information recorded by the recording unit may include broadcast station ID information that (a) enables a broadcast station that broadcast the interrelated broadcast signal to be identified out of a plurality of broadcast stations that broadcast the plurality of broadcast signals and (b) is specified based on the channel number and the other information.

With the stated construction, broadcast station ID information is recorded on a recording medium so as to be related to a broadcast signal. As a result, an apparatus that reads data from this recording medium can inform a user of the broadcast station that broadcast the broadcast signal recorded on the recording medium. Note that the broadcast station ID information is originally specified from a channel number and other information such as a reception area, so that based on this information, a broadcast station can be identified out of a group of broadcast stations, the group of broadcast stations having such a wide range that a broadcast station cannot be specified by a channel number alone. As one example, the group may include broadcast stations in a number of distant reception areas.

Here, each channel number may be a broadcast channel number corresponding to a single broadcast frequency, the recording apparatus may further include a broadcast channel number reception unit for receiving an input of a broadcast channel number from a user, and the reception unit may include a tuner and receives, via the tuner, a broadcast signal broadcast on a broadcast frequency corresponding to the broadcast channel number received by the broadcast channel number reception unit.

The recording apparatus may further include: a broadcast station correspondence table storage unit for storing a broadcast station correspondence table in which broadcast channel numbers and other information are associated with broadcast station ID information, wherein the recording unit may specify, based on the broadcast station correspondence table, broadcast station ID information from the broadcast channel number received by the broadcast channel number reception unit and the other information, and may record broadcast information including the specified broadcast station ID information on the recording medium in an interrelated manner with the broadcast signal received by the tuner.

As a result, if the user indicates a broadcast channel number, a broadcast signal transmitted using a broadcast frequency that corresponds to the broadcast channel number is received, and the broadcast signal is recorded onto a recording medium such as a DVD-RAM together with broadcast ID information, the broadcast ID information including broadcast station ID Information that is based on the broadcast channel number and other information such as a reception area.

Here, the other information may be area classification information that enables an area in which the reception unit is located to be distinguished from a plurality of other areas.

The broadcast ID information, which is recorded onto a recording medium such as a DVD-RAM in an interrelated manner with a broadcast signal, enables a television broadcast relating to a recorded broadcast signal to be identified from a plurality of television broadcasts, which is to say, from a plurality of broadcast signals that are transmitted on the same broadcast frequency in different reception areas.

Here, the recording unit may treat parts of the broadcast signal received by the reception unit during certain periods as programs, may specify broadcast station ID information separately for each program, and may record each program and corresponding broadcast ID information on the recording medium in an interrelated manner.

With the stated construction, broadcast ID information is recorded for each program on a recording medium. As a result, an apparatus that reads data from the recording medium and plays back programs can display separate broadcast ID information for each program and so inform a user of the broadcast station, etc. of each program.

Here, the recording unit may record the broadcast ID information of the program in an attribute area on the recording medium, the attribute area may be linked to an area on the recording medium in which the program corresponding to the broadcast ID information is recorded, and the recorded broadcast ID information may be paired with a data application ID showing an application format for data and may be recorded with a data construction that conforms with the application format shown by the data application ID.

With the stated construction, the broadcast ID information for each program is recorded onto the recording medium as a pair with a data application ID. As a result, the data construction and content of the broadcast ID information of each program can be read in accordance with the application format shown by the data application ID. A playback apparatus for programs recorded on a recording medium can therefore be restricted to reading and using the broadcast ID information only if data application ID has a special value that represents an application format with which the playback apparatus is compatible.

Here, the recording unit (1) may be capable of recording broadcast ID information with any of a plurality of data constructions that conform with a plurality of application formats, (2) may select an application format, out of the plurality of application formats, in accordance with a data application ID that is already recorded on the recording medium, and (3) may record the broadcast ID information with a data construction that conforms with the selected application format.

With the stated construction, when a program and related information has already been recorded on a recorded medium in a certain application format, a recording apparatus records broadcast ID information onto the recording medium with the same application format (which is to say, in accordance with the rules of this application format relating to data construction, the values used, etc.). As a result, when a program has been recorded onto a recording medium in a given application format by a certain program recording/playback apparatus, it is guaranteed that other programs and broadcast ID information are recorded onto the recording medium in accordance with this application format. As a result, the certain program recording/playback apparatus will also be able to read and display the broadcast ID information that has been additionally recorded.

Here, the recording unit may include an area classification information reception unit for receiving an input of area classification information from the user, and the recording unit may specify, based on the broadcast station correspondence table, broadcast station ID information from the area classification information received by the area classification information reception unit and the broadcast channel number, and may record broadcast ID information including the specified broadcast station ID information on the recording medium in an interrelated manner with the broadcast signal received by the tuner.

With the stated construction, broadcast ID information, such as a broadcast station name that is specified based on the reception area set by the user and the broadcast channel number indicated by the user, is recorded on a recording medium together with a program received as a broadcast. The recording apparatus does not need to store information relating to the reception area when shipped from the factory. When the recording apparatus is moved, due to the user moving to a new house, for example, the user can make the appropriate changes to the reception area and so have suitable broadcast ID information recorded a recording medium.

Here, the recording apparatus may further include: a broadcast station correspondence table obtaining unit for obtaining a broadcast station correspondence table from another apparatus via a communication path, and storing the obtained broadcast station correspondence table in the broadcast station correspondence table storage unit.

When a recording apparatus has the stated construction, the recording apparatus does not need to store (in advance) a broadcast station correspondence table for specifying a broadcast station from information showing the broadcast channel number and a reception condition such as a reception area. As a result, the broadcast station correspondence table in the recording apparatus can be updated, such as when new broadcast stations are established.

Here, the broadcast ID information may include a broadcast channel number as well as broadcast station ID information, and the recording unit may record broadcast ID information including the broadcast channel number received by the broadcast channel number reception unit on the recording medium in an interrelated manner with a broadcast signal that the tuner receives in accordance with the broadcast channel number.

With the stated construction, a reproduction apparatus for playing back programs that have been recorded on a DVD-RAM or the like can display broadcast ID information to inform the user of the broadcast stations that originally broadcast the programs on the DVD-RAM and the broadcast channel numbers.

Here, the recording unit may record the broadcast ID information as a pair with a data application ID showing an application format for data, the broadcast ID information being recorded with a data construction that conforms with the application format shown by the data application ID.

With the stated construction, the broadcast ID information is recorded on a recording medium together with a data application ID. This means apparatuses can read out the broadcast ID information in accordance with the application format shown by the data application ID.

Here, the recording medium may be removable, the recording unit may include a medium loading unit operable to load the recording medium, and the recording unit may record the broadcast signal received by the reception unit and the broadcast ID information in an interrelated manner on the recording medium loaded by the medium loading unit.

With the stated construction, broadcast ID information including information such as the source of a broadcast signal recorded on a recording medium, such as a DVD-RAM, for use over a wide area is provided. This broadcast ID information enables a reading apparatus to inform a user of this information. As a result, even when the recording apparatus and reading apparatus are located in distant areas, the reading apparatus will be able to properly inform the user of the source of a broadcast signal.

Here, the channel number may be an operation channel number that is used by the user when selecting a channel, the recording apparatus may further include: an operation channel number reception unit for receiving an input of an operation channel number by a user; and a channel correspondence table storage unit for storing a channel correspondence table that associates operation channel numbers with broadcast channel numbers that correspond to broadcast frequencies, the reception unit (1) including a tuner, (2) specifying, based on the channel correspondence table, a broadcast channel number corresponding to the operation channel number received by the operation channel number reception unit, and (3) receiving, via the tuner, a broadcast signal broadcast on a broadcast frequency corresponding to the specified broadcast channel number.

With the stated construction, if the user indicates an operation channel number, a broadcast signal corresponding to the operation channel number is received and recorded in an interrelated manner with broadcast ID information on a recording medium.

Here, the recording apparatus may further include a broadcast selection reception unit for presenting, to a user, broadcast ID information for the plurality of broadcast signals that can be received by the reception unit and receiving a selection of broadcast ID information for one broadcast signal from a user, the reception unit including a tuner, and receiving, via the tuner, a broadcast signal broadcast on a broadcast frequency determined based on the broadcast ID information of the selection received by the broadcast selection reception unit.

With the stated construction, the user can specify a broadcast channel on which a broadcast signal is to be received from sets of broadcast ID information without having to think about channel numbers, and so have the broadcast signal received and recorded onto a recording medium.

Here, the broadcast ID information may be broadcast having been multiplexed with the corresponding broadcast signal, the reception unit may include a separating unit for separating the broadcast ID information from the received broadcast signal, and the recording unit may record the broadcast signal received by the reception unit on the recording medium as a separate file that is interrelated with the broadcast ID information separated by the separating unit.

When broadcast ID information is multiplexed with a broadcast signal that is transmitted, the above construction can record the broadcast signal and broadcast ID information on a recording medium.

Here, the broadcast station ID information may include character string data showing a name of a broadcast station.

With the stated construction, a broadcast station name, which is character string data, is recorded on a recording medium so as to be related to a broadcast signal. A reading apparatus can read the broadcast station name and display it as it is. Such broadcast station names are easy to understand for the user and, unlike ID codes (such as numbers) for broadcast stations, can be displayed without needing to be converted.

Here, the channel number may be a broadcast channel number corresponding to a single broadcast frequency, the other information may be area classification information that enables an area in which the reception unit is located to be distinguished from a plurality of other areas, and the recording unit may records the broadcast signal received by the reception unit onto the recording medium in an interrelated manner with broadcast ID information composed of the area classification information and the broadcast channel number corresponding to a broadcasting frequency on which the broadcast signal is received.

As a result, a reading apparatus can read a recording medium and inform a user of the reception area and broadcast channel number.

Here, the recording medium may be a rewritable optical disc, and the recording unit may record data onto the recording medium in conformity with DVD Video Recording standard, may treat a part of the broadcast signal received by the reception unit during a certain period as a program, and may record the program and the broadcast ID information on the recording medium, the broadcast ID information being recorded into an IT_TXT area that is in a management information file on the optical disc and is linked to a recording area for the recorded program, and the broadcast ID information being recorded in accordance with a data application format that is shown by a data application ID recorded together with the broadcast ID information, in a text field that is appended with an IDCD value "0x90".

With the stated construction, a program and broadcast ID information for the program can be recorded on a rewritable optical disc without contradicting DVD Video Recording Standard. The broadcast ID information is recorded as a pair with a data application ID, so that when a playback apparatus that corresponds to this recording apparatus reads the broadcast ID information, the playback apparatus can check the data application ID and judge (1) whether broadcast ID information is recorded, and (2) in what application format the broadcast ID information has been recorded.

The second object of the present invention is achieved by a playback apparatus that plays back a program recorded on a recording medium, the recording medium storing a program and broadcast ID information for the program in an interrelated manner, a program being a part of a broadcast signal during a certain period, the broadcast ID information (1) identifying the broadcast signal, out of a plurality of broadcast signals that can be specified by a condition composed of a broadcast frequency and at least one other item, on which the program was received, and (2) being based on the broadcast frequency and other information, the playback apparatus including a reading unit for reading a program and at least part of the broadcast ID information related to the program; a display unit for displaying at least part of the broadcast ID information read by the reading unit; and a playback unit for playing back the program read by the reading unit.

With the stated construction, a user can be informed of broadcast ID information, such as the broadcast station name, for a program recorded on a recording medium such as a DVD-RAM. Note that the broadcast ID information is originally based on a broadcast frequency and other information, so that the broadcast ID information enables a television broadcast to be identified out of a plurality of television broadcasts with a range that is so wide that a television broadcast cannot be identified by a broadcast channel number corresponding to a broadcast frequency. As one example, this broadcast ID information enables a television broadcast to be identified out of a group of television broadcasts made by different broadcast stations using the same broadcast channels in different areas.

Here, the broadcast ID information may include broadcast station ID information that (a) identifies a broadcast station that broadcast a broadcast signal for the interrelated program on the recording medium out of a plurality of broadcast stations that broadcast the plurality of broadcast signals and (b) is specified based on a channel number and other information, the reading unit may read the broadcast station ID information from the recording medium, and the display unit may display the broadcast station ID information read by the reading unit.

As a result, a user can be informed of the broadcast station that transmitted a program recorded on a recording medium. This broadcast station can be identified out of a plurality of broadcast stations where identification using a broadcast frequency alone is not possible, such as when the plurality of broadcast stations includes broadcast stations from reception areas that are distant from one another.

Here, the recording medium may store a plurality of pairs, each composed of a program and corresponding piece of broadcast ID information, the reading unit may read a plurality of pieces of broadcast ID information from the recording medium, and the display unit may display the plurality of pieces of broadcast ID information read by the reading unit.

With the stated construction, a user can be informed of the broadcast station that broadcast each program recorded on a recording medium.

Here, the broadcast ID information for a program may be recorded on the recording medium (1) with a data application ID showing an application format for data as a pair, (2) in an attribute area that is linked to a recording area of the corresponding program, and (3) in a data format that conforms with the application format shown by the data application ID, and the reading unit may judge whether pieces of broadcast ID information on the recording medium are paired with a data application ID that matches a predetermined value, and may read the broadcast station ID information only from pieces of broadcast ID information that are paired with a matching data application ID.

The playback apparatus can judge whether broadcast ID in formation is recorded on the recording medium and can properly read and display broadcast ID information on the recording medium.

Here, in addition to broadcast station ID information, each set of broadcast ID information on the recording medium may include a broadcast channel number corresponding to a broadcast frequency on which the program corresponding to broadcast ID information was broadcast, the reading unit may read a broadcast station ID information and a broadcast channel number from a piece of broadcast ID information, and the display unit may display the broadcast station ID information and broadcast channel number read by the reading unit.

As a result, the playback apparatus can inform the user of the broadcast stations and broadcast channel numbers for programs recorded on a recording medium.

Here, the recording medium may be removable, the reading unit may include a medium loading unit operable to load the recording medium, and the reading unit may read the broadcast station ID information from the recording medium loaded by the medium loading unit.

As a result, the playback apparatus can provide a user with information for identifying a broadcast station, or the like, that is the source of a program recorded on a recording medium, such as a DVD-RAM, that is used over wide area. As a result, even when the recording apparatus and playback apparatus are located in distant areas, the playback apparatus can provide the user with information to enable the user to correctly identify the broadcast station that is the source of a recorded program.

Here, the broadcast station ID information may include character string data showing a name of a broadcast station, and the display unit may display the character string data.

As a result, the playback apparatus can display the character string data showing the name of a broadcast station without first converting it. No conversion table or the like is required, so that the construction of the playback apparatus is simplified.

Here, the recording medium may be a rewritable optical disc, the program and management information, including an IT_TXT area that is linked to an area in which the program is recorded on the optical disc, may be recorded in conformity with DVD Video Recording Standard, the broadcast ID information of the program may be recorded in an IT_TXT area in accordance with a data application format that is shown by a data application ID recorded together with the broadcast ID information, in a text field that is appended with an IDCD value "0x90", and the reading unit may judge whether a data application ID that is paired with the broadcast ID information, including the broadcast station ID information, matches a predetermined value, and may read the broadcast station ID information only when the data application ID matches the predetermined value.

A program and attribute information for the program are recorded on a rewritable optical disc in accordance with DVD Video Recording Standard. When this is the case, a playback apparatus checks whether broadcast ID information is included in the attribute information by looking at the data application ID. The playback apparatus can read the broadcast ID information in accordance with the application format shown by the data application ID and can inform the user of the read broadcast ID information.

Here, the management information may include a LAST_MNF_ID area, and the reading unit may judge whether a predetermined value is stored at a predetermined position in the LAST_MNF_ID area and may suppress reading of the broadcast station ID information when the predetermined value is not stored.

With the stated construction, when the last apparatus to record data onto the recording medium cannot record broadcast ID information in accordance with a given application format, the playback apparatus does not read the broadcast ID information. Accordingly, when there is the risk of the broadcast station ID information being corrupted, such corrupted broadcast station ID information is not read and displayed to the user, thereby avoiding the situations where data is not displayed properly.

Here, the playback apparatus may further include: a broadcast channel number receiving unit for receiving an input of a broadcast channel number corresponding to a broadcast frequency from a user; a receiving unit for receiving a broadcast signal broadcast on the broadcast frequency corresponding to the broadcast channel number received by the broadcast channel number receiving unit; and a broadcast station correspondence table storing unit for storing a broadcast station correspondence table that associates each broadcast channel number with broadcast station ID information for identifying a broadcast station that broadcasts a broadcast signal that can be received by the reception unit, the display unit searching for pieces of broadcast station ID information read by the reading unit in the broadcast station correspondence table and displaying a broadcast channel number corresponding to each piece of broadcast station ID information found in the broadcast station correspondence table.

With the stated construction, even if the information recorded on a recording medium does not include a broadcast channel number, the playback apparatus can still inform the user of the broadcast channel number for a recorded program.

Here, the playback apparatus may further include: an operation channel number reception unit for receiving an input of an operation channel number from a user; and a channel correspondence table storage unit for storing a channel correspondence table that associates each operation channel number with a broadcast channel number, wherein the receiving unit may specify, based on the channel correspondence table, a broadcast channel number corresponding to the operation channel number received by the operation channel number reception unit, and may receive a broadcast signal broadcast on a broadcast frequency corresponding to the specified broadcast channel number, and the display unit may convert, based on the channel correspondence table, the broadcast channel number corresponding to the broadcast ID information to an operation channel number and display the operation channel number.

As a result, a playback apparatus can calculate, from the broadcast ID information, an operation channel number for a program recorded on a recording medium and inform the user of the operation channel number. As a result, the broadcast ID information is presented to the user in the form of the operation channel numbers that the user usually uses.

Here, the playback apparatus may further include: a broadcast station correspondence table obtaining unit for obtaining the broadcast station correspondence table from another apparatus via a communication path, and storing the obtained broadcast station correspondence table in the broadcast station correspondence table storage unit.

As a result, there is no need for a playback apparatus to store a broadcast station correspondence table in advance. This means that the broadcast station correspondence table can be updated, and that the playback apparatus can properly cope with situations such as when broadcast stations are newly established.

The third object of the present invention is achieved by a recording apparatus, including: a reception unit for receiving a broadcast signal; a program recording unit for recording a program which is a part of a broadcast signal received by the reception unit during a certain period, on a recording medium; and a program attribute recording unit for recording program-related information, which is linked to an area in which the program is recorded, with a data construction that is defined by a predetermined standard, and recording attribute information, which shows attributes of the program and is not defined by the predetermined standard, in the program-related information with a data construction that conforms with an application format, the application format being shown by a data application ID that the program attribute recording unit records as a pair with the attribute information.

With the stated construction, attributes for a program can be recorded without contradicting a predetermined standard. These attributes have a content and a data construction that is in accordance with an application format shown by an application format ID. Information about broadcast signals can therefore be added as desired and recorded on a recording medium.

Here, the program recording unit may record the program onto the recording medium with a certain bitrate, and the program attribute recording unit may record recording mode information showing either the bitrate or a control method for determining the bitrate onto the recording medium as the attribute information showing the attributes of the program.

With the stated construction, a broadcast signal and recording mode information can be recorded on a recording medium in an interrelated manner without contradicting a predetermined standard. A playback apparatus that conforms to the predetermined standard can therefore play back the broadcast signal in accordance with the predetermined standard. A playback apparatus that is compatible with the recording mode information can read the recording mode information and inform the user of a recording mode showing the quality of the broadcast signal.

Here, the program attribute recording unit may record the data application ID in a last recording apparatus information area, the predetermined standard dictating that a recording apparatus that records data also records apparatus information in the last recording apparatus information area.

As a result, a playback apparatus for a recording medium can judge whether the last recording apparatus to access the recording medium is a recording apparatus that does not conform to an application format shown by a data application format. If the last recording apparatus to access the recording medium does not conform to this application format, there can be cases where the attribute information recorded as a pair with a data application ID is corrupted. Such cases can be detected by a playback apparatus, which then suppresses the use of the attribute information.

The fourth object of the present invention is achieved by a playback apparatus for playing back a program that is recorded on a recording medium, the recording medium storing (1) a program, (2) program-related information, which (a) is linked to an area in which the program is recorded, (b) has a data construction that is defined by a predetermined standard, and (c) includes attribute information, which shows attributes of the program and is not defined by the predetermined standard, the attribute information having a data construction that conforms with an application format, and the application format being shown by a data application ID that is recorded as a pair with the attribute information, the playback apparatus including a reading unit for reading the program and attribute information; a display unit for displaying the attribute information read by the reading unit; and a playback unit for playing back the program read by the reading unit.

With the stated construction, if attributes for a program that do not conform to a predetermined standard are recorded on a recording medium in an application format shown by a predetermined data application ID recorded as a pair with the attributes, the playback apparatus can inform the user of these attributes.

Here, the attribute information may be recording mode information showing either a bitrate used to record the program or a control method for determining the bitrate, and the display unit may display information showing the bitrate or control method used for the bitrate based on the recording mode information read by the reading unit.

As a result, the playback apparatus can inform a user of a recording mode that shows the quality of a broadcast signal but is not defined by a predetermined standard.

Here, the recording medium may include a last recording apparatus information area into which a recording apparatus that records data must, according to the predetermined standard, also record apparatus information, and the reading unit may judge whether the data application ID is recorded in the last recording apparatus information area, and may only read the attribute information on judging that the data application ID is recorded.

As a result, a playback apparatus for the recording medium can judge whether the last recording apparatus to access the recording medium is a recording apparatus that does not conform to an application format shown by a data application format. If the last recording apparatus to access the recording medium does not conform to this application format there can be cases where the attribute information recorded as a pair with a data application ID is corrupted. Such cases can be detected by a playback apparatus, which then suppresses the use of the attribute information.

The fifth object of the present invention is achieved by a data recording medium that records a program which is a part of a broadcast signal during a certain period, including: a program recording area in which a program is recorded; and a program attribute recording area, which is linked to the program recording area and in which broadcast ID information is recorded, the broadcast ID information enabling a broadcast signal for the program to be identified out of a plurality of broadcast signals that are specified by conditions composed of broadcast frequencies and at least one other item and the broadcast ID information being based on the broadcast frequency and other information.

With the stated construction, broadcast ID information is recorded in an interrelated manner with a program. The broadcast ID information enables the broadcast station (and the like) for the program to be identified. This means that a playback apparatus can inform a user of the broadcast station for a program. Note that since the broadcast ID information is related to the program, the broadcast ID information can also be deleted when a program is deleted.

The sixth object of the present invention is achieved by a data recording medium on which a program is recorded, including: a program recording area in which a program is recorded; and a program attribute recording area, which is linked to the program recording area and in which attribute information showing attributes of the program is recorded with a data construction that conforms with a data application format shown by a data application ID recorded with the attribute information as a pair.

Attributes of a program are stored in an area that is linked to a program. If the attributes are read in accordance with an application format shown by a data application ID recorded as a pair with the attributes, the attributes can be properly read from the recording medium and used.

BRIEF DESCRIPTION OF THE DRAWINGS

These and other objects, advantages and features of the invention will become apparent from the following description thereof taken in conjunction with the accompanying drawings which illustrate a specific embodiment of the invention. In the Drawings:

FIG. 7 shows the data construction and an example content of the channel correspondence table;

FIG. 8 shows several examples of the sort codes;

FIG. 9 shows the data construction and an example content of the broadcast ID table;

FIG. 10 shows the data construction and an example content of the broadcast ID information in the format in which it is recorded onto a DVD-RAM;

FIG. 12 shows the data construction and an example content of the last recording apparatus information recorded onto a DVD-RAM;

FIG. 17 shows an example display screen that is displayed by the playback program selection list display process;

FIG. 19 shows an example of the display screen shown when the program recording/playback apparatus of this first modification performs a reception operation;

FIG. 20 shows the data construction and an example content of the broadcast ID table in this second modification;

FIG. 22 shows the data construction and an example content of the broadcast ID information conversion table;

FIG. 27 shows the data construction and an example content of the recording mode table.

FIG. 28 shows the data construction and an example content of the recording mode information that is recorded on a DVD-RAM;

DESCRIPTION OF THE PREFERRED EMBODIMENT

Figure 1:
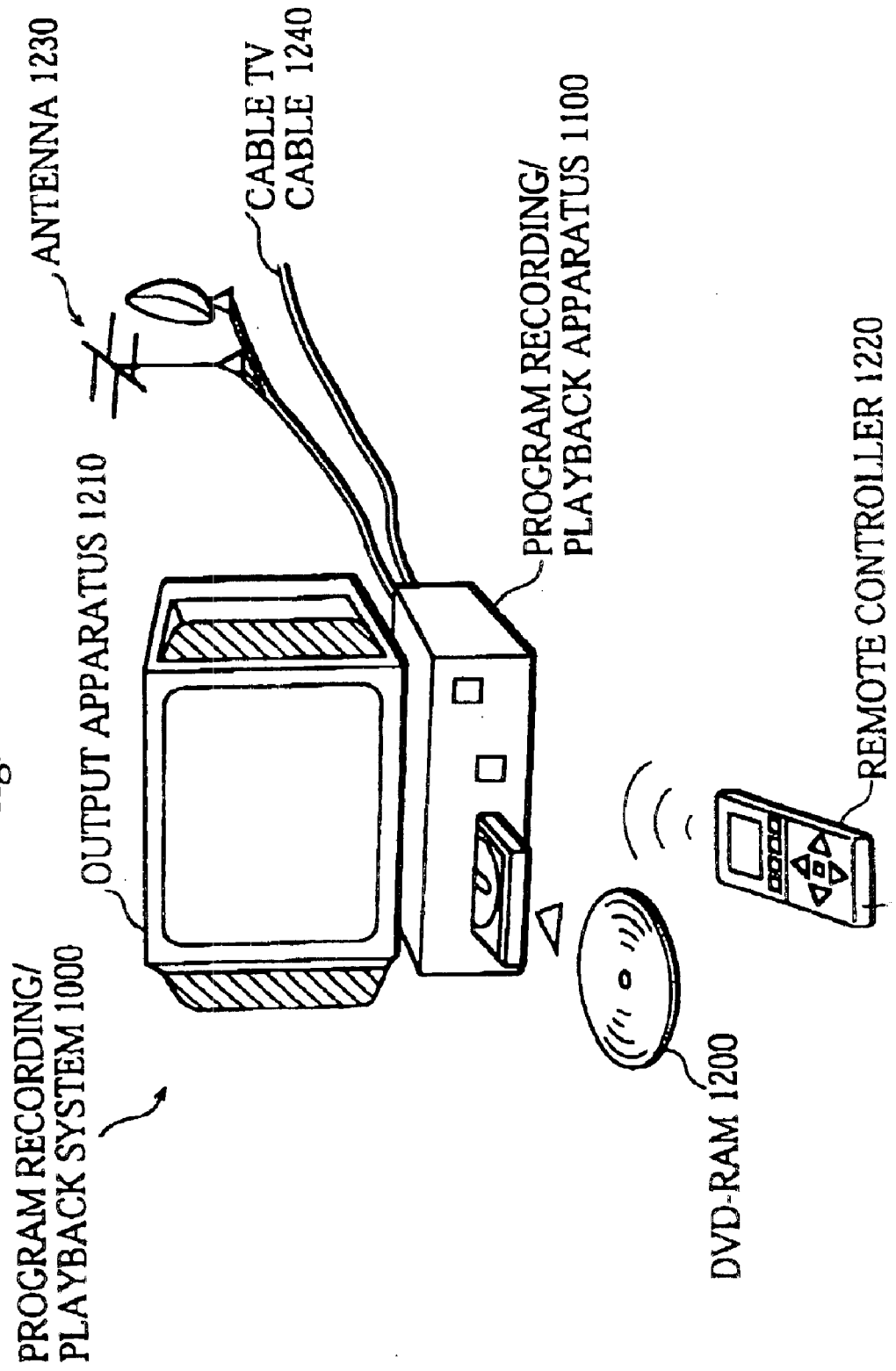
FIG. 1 shows the construction of a program recording/playback system 1000 that is a first embodiment of the present invention.

The following describes several embodiments of the present invention, with reference to the enclosed drawings.
First Embodiment The following describes a program recording/playback system that is a first embodiment of the present invention.
Construction FIG. 1 shows the construction of a program recording/playback system 1000 that is a first embodiment of the present-invention.

The program recording/playback system 1000 receives and records a television program (hereinafter simply "program") in accordance with a user indication. Such programs are composed of video images and audio and are broadcast by a broadcast station. The program recording/playback system 1000 is also capable of playing back recorded programs and of allowing users to simply watch broadcast programs. As shown in FIG. 1, the program recording/playback system 1000 is composed of a program recording/playback apparatus 1100, an output apparatus 1210, a remote controller 1220, an antenna 1230, and a cable TV cable 1240.

The program recording/playback apparatus 100 is equipped with the same functions as a digital video recorder, and so can receive programs, record programs onto a DVD-RAM 1200 that is a rewritable optical disc, and playback programs from the DVD-RAM 1200.

The output apparatus 1210 is a monitor that is connected to the program recording/playback apparatus 1100. The output apparatus 1210 receives an image signal and an audio signal from the program recording/playback apparatus 1100, and displays images on a display screen while outputting sound via a speaker or speakers. This output apparatus 1210 is used when the user watches a program or views information relating to programs.

The remote controller 1220 is equipped with several buttons or the like. The user presses these buttons to indicate operations such as program reception, recording start, recording stop, and playback. When the user makes a button operation, the remote controller 1220 sends an infrared signal to inform the program recording/playback apparatus 1100 of the user operation.

The antenna 1230 is made up of a parabola antenna for receiving satellite broadcasts and a conventional antenna for receiving terrestrial broadcast waves. The cable TV cable 1240 is used for transmitting programs that are received from a cable TV station. Both the antenna 1230 and the cable TV cable 1240 are connected to the program recording/playback apparatus 1100.

The following is a detailed description of the program recording/playback apparatus 1100.

Figure 2:
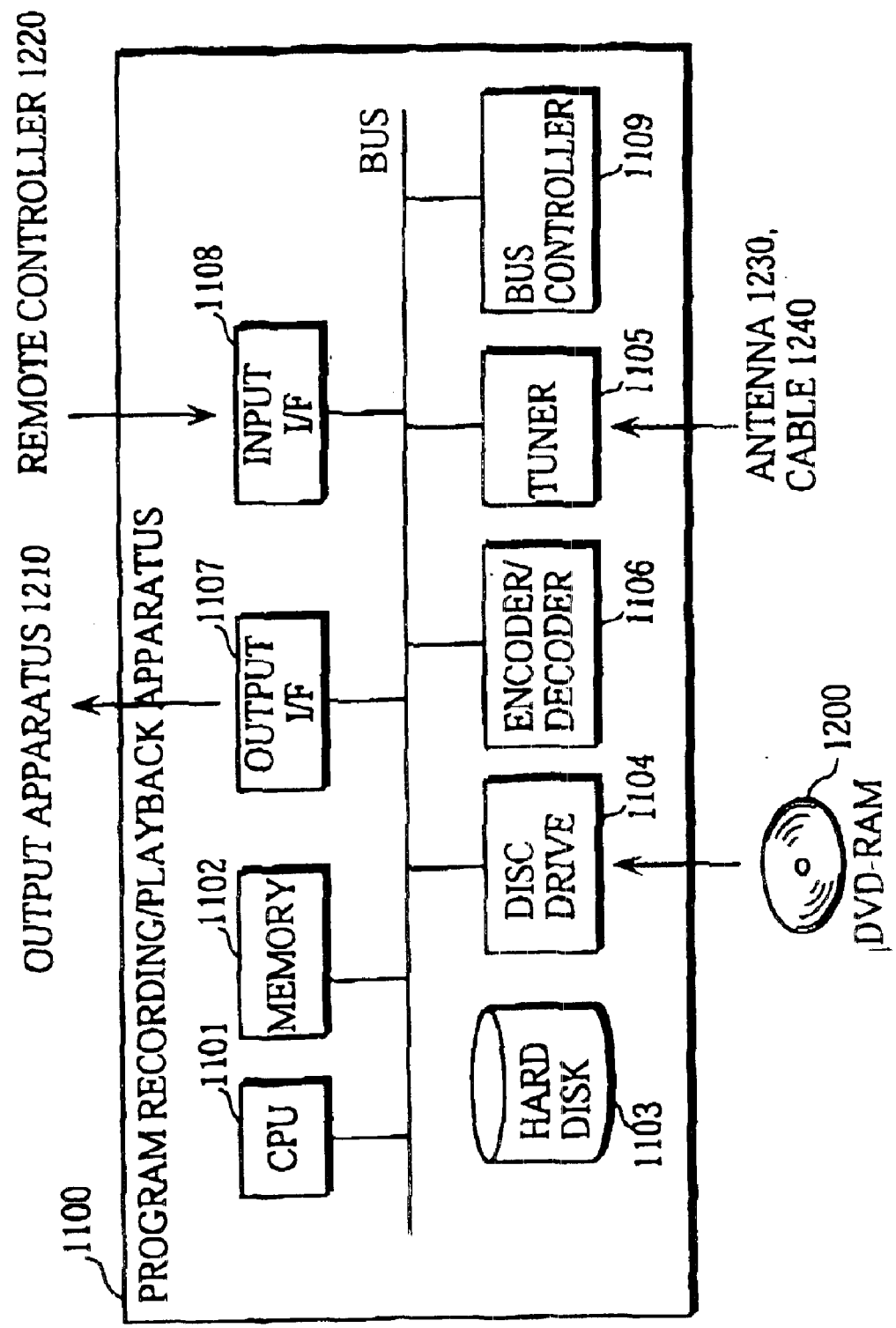
FIG. 2 shows the hardware construction of the program recording/playback apparatus 1100.

FIG. 2 shows the hardware construction of the program recording/playback apparatus 1100.

As shown in FIG. 2, the program recording/playback apparatus 1100 includes a CPU 1101, a memory 1102, a hard disk drive 1103, a disc drive 1104, a tuner 1105, an encoder/decoder 1106, an output interface (hereafter "I/F") 1107, an input I/F 1108, and a bus controller 1109. Note that the CPU 1101, the memory 1102, and other components are all connected to a bus.

The memory 1102 is composed of both RAM (Random Access Memory) and ROM (Read Only Memory) and stores in advance a variety of control programs that are used to perform program reception, recording and playback. The memory 1102 is also used for storing the data required when executing these control programs.

The CPU 1101 executes the control programs stored in the memory 1102 and so controls the various components provided in the program recording/playback apparatus 1100.

The hard disk drive 1103 is a recording medium used for storing, in the same way as the memory 1102, data that is necessary for the execution of the control programs.

The disc drive 1104 accesses the DVD-RAM 1200 and either reads or writes a program and management information for the programs on the DVD-RAM 1200. The disc drive 1104 specifies the access position on the DVD-RAM 1200 from an indication given in address information that it receives. The disc drive 1104 is also capable of providing address information in response to an enquiry into the free area or rewritable area on the DVD-RAM 1200.

The tuner 1105 includes a tuner unit that is capable of receiving programs broadcast according to a variety of broadcast formats. On receiving an indication of a broadcast format and a frequency, the tuner 1105 receives a program broadcast on the indicated frequency via the antenna 1230 or the cable TV cable 1240 depending on the indicated broadcast format, and outputs the received program. The program, which is to say video and audio signals, outputted by the tuner 1105 are outputted via the output IF 1107 to the output apparatus 1210.

The encoder/decoder 1106 has a decoder function and an encoder function. The encoder function converts the video and audio signals outputted by the tuner 1105 into compression-encoded data to be recorded onto the DVO-RAM 1200. The decoder function subjects data that has been read from the DVD-RAM 1200 to decompression-decoding to convert the data into video and audio signals that can be outputted. In the present embodiment, compression-encoding of video is performed in accordance with MPEG2 standard. The encoder/decoder 1106 also includes a track buffer for playback and recording of video and audio signals using a variable bitrate.

The output I/F 1107 is an interface that outputs video and audio signals for programs and a user interface screen for displaying selections and messages to the output apparatus 1210.

The input I/F 1108 is an interface that receives an in infrared signal sent by the remote controller 1220 and informs the CPU 1101 of the user's indication.

The bus controller 1109 controls the transmission of data between components of the program recording/playback apparatus 1100 that are connected to the bus.

Figure 3:
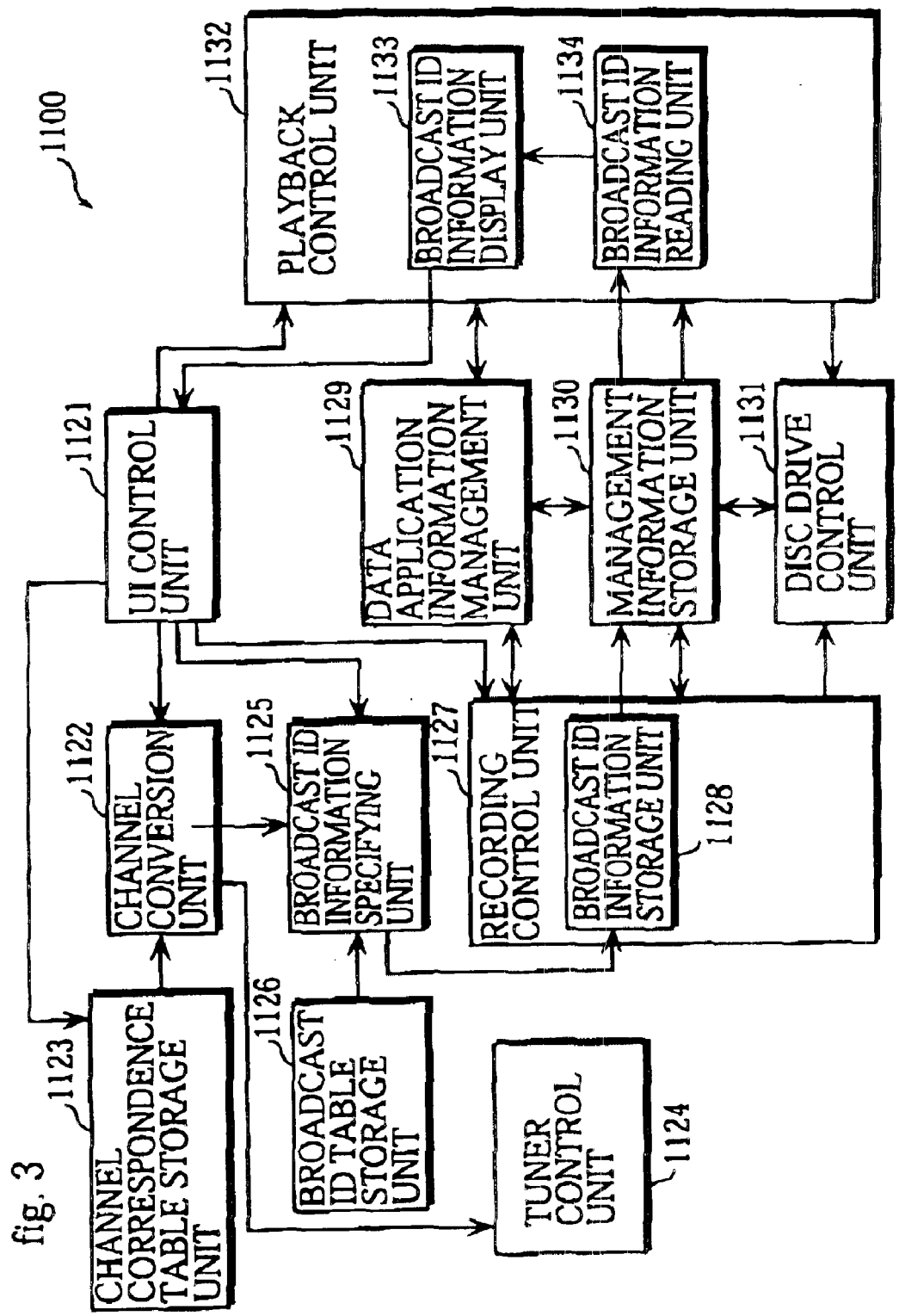
FIG. 3 is a functional block diagram of the program recording/playback apparatus 1100.

FIG. 3 is a functional block diagram of the program recording/playback apparatus 1100. This drawing shows the relationship between the functional elements that control the components (such as the disc drive 1104, the tuner 1105, and the encoder/decoder 1106) of the program recording/playback apparatus 1100 during program reception, recording, and playback. These functional elements are realized by the CPU 1101 executing the control programs that are stored in the memory 1102.

As shown in FIG. 3, in functional terms the program recording/playback apparatus 1100 includes a UI (User Interface) control unit 1121, a channel conversion unit 1122, a channel correspondence table storage unit 1123, a tuner control unit 1124, a broadcast ID information specifying unit 1125, a broadcast ID table storage unit 1126, a recording control unit 1127, a data application information management unit 1129, a management information storage unit 1130, a disc drive control unit 1131, and a playback control unit 1132.

The UI control unit 1121 is capable of receiving user indications via the input I/F 1108 and of outputting a user interface screen via the output I/F 1107.

By operating the remote controller 1220, the user is able to make the following indications to the program recording/playback apparatus 1100; an indication for the setting of an operation channel number; a reception indication that specifies an operation channel number; a reception condition setting indication that sets a reception condition specifying a reception area or the like; a recording start indication and a recording stop indication for starting and stopping the recording of a broadcast program; and a playback indication for the playback of a recorded program.

The reception condition referred to here is indicated, for example, by a set of sort codes for a reception area or for cable TV services received by the program recording/playback apparatus 1100. These sort codes may be determined in advance and listed in the operation manual, for example.

Note that it is necessary for the user to set the operation channel numbers and reception condition at least once before reception is performed, such as when the program recording/playback apparatus 1100 is set up. However, if the user reads the operation manual and decides that it is not necessary to change the default settings of the reception condition and the relationship between the operation channel numbers and the broadcast channels, the user does not need to set the operation channel numbers and reception condition.

The UI control unit 1121 receives a reception indication from the user and informs the channel conversion unit 1122 of the operation channel number. The UI control unit 1121 also receives user settings of the reception condition and informs the broadcast ID information specifying unit 1125 of the reception condition. On receiving a recording start indication or a recording stop indication, the UI control unit 1121 informs the recording control unit 1127 of the received indication. On receiving a playback indication, the UI control unit 1121 informs the playback control unit 1132 of the received indication. On receiving an indication for the setting of an operation channel number, the UI control unit 1121 makes the indicated changes to the correspondence between operation channel numbers and broadcast channels in the channel correspondence table stored in the channel correspondence table storage unit 1123.

The channel correspondence table storage unit 1123 is a storage region in a memory, or the like, that stores a channel correspondence table showing the correspondence between operation channel numbers and broadcast channels.

The channel conversion unit 1122 receives, from the UI control unit 1121, an operation channel number that has been indicated in a user reception indication. The channel conversion unit 1122 specifies a broadcast channel based on the channel correspondence table stored in the channel correspondence table storage unit 1123, and informs the broadcast ID information specifying unit 1125 and tuner control unit 1124 of this broadcast channel.

The tuner control unit 1124 stores a conversion table that shows a frequency for each broadcast channel number. The tuner control unit 1124 sets the frequency corresponding to the broadcast channel number received from the channel conversion unit 1122 and the corresponding broadcasting format in the tuner, and controls the tuner to receive a broadcast program sent on this frequency.

The broadcast ID table storage unit 1126 is a storage region in a memory, or the like, storing a broadcast ID table that associates broadcast channels and reception condition with information for identifying each broadcast station. The broadcast ID table is described in detail later in this specification.

The broadcast ID information specifying unit 1125 stores the reception condition that it receives from the UI control unit 1121. The broadcast ID information specifying unit 1125 searches a broadcast ID table stored in the broadcast ID table storage unit 1126 using the reception condition and broadcast channel received from the channel conversion unit 1122 and specifies the broadcast ID information.

In this example, the broadcast ID information refers to information that is necessary for specifying one out of a plurality of television broadcasts. As one example, this information can be a pairing of ID information for a broadcast station and a broadcast channel.

The disc drive control unit 1131 operates under the control of the recording control unit 1127 or the playback control unit 1132 and is capable of controlling the disc drive 1104 and accessing the DVD-RAM 1200.

The management information storage unit 1130 is a storage region in a memory, or the like, for storing management information that has been read from the DVD-RAM 1200 or management information that is to be recorded onto the DVD-RAM 1200. The data construction of a DVD-RAM is described later.

The data application information management unit 1129 accesses the management information in the management information storage unit 1130 and judges which application format should be used when recording onto the DVD-RAM 1200.

The recording control unit 1127 has a broadcast ID information storage unit 1128. Between the reception of a recording start indication from the UI control unit 1121 and the reception of a recording stop indication, the recording control unit 1127 has the encoder/decoder 1106 encode the video and audio signals of the broadcast program that are outputted by the tuner 1105, and controls the disc drive control unit 11131 to have the AV stream data produced by this encoding recorded on the DVD-RAM 1200. When a recording stop indication is received, the recording control unit 1127 records management information including address information showing a recording position of the AV stream data.

The broadcast ID information storage unit 1128 writes the broadcast ID information specified by the broadcast ID information specifying unit 1125 into the management information.

The playback control unit 1132 includes a broadcast ID information display unit 1133 and a broadcast ID information reading unit 1134. On receiving a playback indication from the UI control unit 1121, the playback control unit 1132 controls the disc drive control unit 1131 to read the management information recorded on the DVD-RAM 1200 and has the management information stored in the management information storage unit 1130. The playback control unit 1132 also has the disc drive control unit 1131 read the AV stream data recorded on the DVD-RAM 1200, has the encoder/decoder 1106 decode this AV stream data, and has the resulting video and audio signals outputted to the output apparatus 1210. Based on the management information, the playback control unit 1132 has a list of programs that can be played back displayed on the output apparatus 1210 via the U1 control unit 1121. This list of programs shows the selections that can be indicated by the user when making a playback indication.

The broadcast ID information reading unit 1134 is capable of reading broadcast ID information from the management information stored in the management information storage unit 1130. The broadcast ID information display unit 1133 converts the read broadcast ID information into a display format, adds it to the list of programs that can be played back, and has this list displayed.

Data Construction

The following describes the data that is recorded on the DVD-RAM 1200.

Figure 4:
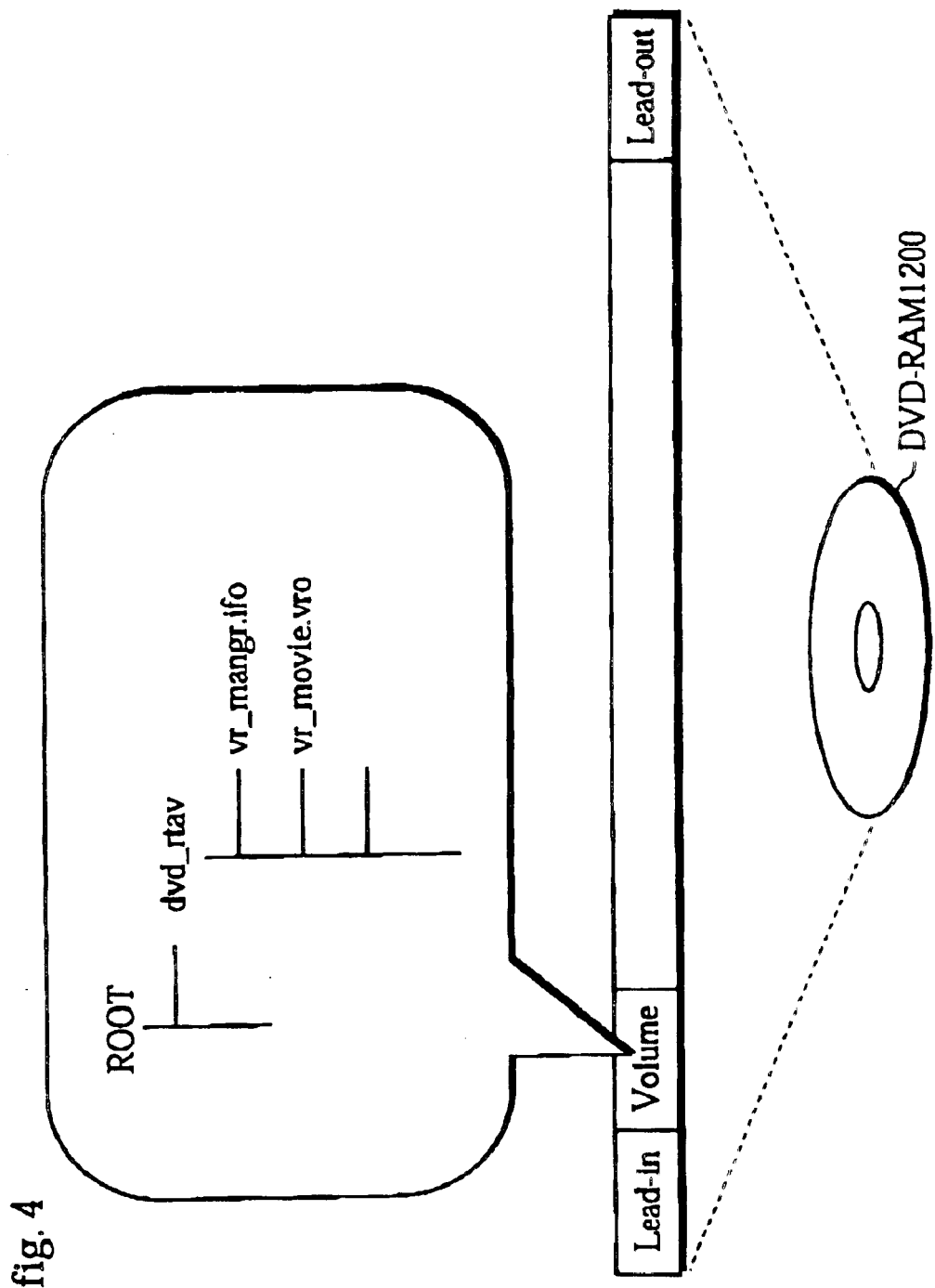
FIG. 4 shows the logical construction of the DVD-RAM 1200 that is used as the recording medium for recording programs.

FIG. 4 shows the logical construction of the DVD-RAM 1200 that is used as the recording medium for recording programs.

As shown in FIG. 4, a Lead-in area is provided at the start of the logical sector addresses of the DVD-RAM 1200. This is followed by a Data area that includes the Volume area and finally by a Lead-out area.

The Lead-in area is used for recording standardized signals that are required to stabilize the servo mechanism of the disc drive, as well as ID signals that distinguish the DVD-RAM 1200 from other media. The Lead-out area is used for recording the same kind of standardized signals.

The data area is used for recording logically valid data. A volume area for managing the composition of files within a file system is positioned at the start of the data area. The file system allows the data stored in the data area to be handled as directories and files.

As shown in FIG. 4, all of the data handled by the program recording/playback apparatus 1100 is located a's files under the "dvd_rtav" directory directly below the "ROOT" directory. The files handled by the program recording/playback apparatus 1100 are made up of one management information file and one or more AV files.

AV files have filenames such as "vr_movie.vro" and store AV stream data that is composed of the content of a program. The management information file has the filename "vr_mangr.ifo" and stores the information required for the playback or editing of the AV stream data stored in an AV file. This information can include attribute information for each program, such as address information for AV files, program titles, and recording dates.

Note that the construction of the data recorded on the DVD-RAM 1200 by the program recording/playback apparatus 1100 conforms with the DVD Video Recording Standard (hereinafter, simply "VR Standard") that was decided by the DVD Forum.

VR standard was developed to make the most of the high-speed access available with discmedia, and describes a data construction for recording/playback software that was decided as one of the standards relating to DVD for recording and playback in accordance with MPEG standards. VR standard is described in the document "DVD Application Format for DVD Rewritable Discs Part 1 Video Recording Version 1.0". In the following description, the content of the management information is explained, where necessary, using the terminology defined by VR standard.

Figure 5:
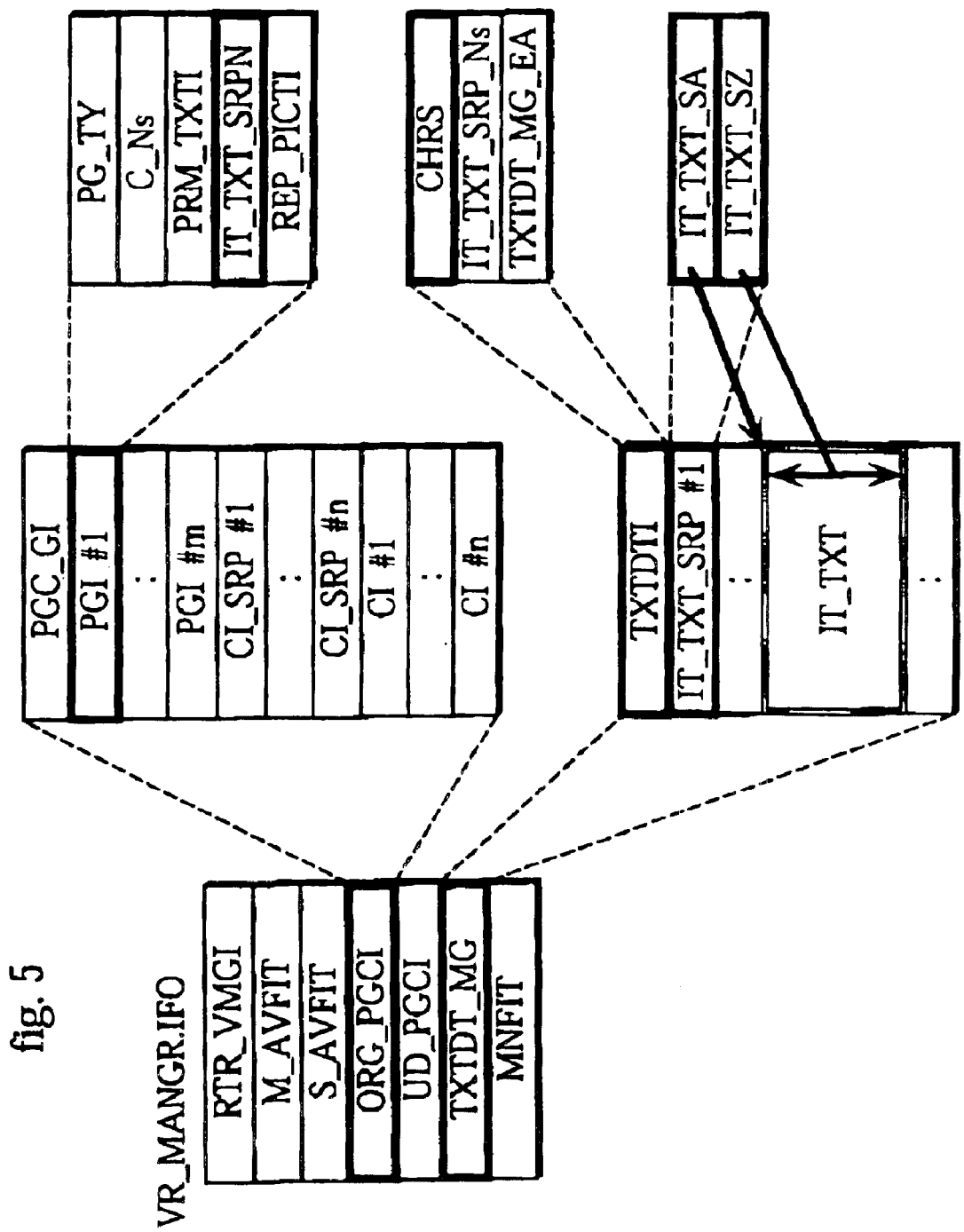
FIG. 5 shows the data construction relating to the item text area that the program recording/playback apparatus 1100 inserts into the broadcast ID information, out of the data in the management information file "vr_mangr.ifo"

FIG. 5 shows the data construction relating to the item text area that the program recording/playback apparatus 1100 inserts into the broadcast ID information, out of the data in the management information file "vr_mangr.ifo".

The item text area is the area shown as "TXTDT_MG" in FIG. 5. This area includes a character data area "IT_TXT", a pointer "IT_TXT SRP" to the item text area, and a character code indicator "CHRS". The pointer "IT_TXT SRP" is a combination of a start pointer "IT_TXT_SA" for the IT_TXT and a size "IT_TXT_SZ". Note that a number of pointers "IT_TXT_SRP" can be given as an array. IT_TXT is an area that stores a set of attribute data for a program, the attribute data being expressed in the character format indicated by CRRS.

In the management information, the information showing a program is given as a PGI. A maximum of 99 PGIs can be recorded. Each PGI has a region called "IT_TXT_SRPN", in which a number of a pointer "IT_TXT_SRP" that indicates the IT_TXT corresponding to the program represented by the PGI is recorded. This number shows the position of the pointer in an array of pointers. As a result, each PGI is linked to the corresponding IT_TXT via the IT_TXT_SRP, which is to say, each program is linked to the corresponding attribute information.

Figure 6:
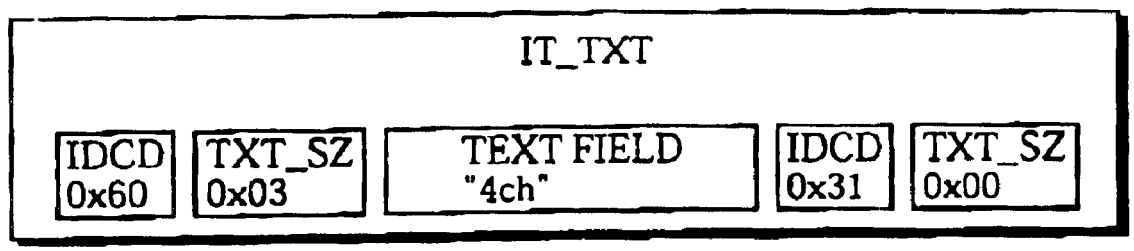
FIG. 6 shows one example of the content of the item text area (IT_TXT)

FIG. 6 shows one example of the content of the character data area IT_TXT.

As shown in FIG. 6, IT_TXT is made up of a set of tagged character data. In more detail, IT_TXT is composed of a set of three information fields, namely a one-byte tag "IDCD", a one-byte text field size "TXT_SZ", and a "text field" of a desired size. The fields IDCO and TXT_SZ are always placed at the start of each set of information, so that each text field can be read in order starting from the front. When the IDCD of an IT_TXT is set as "0x31" as shown in FIG. 6, this means that there is no text field in the IT_TXT, so that the TXT_SZ is set at zero.

The following describes the channel correspondence table that is stored in the channel correspondence table storage unit 1123 of the program recording/playback apparatus 1100.

FIG. 7 shows the data construction and an example content of the channel correspondence table.

AS shown in FIG. 7, the channel correspondence table associates each operation channel with a broadcast channel. Each broadcast channel is composed of a broadcast format and a broadcast channel number.

In this specification, the broadcast format indicates the broadcast method used, which can be a terrestrial wave, satellite broadcast, cable television or other method. The broadcast format also shows whether the broadcast is analog or digital.

In the example shown in FIG. 7, the legend "TA" represents an analog broadcast made using terrestrial waves, the legend "BA" represents an analog broadcast made via satellite, and "CA" represents an analog broadcast made via a cable television service.

When the user indicates that she/he wishes to set an operation channel number, a pair of an operation channel number and a broadcast channel are received from the user and then used to update the channel correspondence table.

The following describes the sort codes used in the reception condition.

FIG. 8 shows several examples of the sort codes. The sort codes are constants that are assigned to classifications that can be common to a number of broadcast channels, such as a reception area like the Tokyo area or the Osaka area or an indication of a satellite or cable TV service. If used with a broadcast channel number, the sort codes enable a television broadcast to be specified. In FIG. 8, the sort code "0013" corresponds to a reception condition indicating the Tokyo area. The correspondence between sort codes and reception conditions can be written in the user operation manual, for example. By referring to this operation manual, the user can set one or more items for the reception condition in the program recording/playback apparatus 1100 by indicating the appropriate sort codes.

As one example, when the program recording/playback apparatus 1100 is located in the Osaka area and is able to receive the "XYZ Cable TV" service, the user indicates the sort codes "0027" and "0101".

The following describes the broadcast ID table stored in the broadcast ID table storage unit 1126.

FIG. 9 shows the data construction and an example content of the broadcast ID table.

As shown in FIG. 9, the broadcast ID table associates reception conditions, broadcast channels, broadcast station codes, and broadcast station names.

A broadcast station code is a four-digit hexadecimal number that is assigned, for the whole of Japan, to a broadcast station that has a certain broadcast format and a certain broadcast frequency. The broadcast station names correspond to the broadcast station codes and are character strings that are set so as to identify broadcast stations.

By referring to the broadcast ID information, the broadcast ID information specifying unit 1125 can specify a broadcast station code and broadcast station name from a reception condition and a broadcast channel.

In the illustrated example, when the broadcast conditions are "Tokyo Area", "Nationwide" and "XYZ Cable TV", the broadcast format is "terrestrial analog (TA)", and the broadcast channel number is "2", the broadcast ID table shows that broadcast station code is "0x0001" and the specified broadcast name is "NHK General (Tokyo)".

Note that the reception condition "Nationwide" is assumed to be treated as always being set in the program recording/playback apparatus 1100 so that satellite broadcasts can be received.

While not shown in FIG. 9, the broadcast station names in the broadcast ID table can be expressed using one or more character sets, such as ASCII (American Standard Code for Information Interchange) and Shift-JIS (Japanese Industrial Standards).

The following describes the broadcasting ID information that is recorded in the management information of a DVD-RAM by the broadcast ID information storage unit 1128.

FIG. 10 shows the data construction and an example content of the broadcast ID information in the format in which it is recorded onto a DVD-RAM.

The broadcast ID information shown in FIG. 10 is one set of tagged character data that is included in the ID_TXT in the management information of a DVD-RAM. The broadcast ID information is composed of the IDCD tag, the text field size TXT_SZ and a text field. The value IDCD is set as "0x90", which represents "other" according to VR standard.

The text field is composed of the following fields: a data application identifier, a use, a channel ID, a broadcast station ID, a name, a country, a broadcast format, a channel ID byte number, and broadcast station ID byte number. Note that this content of a text field is not defined by VR standard.

The "Data Application ID" field stores an identifier showing the application format of the data, which is to say, 9 bytes of character string data that show how the data was recorded. As one example, "dvdvrx010" can be recorded in this field. Here, "dvdvrx" is an abbreviation for "DVD Video Recording Extension" and "010" is the version number.

The "Use" field is used for storing 2 bytes of character string data that shows the how the data stored in the other fields is being used. In the illustrated case, "BC", an abbreviation of "broadcast", is stored to show that the other fields include broadcast 10 information. By changing the setting of this Use field, other information can be linked to programs and stored in the management information.

The "Channel ID" field is variable-length field that stores character string data obtained by converting the broadcast channel number to a character code. As one example, the two-byte string "11" can be stored to indicate "Channel 11".

The "Broadcast Station ID" field is a variable-length field that stores character string data obtained by converting the character station code (a hexadecimal number) into a character code. As one example, the four-byte string "0004" can be stored to show the number "0x0004".

The "Name" field is a variable-length field that stores a broadcast station name. In the illustrated example, this field stores "NHK Satellite 2".

The "Country" field is a three-byte field storing the name of the country where the broadcast is being made. In the illustrated example, this field stores "JPN" as an abbreviation for Japan.

The "Broadcast Format" field is a two-byte field that stores character string data showing the broadcast format. In the illustrated example, this field stores "BA", which is the character string set as representing an analog satellite broadcast.

The "Channel ID Byte Number" field is a one-byte field storing a byte number obtained by converting a number of bytes showing the size of the variable-length channel ID field to character code. In the illustrated example, this field stores "2".

The "Broadcast Station ID Byte Number" field is a one-byte field storing a byte number obtained by converting a number of bytes showing the size of the variable-length broadcast station ID field to character code. In the illustrated example, this field stores "4".

Note that the content of these text fields is stored by the broadcast ID information storage unit 1128 as character codes in the character format shown by "CHRS" in the item text area.

The following describes the "LAST_MNF_ID" field in the management information-on a DVD-RAM.

Figure 11:
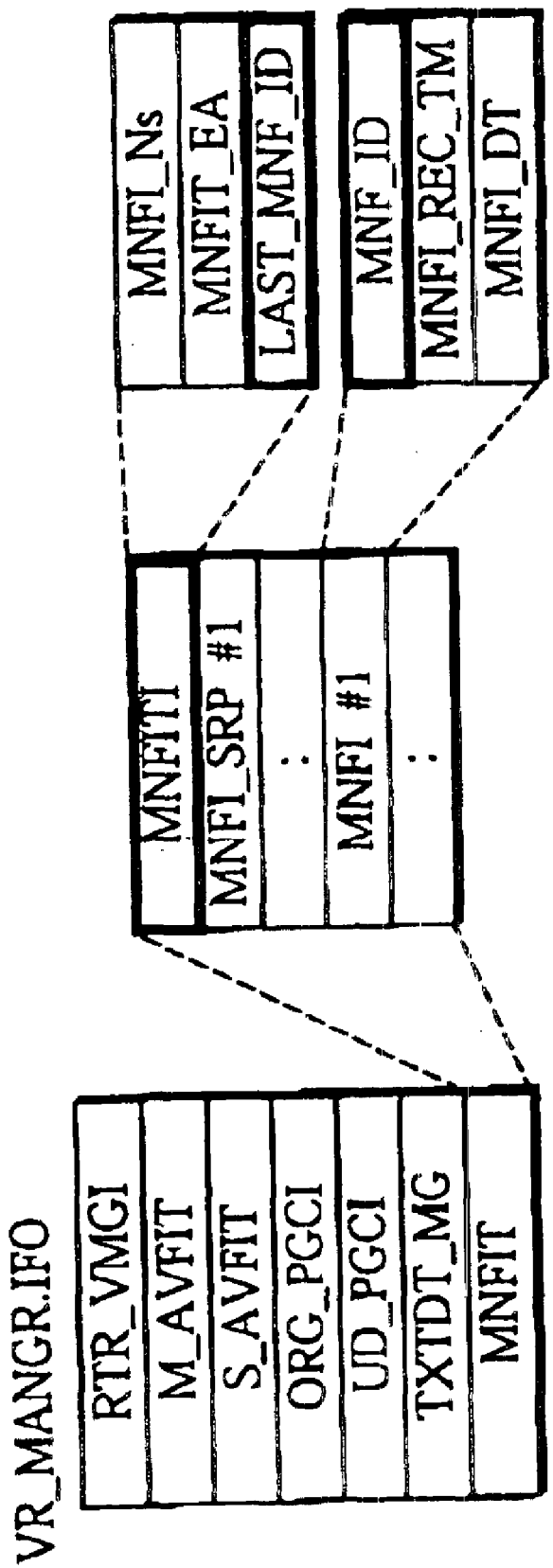
FIG. 11 shows the data construction relating to the manufacturer information table in the management information file "vr_mangr.ifo"

FIG. 11 shows the data construction relating to the manufacturer information table in the management information file "vr_mangr.ifo".

According to VR standard, the manufacturer information table "MNFIT" in the management information includes a manufacturer information area "MNFI" that can be used as desired by the makers of recording equipment. When a manufacturer records their own information in the MNFI area, a manufacturer identifier "MNF_ID" is used to distinguish the information from the MNFI of other manufacturers.

The MNFI area is set as having five areas, though no detailed usage rules are defined, so that if the five areas are already full, recording equipment produced by a different manufacturer may overwrite these regions. There may also be cases where faulty recording equipment corrupts the MNFI of another manufacturer.

For this reason, a region called the "LAST_MNF_ID" is defined by VR standard. This "LAST_MNF_ID" region is written by the apparatus that most recently recorded onto the DVD-RAM to show the manufacturer and apparatus name. When an apparatus produced by any manufacturer refers to the "LAST_MNF_ID" region and finds a different identifier to that of its own manufacturer, the apparatus can judge whether there is any risk of information, such as the MNFI, in the management information on the DVD-RAM being corrupted.

When recording onto a DVD-RAM, a device needs to store information that identifies the device in the region showing the "LAST_MNF_ID", though the content of the information stored in the "LAST_MNF_ID" is not defined by VR standard. As one example, a device can record a combination of a version number of software, a product number, and a factory codename as the information that identifies the device.

The following describes the information (hereafter referred to as "last recording apparatus information") that the program recording/playback apparatus 1100 stores in the "LAST_MNF_ID" to identify itself.

FIG. 12 shows the data construction and an example content of the last recording apparatus information recorded onto a DVD-RAM.

As shown in FIG. 12, the program recording/playback apparatus 1100 records last recording apparatus information distinguishing between an internal application area and an external application area. The external application area includes a "Data Application ID" field, while the internal application area includes a "Company Code" field, an "Internal Version" field a "Product Type" field, a "Public/Commercial Use" field, and a "Serial Number" field.

The "Data Application ID" field is used for storing an identifier showing how the data is to be used, which is to say, nine bytes of character string data for expressing the format in which the data is recorded. When recording data, the program recording/playback apparatus 1100 records the same character string, such as "dvdvrx010" as the Data Application ID field in the IT_TXT in the broadcast ID information.

The program recording/playback apparatus 1100 reads the management information that is already recorded on the DVD-RAM and refers to the data application ID in the last recording apparatus information in the management information. If the data application ID represents data that can be processed by the program recording/playback apparatus 1100, the program recording/playback apparatus 1100 judges that it can record or refer to broadcast ID information on this DVD-RAM.

The "Company Code" field stores nine bytes of character data that indicate the name of a manufacturer of a recording apparatus. The data construction of the remaining fields can be set in accordance with the setting of the company code field, and so can be set in accordance with the wishes of each manufacturer. In the illustrated example, the program recording/playback apparatus 1100 stores the character string "panasonic" in the company code field.

The "Internal Version" field is a two-byte field storing a character code produced by converting the version number of the recording apparatus.

The "Product Type" field stores a character code produced by converting a standardized number that identifies the type of recording apparatus, such as "recorder deck" or "camcorder".

The "Domestic/Commercial Use" field stores a character code for identifying whether the device is being used for domestic or commercial use.

The "Serial Number" field stores a character code produced by converting the serial number of the recording apparatus.

Note that the program recording/playback apparatus 1100 stores the last recording apparatus information with the content shown in FIG. 12 in the memory 1102 or the like, and uses this data when recording onto the DVD-RAM or comparing its own last recording apparatus information with the data application ID recorded on a DVD-RAM.

Operation

The following describes the operation of a program recording/playback system 1000 that has the construction described above. This program recording/playback system 1000 handles the data described earlier.

The program recording/playback system 1000 performs a variety of operations in accordance with user indications that are made using the remote controller 1220. The principle operations of the system are a reception operation that is performed in response to a reception indication, a recording operation that starts in response to a recording start indication and stops in response to a recording stop indication, and a playback operation that is performed in response to a playback indication.

The following describes the operation of the program recording/playback apparatus 1100 when consecutively performing a reception operation and a recording operation (hereafter collectively called a "reception/recording operation").

Figure 13:
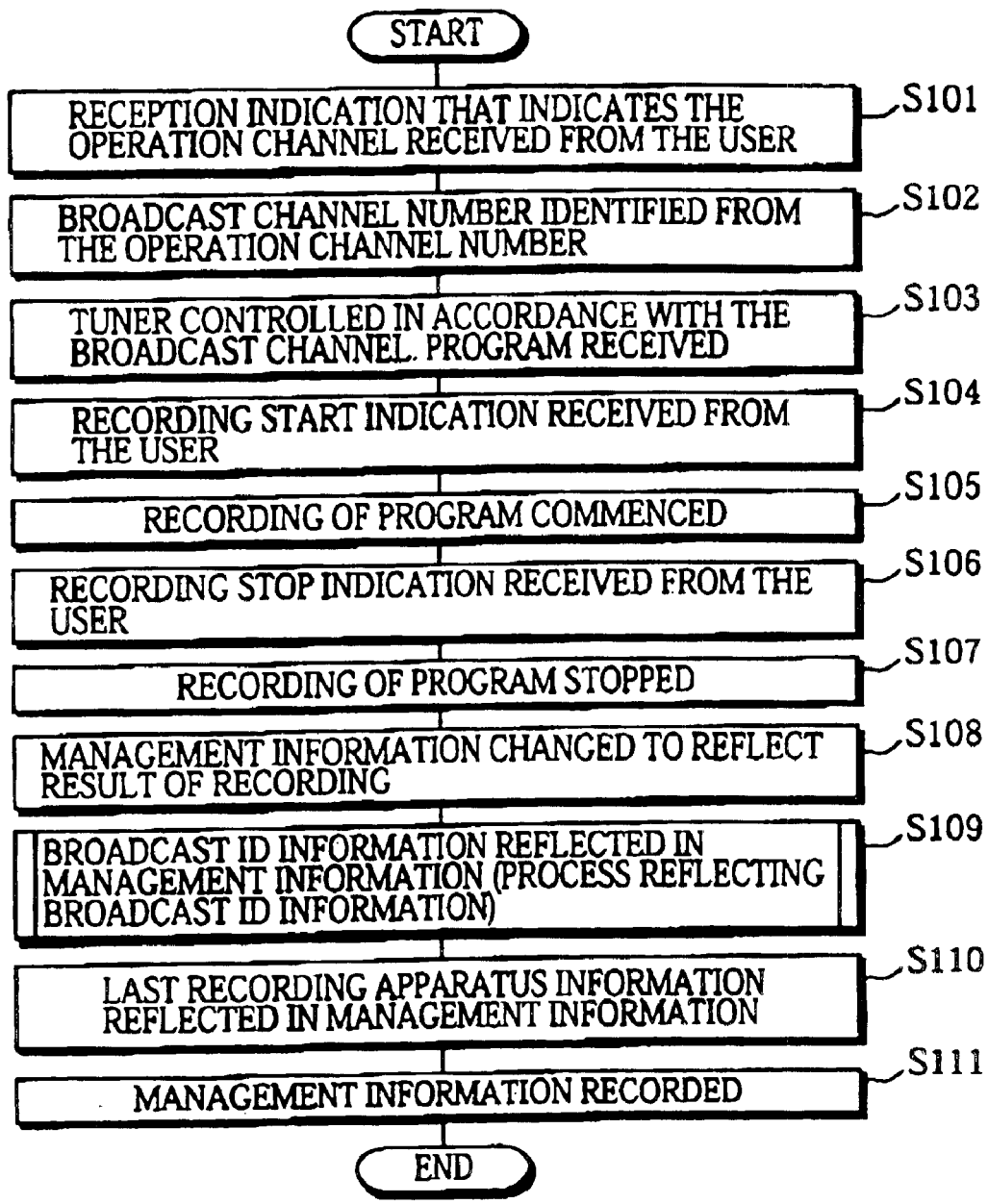
FIG. 13 is a flowchart showing the reception/recording operation performed by the program recording/playback apparatus 1100.

FIG. 13 is a flowchart showing the reception/recording operation performed by the program recording/playback apparatus 1100.

When the user inputs an operation channel number using the buttons (or the like) on the remote controller 1220, the UI control unit 1121 of the program recording/playback apparatus 1100 receives the user's reception indication setting the operation channel number via the input I/F 1108 (step S101).

When a reception indication that specifies an operation channel number is received, the UI control unit 1121 informs the channel conversion unit 1122 of the operation channel number. The channel conversion unit 1122 then refers to the channel correspondence table stored in the channel correspondence table storage unit 1123 and specifies the broadcast channel that corresponds to the operation channel number (step S102).

On being informed of the broadcast channel, the channel conversion unit 1122 informs the tuner control unit 1124 of the broadcast channel. The tuner control unit 1124 sets the broadcast channel in the tuner 1105, which is to say, the tuner control unit 1124 sets the broadcast format and broadcast frequency to have the tuner 1105 tune into the desired broadcast channel and then has the tuner 1105 receive a television broadcast (step S103). The channel conversion unit 1122 also informs the broadcast ID information specifying unit 1125 of the specified broadcast channel.

On receiving a television broadcast, the tuner 1105 outputs the video and audio signals of the program. These video and audio signals are sent, via the output I/F 1107, to the output apparatus 1210, which displays the video of the program while outputting the accompanying audio.

Assume that the user then inputs, via the buttons of the remote controller 1220, a recording start indication which is received by the UI control unit 1121 (step S104). The UI control unit 1121 informs the recording control unit 1127 of this recording start indication. In response, the recording control unit 1127 controls the encoder/decoder 1106 to encode the video and audio signals outputted by the tuner 1105 and outputs an indication for the start of program recording to the disc drive control unit 1131 (step S105).

On receiving an indication for the start of program recording, the disc drive control unit 1131 controls the disc drive 1104 to record the AV stream data produced by the encoding onto the DVD-RAM 1200 as an AV file. This starts the recording of the program. Note that when the disc drive 1104 accesses the DVD-RAM 1200 for the first time, the disc drive control unit 1131 reads the management information file "vr_mangr.ifo" and stores it in the management information storage unit 1130. The disc drive control unit 1131 also searches for a recordable position on the DVD-RAM 1200 and records the AV file starting at this position.

Assume that the user then makes, via the buttons of the remote controller 1220, a recording stop indication, which is received by the UI control unit 1121 (step S106). The UI control unit 1121 then informs the recording control unit 1127 of this recording stop indication. In response, the recording control unit 1127 has the encoding stopped and sends a program recording stop indication to the disc drive control unit 1131. On receiving this indication, the disc drive control unit 1131 controls the disc drive 1104 to stop recording a program, which is to say, the AV stream data, onto the DVD-RAM 1200 (step S107).

After the recording of the program has ended, the recording control unit 1127 amends the management information in the management information storage unit 1130 in accordance with VR standard so as to include address information for the AV file of the program that has just been recorded and attribute information for the program (step S108).

This process that has the broadcast ID information of the recorded program reflected in the management information is executed by the broadcast ID information storage unit 1128 when instructed by the recording control unit 1127. Before the process commences, the recording control unit 1127 informs the broadcast ID information storage unit 1128 of the number of the PGI corresponding to the recorded program or the total number of PGIs at present (step S109). As a result, the management information reflects the last recording apparatus information shown in FIG. 12 (step S110).

Once the various items have been included in the management information in the management information storage unit 1130, the recording control unit 1127 instructs the disc drive control unit 1131 to record this management information onto the DVD-RAM 1200. As are result, the disc drive control unit 1131 controls the disc drive 1104 to have the management information recorded on the DVD-RAM 1200 as "vr_mangr.ifo" (step S111).

The following is a detailed description of the process performed in step S109 to have the broadcast ID information reflected in the management information.

Figure 14:
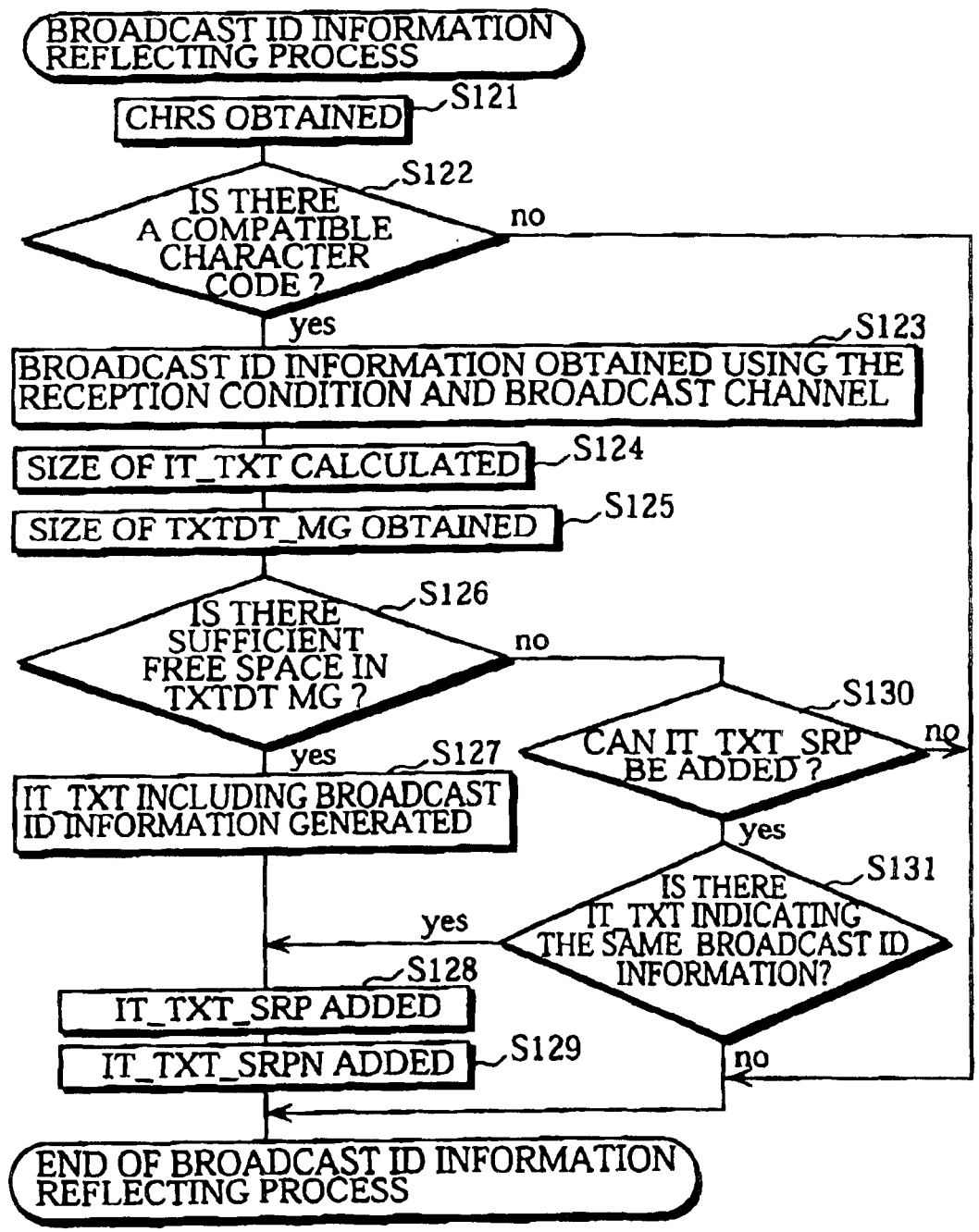
FIG. 14 is a flowchart showing the broadcast ID information reflecting process performed when the program recording/playback apparatus 1100 executes a reception/recording operation.

FIG. 14 is a flowchart showing the process performed to have the broadcast ID information reflected in the management information when the program recording/playback apparatus 1100 performs a reception/recording operation.

This reflecting process is mainly performed by the broadcast ID information storage unit 1128 in the recording control unit 1127.

The broadcast ID information storage unit 1128 first obtains CHRS from the management information in the management information storage unit 1130 (step S121) and judges whether CHRS indicates a compatible character format (step S122).

In the present example, the broadcast ID information storage unit 1128 judges that there is a compatible character format if CHRS indicates ASCII format or Shift-JIS format. If there is no compatible character format in step S122, the process reflecting the broadcast ID information in the management information ends.

When there is a compatible character format in step S122, the broadcast ID information specifying unit 1125 refers to the broadcast ID table stored in the broadcast ID table storage unit 1126 using the reception condition and broadcast channel it has already received and specifies the broadcast ID information, which is then sent to the broadcast ID information storage unit 1128 (step S123). In this example, the broadcast ID information storage unit 1128 receives a broadcast format, a broadcast channel number, a broadcast station code, and a broadcast station name as the broadcast ID information (see FIG. 9).

Next, in step S123, the broadcast ID information storage unit 1128 converts the broadcast ID information into an appropriate format for recording onto the DVD-RAM (see FIG. 10), calculates the size of this converted broadcast ID information that will be recorded as IT_TXT (step S124), and obtains the size of the item text area (TXTDT_MG) in the management information (step S125).

Since the upper limit for the size of the TXTDT_MG is set at 32,768 bytes by VR standard, it is judged whether there is sufficient free space for the addition of the IT_TXT that is the broadcast ID information in recordable format (step S126). In order to add the broadcast ID information to the TXTDT_MG, the required amount of free space is the total of the size of IT_TXT calculated in step S124 and the sizes of IT_TXT_SRP and IT_TXT_SRPN.

On judging in step S126 that there is sufficient free space, the broadcast ID information storage unit 1128 generates IT_TXT for the broadcast ID information shown in FIG. 10 and has this IT_TXT reflected in the management information in the management information storage unit 1130 (step S127). The broadcast ID information storage unit 1128 also adds a corresponding IT_TXT_SRP to the management information (step S128), and adds an IT_TXT_SRPN for the PGI indicated by the recording control unit 1127 (step S129). As a result, the management information is updated so as to include broadcast ID information.

On judging in step S126 that there is not sufficient free space, the broadcast ID information storage unit 1128 judges whether there is enough free space to add not the IT_TXT but only the IT_TXT_SRP and IT_TXT_SRPN to the TXTDT_MG (step S130). When there is still insufficient free space, the broadcast ID information storage unit 1128 does not have the management information reflect the broadcast ID information and ends the broadcast ID information reflecting process.

On judging that there is sufficient free space in step S130, the broadcast ID information storage unit 1128 searches the TXTDT_MG in the management information to see whether the IT_TXT that it wishes to have reflected in the management information is already present (step S131). If so, the broadcast ID information storage unit 1128 adds an IT_TXT_SRP and IT_TXT SRPN corresponding to this IT_TXT (steps S128, S129). On finding that the intended IT_TXT is not present in the management information in step S131, the broadcast ID information storage unit 112B ends the broadcast ID information reflecting process.

The following describes the playback operation performed by the program recording/playback apparatus 1100.

Figure 15:
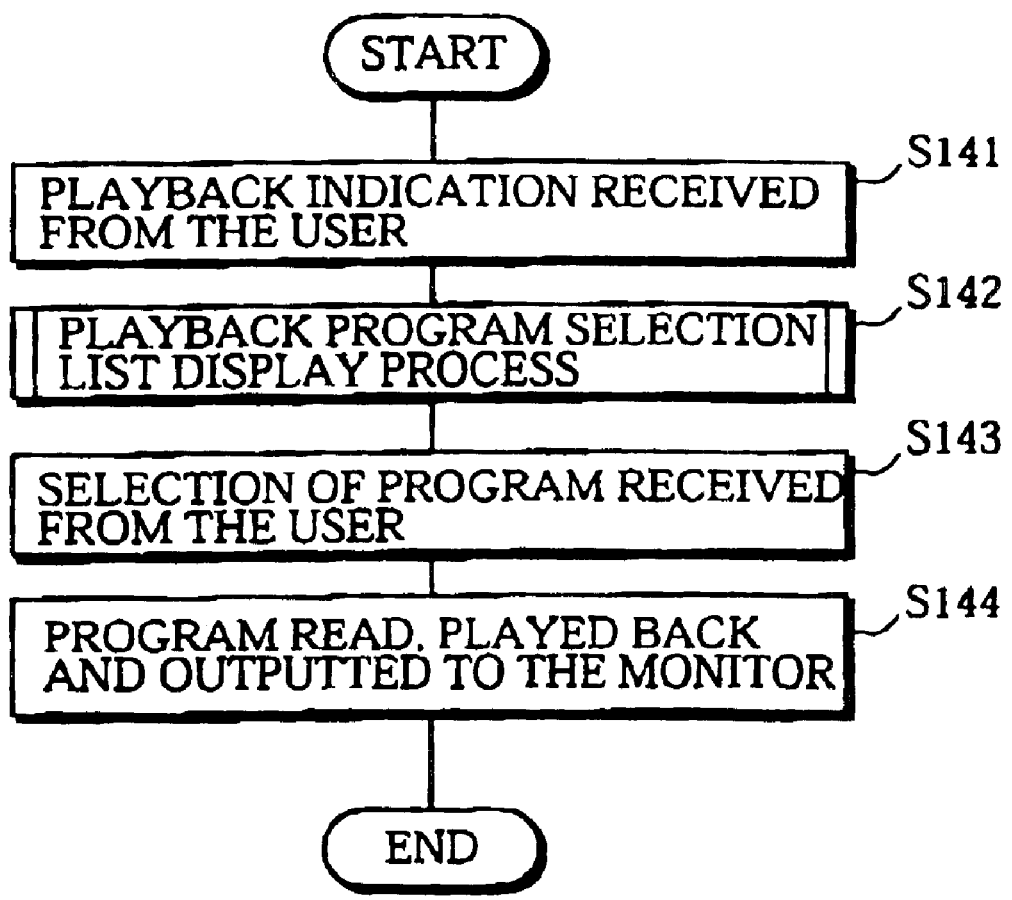
FIG. 15 is a flowchart showing the playback operation performed by the program recording/playback apparatus 1100.

FIG. 15 is a flowchart showing the playback operation performed by the program recording/playback apparatus 1100.

When the user makes a playback indication, such as by pressing the buttons of the remote controller 1220, the UI control unit 1121 of the program recording/playback apparatus 1100 receives the user's playback indication via the input I/F 1108 and informs the playback control unit 1132 of this playback indication (step S141).

By having the disc drive control unit 1131 control the disc drive 1104, the playback control unit 1132 has the management information of the DVD-RAM 1200 read and stored in the management information storage unit 1130. Based on this management information, the playback control unit 1132 performs the playback program selection display process that has a list of programs that can be played back displayed on the output apparatus 1210 (step S142).

When the playback program selection list display process has been performed, the user selects a program from the list and inputs the selection using the buttons on the remote controller 1220. The UI control unit 1121 receives this selection and informs the playback control unit 1132 (step S143).

On receiving this selection, the playback control unit 1132 obtains the address information of the AV file for the selected program from the management information and has the disc drive-control unit 1131 control the disc drive 1104 so as to read the AV stream data for this AV file. The playback control unit 1132 has the read AV stream data decoded by the encoder/decoder 1106 and has the video and audio streams that result from the decoding outputted to the output apparatus 1210 via the output I/F 1107 (step S144). Note that the displayed list of programs includes numbers showing the order in which the programs were recorded on the recording medium. The user selects a number, and the playback control unit 1132 accesses the AV file for the selected program using access information found using the PGI (PGI#n) corresponding to the selected number.

In this way, the user can watch his/her desired program on the output apparatus 1210.

Figure 16:
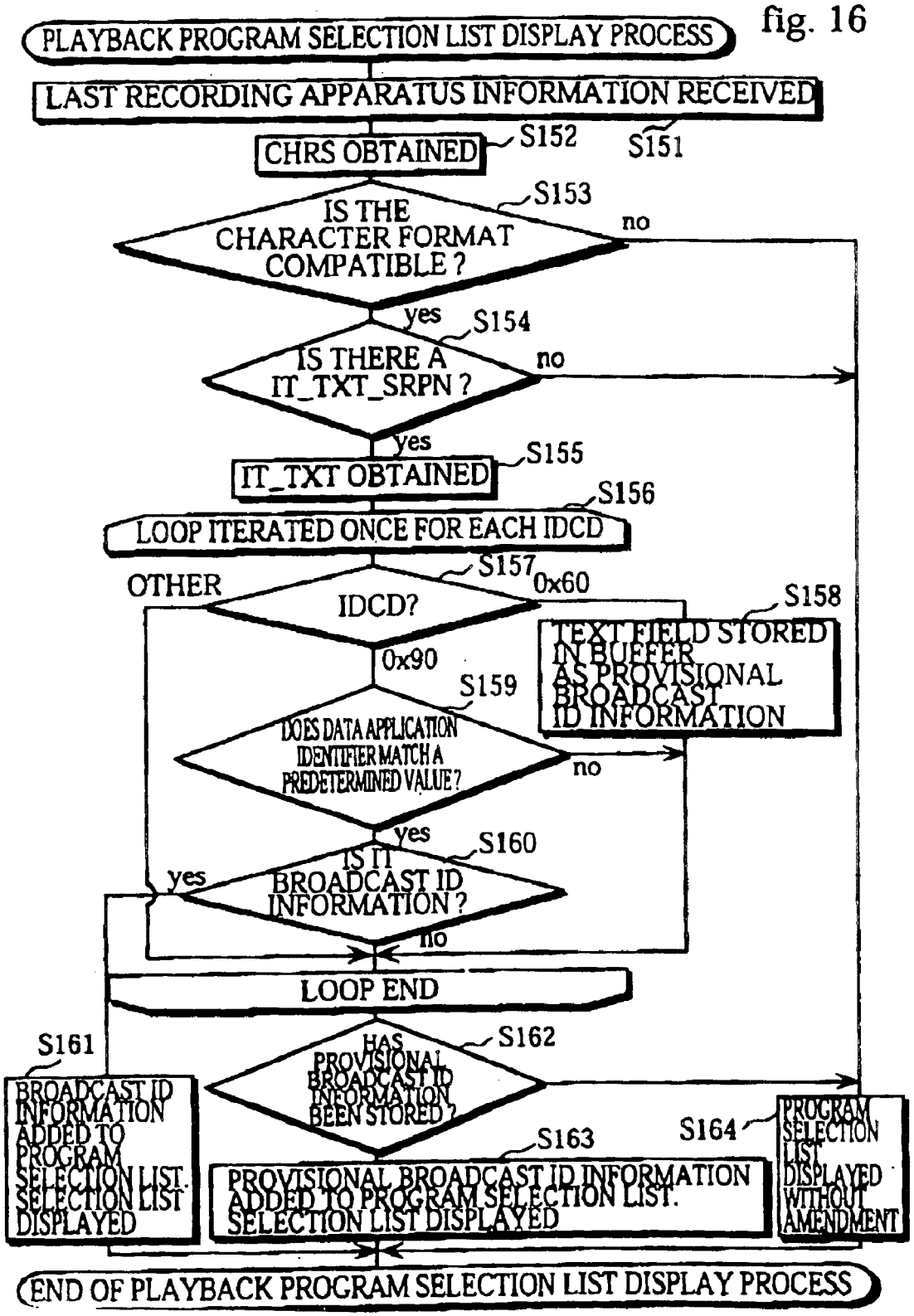
FIG. 16 is a flowchart showing the playback program selection list display process performed when the program recording/playback apparatus 1100 plays back a program.

FIG. 16 is a flowchart showing the playback program selection list display process performed when the program recording/playback apparatus 1100 plays back a program.

The playback control unit 1132 first refers to the management information that has been read from the DVD-RAM 1200 and stored in the management information storage unit 1130, obtains the last recording apparatus information from the LAST_MNF_ID (step S151), and obtains the CHRS (step S152).

The broadcast ID information reading unit 1134 in the playback control unit 1132 judges whether the character format indicated by the CHRS is compatible (step S153). If so, the broadcast ID information reading unit 1134 next judges whether IT_TXT_SRPN is present in the management information (step S154). Note that this procedure in step S154 to S156 is repeated for each PGI corresponding to a program when a plurality of programs are recorded on the DVD-RAM 1200.

On judging in step S154 that IT_TXT_SRPN is present, the broadcast ID information reading unit 1134 obtains a set of tagged character data from the IT_TXT (step S155) and performs the procedure in steps S157 to S160 for each tag.

First, the broadcast ID information reading unit 1134 judges whether the IDCD tag is "0x60", "0x90", or another value (step 5157). When the IDCD tag is "0x60", the broadcast ID information reading unit 1134 stores the text field corresponding to the IDCD in the memory 1102 as provisional broadcast ID information (step S158). When there is another IDCD tag, the judgement in step S157 is repeated. If not, the processing advances to step S162. Note that according to VR standard, the text field corresponding to the IDCD tag "0x60" is defined as showing "Source/Broadcasting Station", so that when a different apparatus has recorded a program on the DVD-RAM, there is the possibility of the corresponding text field storing information showing the broadcast station of the program.

On judging in step S157 that the IDCD tag has the value "0x90", which is defined as meaning "Other" in VR standard, the broadcast ID information reading unit 1134 judges whether the first nine bytes of the text field corresponding to this IDCD have a predetermined value (step S159). In other words, the broadcast ID information reading unit 1134 judges whether these first nine bytes (1) match a data application ID in the last recording apparatus information that is stored in advance in the program recording/playback apparatus 1100 for reference purposes and (2) match the data application ID of the last recording apparatus that is the content of the LAST_MNF_ID obtained in step S151.

On judging in step S159 that the predetermined data application ID is stored in the text field, the broadcast ID information reading unit 1134 next judges whether the following two bytes of the data application ID are "BC" (step S160).

On judging in step S159 that the predetermined data application ID is not stored in the text field or on judging in step S160 that "BC" is not stored, the broadcast ID information reading unit 1134, judges whether there is another IDCD tag. If so, the processing returns to step S157 or if not, the processing returns to step. S162.

On judging in step S160 that "BC" is stored in the text field, the broadcast ID information reading unit 1134 reads the broadcast ID information, such as the channel ID, broadcast station ID, name and broadcast format, and informs the broadcast ID information display unit 1133. On receiving this information, the broadcast ID information display unit 1133 adds the broadcast ID information in a predetermined format to the list of programs, has the list of selections displayed via the UI control unit 1121 (step S161), and ends the playback program selection list display process.

In step S162, the broadcast ID information display unit 1133 judges whether any provisional broadcast ID information is stored in the memory. If so, the broadcast ID information display unit 1133 adds this provisional broadcast ID information to the list of programs, and displays, via the UI control unit 1121, the list of programs as the selectable programs (step S163). If no provisional broadcast ID information is stored, the UI control unit 1121 simply displays, via the UI control unit 1121, the current list of programs as the selectable programs (step S164). This completes the playback program selection list display process.

When broadcast ID information is properly stored on the DVD-RAM 1200, the playback program selection list display process can add the broadcast ID information of each program which is then displayed as a possible selection on the output apparatus 1210.

FIG. 17 shows an example display screen that is displayed by the playback program selection list display process.

Note that in order to display the screen shown in FIG. 17, the broadcast ID information reading unit 1134 informs the broadcast ID information display unit 1133 of the name, broadcast format, and channel ID, out of the broadcast ID information (see FIG. 10) included in the IT_TXT in the management information.

The illustrated display screen only displays selection numbers that are assigned in ascending order to programs beginning at a start of a recording area of a recording medium, with the name of the broadcast station, the broadcast format and broadcast channel number being appended to each selection number. Note that other information on a program, such as the title, may be displayed in the program selection list. If the user views this screen and then selects a program number for a program to be played back using the buttons of the remote controller 1220, the program recording/playback apparatus 1100 then plays back the selected program.

First Modification

The following describes a first modification to the program recording/playback apparatus 1100 described above.

In this first modification, the user gives a reception indication without indicating an operation channel number, and so is a modification of the UI control unit 1121 shown in FIG. 3.

In more detail, the UI control unit of this first modification differs from the UI control unit 1121. The present UI control unit obtains, from the broadcast ID information specifying unit 1125, broadcast ID information for every broadcast channel that can be received, displays a list of broadcast ID information, and gives the user a list of television broadcasts that can be received to enable the user to select a television broadcast.

Figure 18:
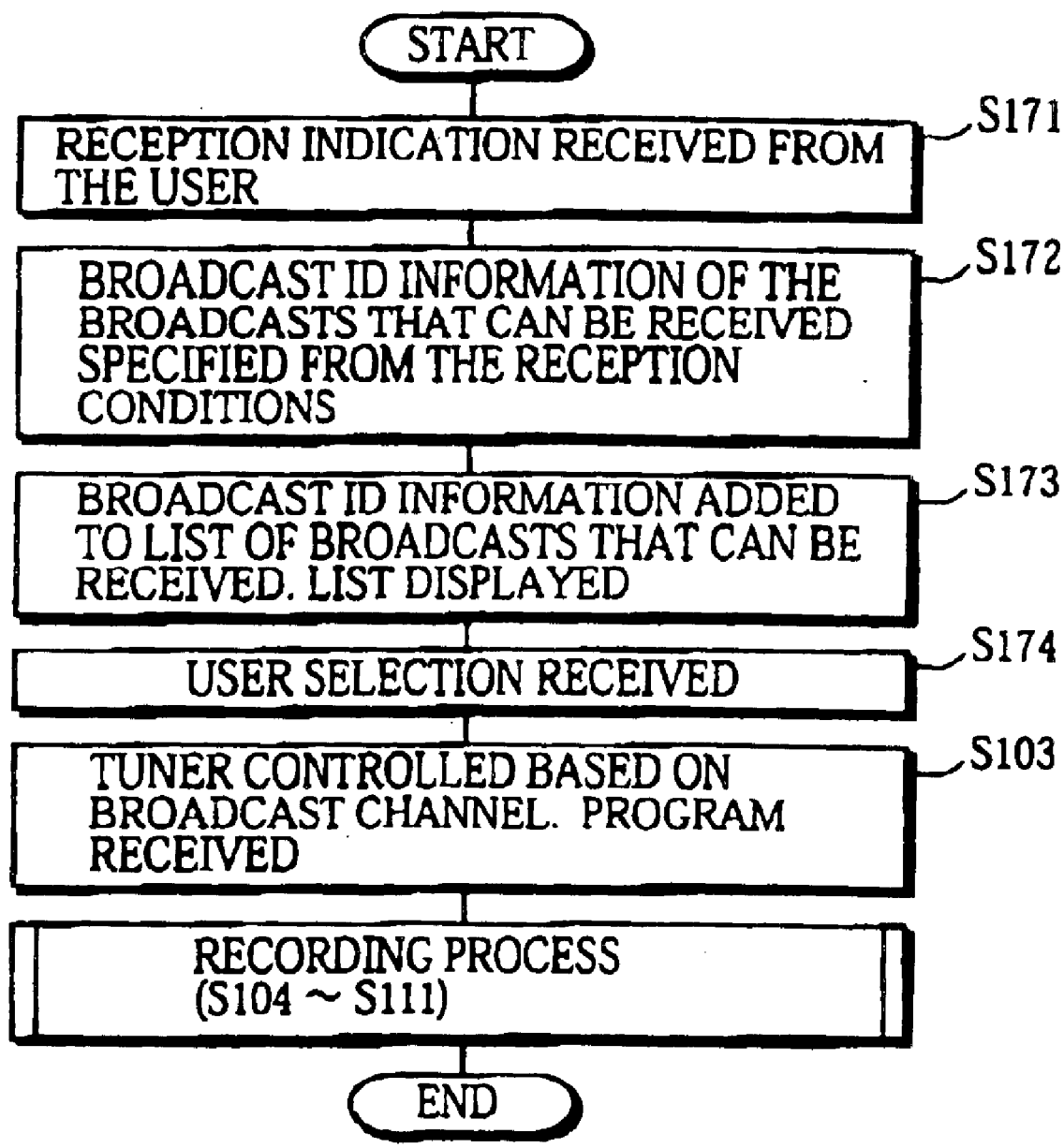
FIG. 18 is a flowchart showing the reception/recording operation of the program recording/playback apparatus of this first modification.

FIG. 18 is a flowchart showing the reception/recording operation of the program recording/playback apparatus of this first modification.

When receiving a reception indication made by the user operating the buttons on the remote controller 1220 or another method, the UI control unit of the program recording/playback apparatus of this first modification receives the reception indication via the input I/F 1108 (step S171).

On receiving this reception indication, the modified UI control unit has the broadcast ID information specifying unit 1125 specify the broadcast ID information of each television broadcast that can be received, based on that reception condition that is stored in advance as a result of a user setting, or the like (step S172). The broadcast ID information specifying unit 1125 refers to the broadcast ID table stored in the broadcast ID table storage unit 1126 and informs the modified UI control unit of the broadcast ID information of each television broadcast that can be received.

On receiving the broadcast ID information for the television broadcasts that can be received, the modified UI control unit displays this broadcast ID information with the selection numbers as programs that can be selected (step S173).

Once the selectable programs have been displayed and the user has used the remote controller 1220 to input his/her selection, the modified UI control unit receives this selection (step S174), informs the tuner control unit 1124 of the broadcast channel for the selected television broadcast that is given in the broadcast ID information, and has the tuner control unit 1124 control the tuner so as to receive a program of this television broadcast (step S103).

Following step S103, the program recording/playback apparatus of this first modification performs the same processing (steps S104 to S111) as in FIG. 13.

FIG. 19 shows an example of the display screen shown when the program recording/playback apparatus of this first modification performs the reception/recording operation.

In the illustrated example, the program recording/playback apparatus of this first modification is located in the Osaka area, so that this display screen shows the television broadcasts that can be viewed in the Osaka area as the possible selections.

Second Modification

The following describes a second modification of the program recording/playback apparatus 1100 described above.

This second modification uses a different example for the content of the broadcast ID table shown in FIG. 9.

FIG. 20 shows the data construction and an example content of the broadcast ID table in this second modification.

As shown in FIG. 20, the broadcast ID table of this second modification has a "group" and "variation", in place of the broadcast station code and broadcast station name (see FIG. 9), corresponding to the reception condition and broadcast channels.

The "group" and "variation" are information for identifying each broadcast station that has been split onto two levels, with "group" representing the information on the upper level and "variation" the information on the lower level.

In the example shown in FIG. 20, the variations of broadcast stations that belong to the "NHK" group are "Tokyo General", "Tokyo Educational", "Osaka General", and "Osaka Educational". The broadcast stations that are indicated by these variations in the "NHK" group are "NHK General (Tokyo)", "NHK Educational (Tokyo)", ""NHK General (Osaka)", and "NHK Educational (Osaka) General", and so as the same as those shown in FIG. 9.

When the broadcast ID table is modified to the one shown in FIG. 20, the broadcast ID information that should be recorded on the DVD-RAM 1200 as the IT_TXT in the management information changes as follows. Of the items shown in FIG. 10, a group and variation should be included in place of the broadcast station ID and name. Note that when the program recording/playback apparatus 1100 performs a playback operation, the broadcast format, the broadcast channel number, the group, and variation should be read from the IT_TXT in the management information and then used to display the programs that can be selected for playback.

Note that in the reception/recording operation, if the content of the broadcast ID information stored in the IT_TXT in the management information is information that identifies a television broadcast, a pair of a reception condition and broadcast channel may be used in place of the broadcast channel and broadcast station code. This is because a pair of (1) a reception condition that indicates the Osaka area, for example, and (2) a broadcast channel that indicates the broadcast channel number "Channel 2" with terrestrial analog waves as the broadcast format, for example, is sufficient to specify a television broadcast.

In the reception/recording operation, the name of a broadcast station does not need to be included in the broadcast ID information stored in IT_TXT. Instead, only a broadcast station code that identifies a broadcast station may be stored. In this case, an apparatus that performs a playback operation needs to store a correspondence table for specifying the broadcast station name from the broadcast station code in advance. This apparatus can obtain a broadcast station code from the management information on a DVD-RAM, specify the broadcast station name using the correspondence table, and then display the broadcast station name to the user as one possible selection.

Second Embodiment

The following describes a program recording/playback system that is a second embodiment of the present invention.

The program recording/playback system of this second embodiment has a hardware construction that is based on the program recording/playback system 1000 (See FIGS. 1 and 2) of the first embodiment, but also includes a communication apparatus that is connected to an external network via a telephone line, or the like.

The program recording/playback apparatus 2100 of this second embodiment differs from the program recording/playback apparatus 1100 of the first embodiment in the functions relating to the playback of programs that have been recorded onto a DVD-RAM. The program recording/playback apparatus 2100 in the present embodiment edits and converts the broadcast ID information in the management information on a DVD-RAM into a suitable format for display and displays the result.

Note that the following explanation describes the case where broadcast ID information recorded in the management information on the DVD-RAM includes groups and variations like the second modification of the first embodiment. The hardware components of this program recording/playback apparatus 2100 are described using the same reference numerals as the first embodiment.

Construction

Figure 21:
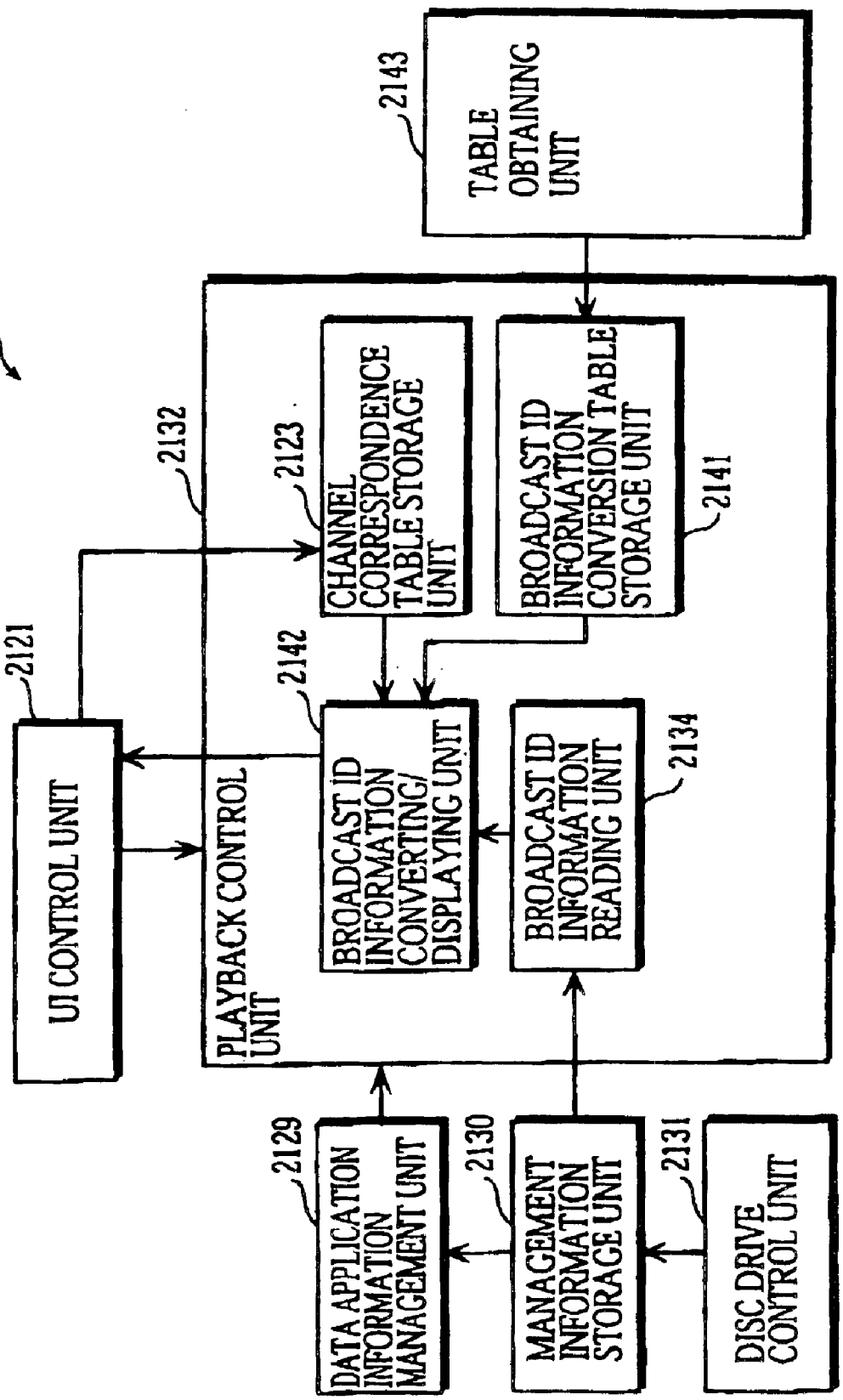
FIG. 21 is a functional diagram for the playback operation of the program recording/playback apparatus 2100 in this second embodiment of the present invention.

FIG. 21 is a diagram showing the functional elements of the program recording/playback apparatus 2100 of this second embodiment that are related to the playback operation. Note that FIG. 21 does not show the functional elements of the program recording/playback apparatus 2100 that are not related to the playback operation.

As shown in FIG. 21, the program recording/playback apparatus 2100 includes a UI control unit 2121, a playback control unit 2132, a data application information management unit 2129, a management information storage unit 2130, a disc drive control unit 2131, and a table obtaining unit 2143 as elements that are related to the playback operation. Note that these functional elements are realized by the CPU 1101 executing control programs that are stored in the memory 1102.

Here, the UI control unit 2121 receives, via the input I/F 1108, a playback indication or a user selection of a program to be played back and informs the playback control unit 2132. On receiving a user indication for the setting of an operation channel number, the UI control unit 2121 asks the user to indicate the correspondence between the operation channel number and a broadcast channel, and updates the channel correspondence table stored in the channel correspondence table storage unit 2123 in accordance with the user indication. When the broadcast ID information converting/displaying unit 2142 in the playback control unit 2132 requests the display of a screen, the UI control unit 2121 outputs the screen image via the input I/F 1108 to the output apparatus 1210. On receiving an indication of a sort code (see FIG. 8) from the user, the UI control unit 2121 informs the table obtaining unit 2143 of the sort code.

The playback control unit 2132 includes a channel correspondence table storage unit 2123, a broadcast ID information converting/displaying unit 2142, a broadcast ID information reading unit 2134 and a broadcast ID information conversion table storage unit 2141. On receiving a playback indication from the UI control unit 2121, the playback control unit 2132 instructs the disc drive control unit 2131 to control the disc drive 1104 to read the management information from the DVD-RAM and store it in the management information storage unit 2130. The playback control unit 2132 displays, via the UI control unit 2121, a list of the programs on the DVD-RAM that can be played back. Also, when a user selection is received, the playback control unit 2132 refers, based on the management information, to an address on the recording medium storing the selected program and performs control to have the program played back.

The broadcast ID information reading unit 2134 is fundamentally the same as the broadcast ID information reading unit 1134 in the first embodiment, but additionally has a function for reading the group and variation as the broadcast ID information and informing the broadcast ID information converting/displaying unit 2142 of the group and variation.

The channel correspondence table storage unit 2123 is the same as the channel correspondence table storage unit 2123 described in the first embodiment, and so is a storage region in a memory or the like, for storing a channel correspondence table (see FIG. 7).

The broadcast ID information conversion table storage unit 2141 is a storage region in a memory, or the like, for storing a broadcast ID information conversion table that is described later in this specification.

The broadcast ID information converting/displaying unit 2142 converts the broadcast ID information composed of the group and variation indicated by the broadcast ID information reading unit 2134 to a suitable display format by referring to the channel correspondence table and the broadcast ID information conversion table. The broadcast ID information converting/displaying unit 2142 adds the result of this conversion to the list of programs which it displays via the UI control unit 2121.

On receiving a sort code that shows the reception condition from the UI control unit 2121, the table obtaining unit 2143 controls the communication apparatus, downloads a broadcast ID information conversion table from a specified apparatus on the network via the telephone line, and stores the downloaded table in the broadcast ID information conversion table storage unit 2141. Note that the table is downloaded from a predetermined address on the network. In the following explanation, the process that downloads the broadcast ID information conversion table is referred to as the broadcast ID information conversion table obtaining process.

Data Construction

FIG. 22 shows the data construction and an example content of the broadcast ID information conversion table that is stored in the broadcast ID information conversion table storage unit 2141 by the broadcast ID information conversion table obtaining process.

As shown in FIG. 22, the broadcast ID information conversion table associates broadcast ID information composed of groups and variations with a broadcast channel composed of a broadcast format and a broadcast channel number.

As a result, the broadcast ID information conversion table makes it possible to specify a broadcast channel from information that identifies the broadcast station.

Operation

The following describes the broadcast ID information conversion table obtaining process performed by the program recording/playback apparatus 2100.

Figure 23:
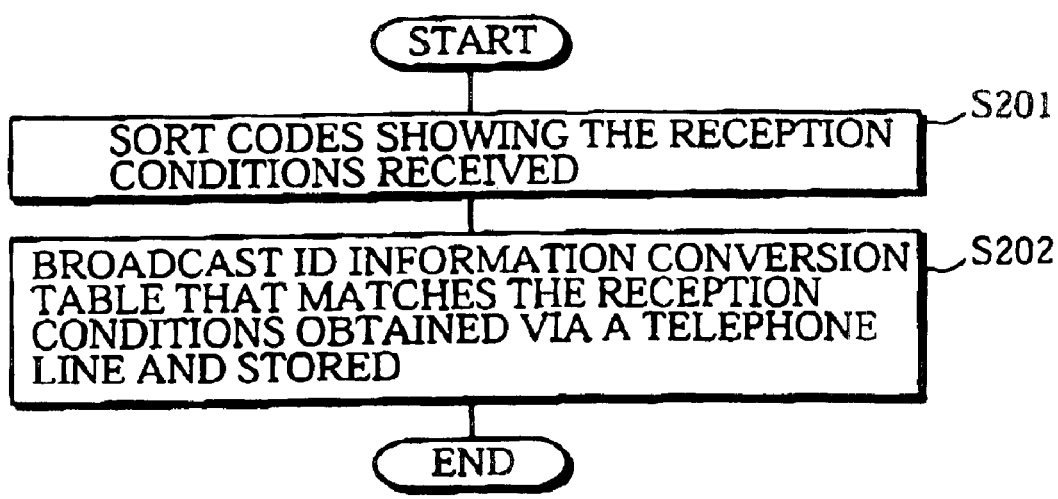
FIG. 23 is a flowchart showing the broadcast ID information conversion table obtaining process performed by the program recording/playback apparatus 2100.

FIG. 23 is a flowchart showing the broadcast ID information conversion table obtaining process performed by the program recording/playback apparatus 2100.

First, the UI control unit 2121 receives a user indication of sort codes via the input I/F 1108, and informs the table obtaining unit 2143 of the sort codes (step S201).

The table obtaining unit 2143 indicates the sort codes and obtains, via a telephone line, a broadcast ID information conversion table that matches the sort codes and reception condition from a specified apparatus on an external network. The table obtaining unit 2143 stores the obtained broadcast ID information conversion table in the broadcast ID information conversion table storage unit 2141 (step S202).

FIG. 22 shows an example of the broadcast ID information conversion table that is obtained when the reception condition is "Osaka area".

The following describes the playback program selection list display process for displaying, as a list of selectable programs, the programs that can be played back by the playback operation of the program recording/playback apparatus 2100.

Figure 24:
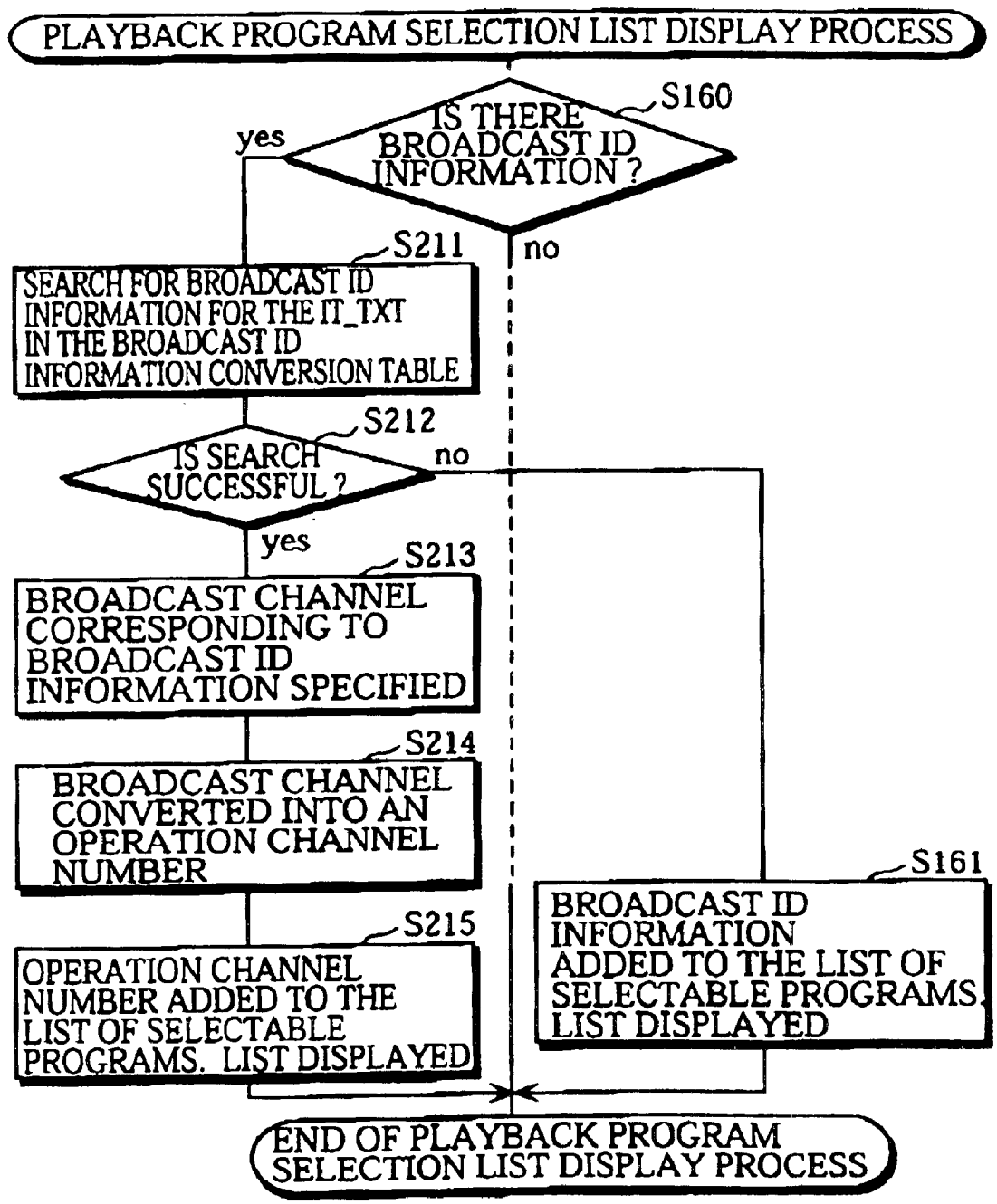
FIG. 24 is a flowchart showing the playback program selection list display process performed when the program recording/playback apparatus 2100 plays back a program.

FIG. 24 is a flowchart showing the playback program selection list display process performed when the program recording/playback apparatus 2100 plays back a program. FIG. 24 only shows the processing that is performed when the "yes" branch is taken in response to the judgement in step S160 of the playback program selection list display process of the first embodiment that was shown in FIG. 16. Note that processing steps that are the same as in the flowchart shown in FIG. 16 are given the same reference numerals in FIG. 24.

When there is broadcast ID information in the IT_TXT in the management information (step S160:Yes), the broadcast ID information reading unit 2134 informs the broadcast ID information converting/displaying unit 2142 of the group and variation which it reads from the broadcast ID information in the IT_TXT. On receiving this indication, the broadcast ID information converting/displaying unit 2142 searches for the group and variation in the broadcast ID information conversion table (step S211).

When the search in step S211 succeeds (step S212:Yes), the broadcast ID information converting/displaying unit 2142 specifies the broadcast channel that corresponds to the group and variation (step S213), specifies the operation channel number from the specified broadcast channel using the channel correspondence table (step S214), and displays a list of selectable programs to which the specified operation channel number has been added (step S215), thereby completing the playback program selection list display process.

When the search in step S211 is not successful, which is to say, the indicated group and variation are not present in the broadcast ID information conversion table (step S212:no), the broadcast ID information converting/displaying unit 2142 displays a list of selectable programs to which the broadcast ID information (i.e., group and variation) has been added (step S161), thereby completing the playback program selection list display process.

Third Embodiment

The following describes a program broadcasting/recording system that is a third embodiment of the present invention.

The program broadcasting/recording system of this third embodiment is used by a broadcaster of programs to multiplex and transmit programs and broadcast ID information and by a receiver of programs to separate the programs and broadcast ID information and record them so that they are related to one another.

Figure 25:
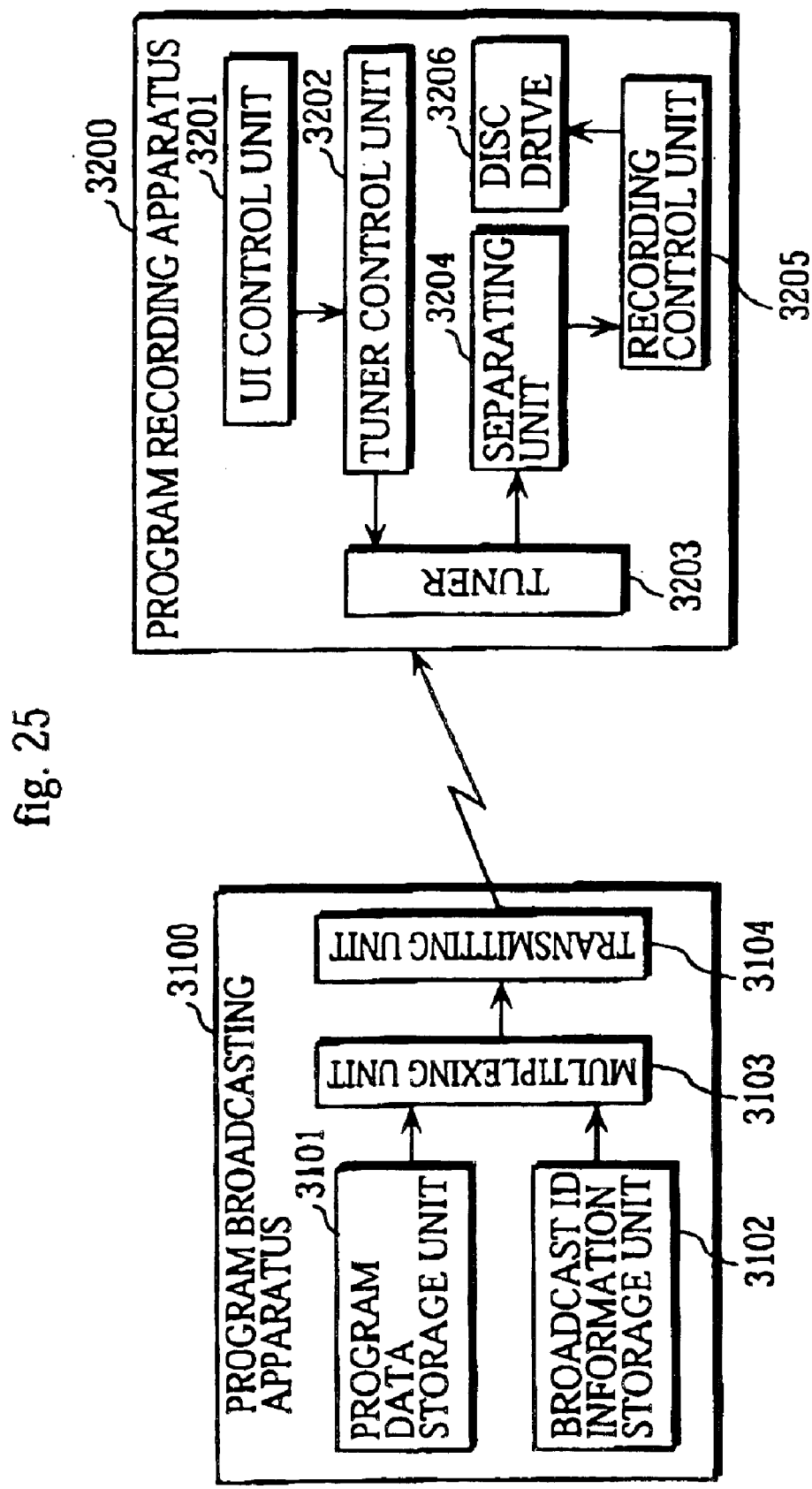
FIG. 25 shows the construction of the program broadcasting/recording system of the third embodiment.

FIG. 25 shows the construction of the program broadcasting/recording system of this third embodiment.

As shown in FIG. 25, the program broadcasting/recording system is composed of a program broadcasting apparatus 3100, which multiplexes and broadcasts programs and broadcast ID information, and a program recording apparatus 3200 that receives and records programs.

The program broadcasting apparatus 3100 includes a program data storage unit 3101, a broadcast ID information storage unit 3102, a multiplexing unit 3103, and a transmitting unit 3104.

The program data storage unit 3101 is a storage apparatus, such as a hard disk drive, that stores video and audio data for one or more programs that are to be broadcast.

The broadcast ID information storage unit 3102 is a storage apparatus, such as a memory, that stores information, like that described in the first embodiment, for identifying television broadcasts. As one example, this information may be broadcast station codes for identifying broadcast stations.

The multiplexing unit 3103 reads and multiplexes the data of a program to be broadcast that is stored in the program data storage unit 3101 and the broadcast ID information stored in the broadcast ID information storage unit 3102. As one example, the multiplexing unit 3103 may multiplex packets including a stream of video data of the program, a stream of the audio data of the program and the broadcast ID information to produce an MPEG2 transport stream which it sends to the transmitting unit 3104.

The transmitting unit 3104 modulates the transport stream received from the multiplexing unit 3103 and transmits it via a broadcast antenna, or the like.

The program recording apparatus 3200 includes a UI control unit 3201, a tuner control unit 3202, a tuner 3203, a separating unit 3204, a recording control unit 3205, and a disc drive 3206. The program recording apparatus 3200 has fundamentally the same hardware as the program recording/playback apparatus 1100 described in the first embodiment relating to reception and recording, but additionally includes the separating unit 3204.

The separating unit 3204 demodulates the signals received by the tuner 3203 and, by controlling a transport decoder for example, separates the data of the program and the broadcast ID information.

On receiving a reception/recording indication from the user via the UI control unit 3201, the program recording apparatus 3200 has the tuner control unit 3202 control the tuner to receive a broadcast signal. The data of the program and broadcast ID information that the separating unit 3204 separates from the received signal are separately recorded onto a DVD-RAM by having the recording control unit 3205 control the disc drive 3206. Note that the recorded data has the same construction as the recorded data described in the first embodiment of the present invention. This means that the data of the program is recorded as AV files such as "vr_movie.vro", while the broadcast ID information is recorded in an IT_TXT that is linked to the program and is included in the management information file "vr_mangr.ifo".

Fourth Embodiment

The following describes a program recording/playback system that is a fourth embodiment of the present invention.

Construction

When recording a program onto a DVD-RAM, the program recording/playback system of this fourth embodiment records recording mode information, which relates to the recording mode, into the management information file "vr_mangr.ifo". When playing back a program from a DVD-RAM, the program recording/playback system uses the recording mode information, such as by displaying the recording mode.

The hardware construction of the program recording/playback system of this fourth embodiment is fundamentally the same as the system described in the first embodiment, though program recording/playback apparatus 4100 in this program recording/playback system newly includes a date/time management construction, including a clock for measuring time and a calendar that spans several years, that can set and obtain the present time.

There are also functional differences between the program recording/playback apparatus 4100 and the program recording/playback apparatus 1100 of the first embodiment.

However, if not specifically described otherwise, the functions of the program recording/playback apparatus 4100 are the same as those of the program recording/playback apparatus 1100. This means, for example, that the program recording/playback apparatus 4100 stores the last recording apparatus information of FIG. 12 in the memory 1102 or another storage area, in the same way as the program recording/playback apparatus 1100.

The following describes the program recording/playback apparatus 4100. Note that the reference numerals used for the hardware components are the same as in the first embodiment.

Figure 26:
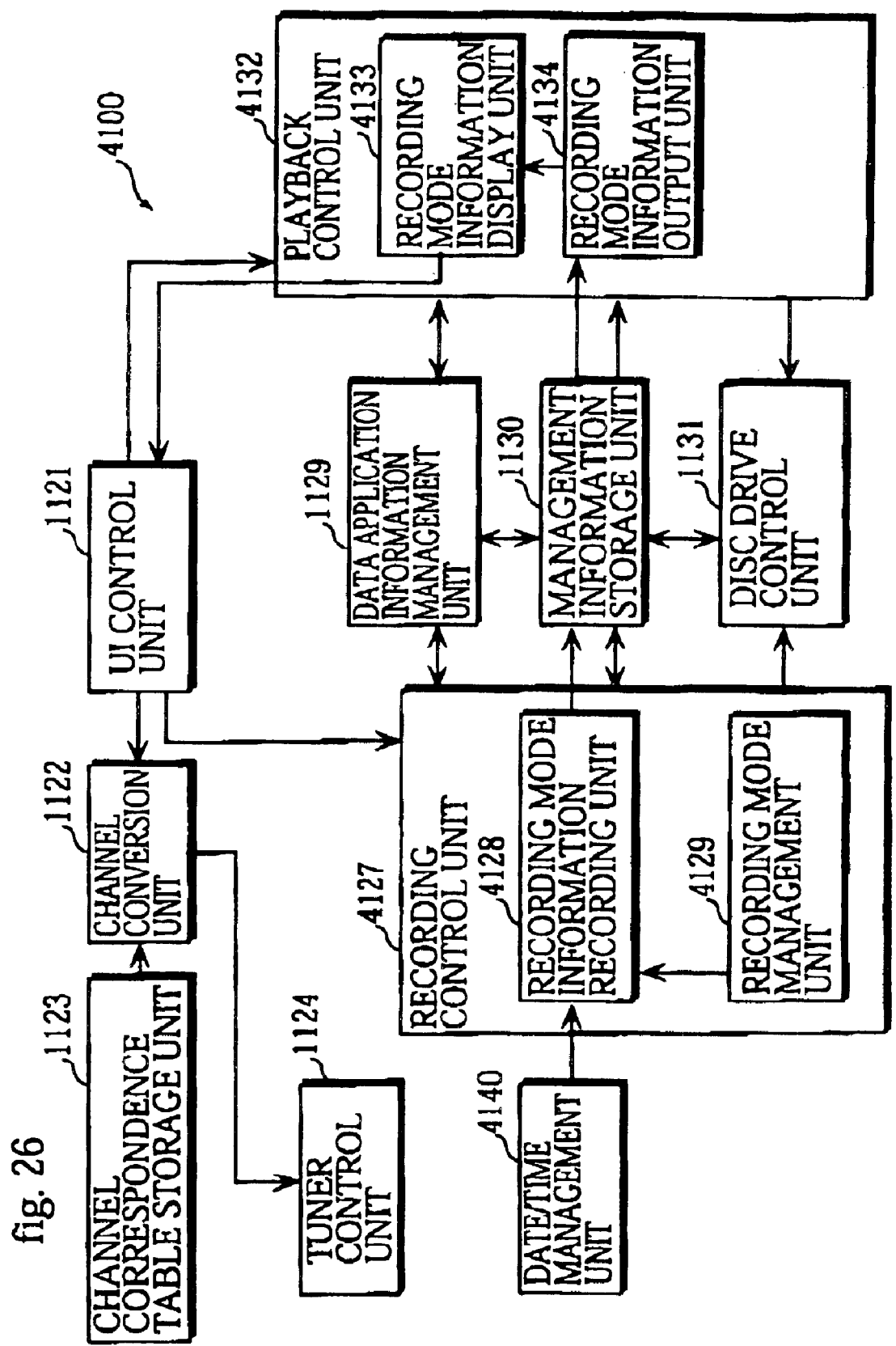
FIG. 26 is a functional block diagram of the program recording/playback apparatus 4100 of the fourth embodiment.

FIG. 26 is a functional block diagram of the program recording/playback apparatus 4100.

As shown in FIG. 26, the program recording/playback apparatus 4100 includes a UI control unit 1121, a channel conversion unit 1122, a channel correspondence table storage unit 1123, a tuner control unit 1124, a date/time management unit 4140, a recording control unit 4127, a data application information management unit 1129, a management information storage unit 1130, a disc drive control unit 1131, and a playback control unit 4132. Components that are the same as those shown in FIG. 3 of the first embodiment have been given the same reference numerals in FIG. 26, and will not be explained.

The date/time management unit 4140 can obtain the present date and time from the date/time management construction.

The recording control unit 4127 has a recording mode management unit 4129 and a recording mode information recording unit 4128. On receiving a recording start indication from the user via the UI control unit 1121, the recording control unit 4127 has the encoder/decoder 1106 encode the video and audio signals outputted by the tuner 1105 and has the AV stream data that results from this encoding (i.e., the program) recorded on the DVD-RAM 1200 by having the disc drive control unit 1131 control the disc drive 1104. When doing so, the recording control unit 4127 also has attribute information, including the recording mode information, for the program recorded in the management information file on the DVD-RAM 1200 via the disc drive control unit 1131. This attribute information is linked to the program. Note that in addition to the recording mode information, the attribute information may include other information such as a time of recording, a genre, and a guide to the program.

The recording mode management unit 4129 stores the recording mode that is presently set in the program recording/playback apparatus 4100. The recording mode management unit 4129 also stores a recording mode table in advance. This recording mode table associates each recording mode with an average bitrate and a character code given in accordance with ASCII or Shift-JIS Standard. Note that the user can switch between recording modes, and that the user's selected recording mode is stored in the recording mode management unit 4129 via the UI control unit 1121. The different recording modes available are described later in this specification.

The recording mode information recording unit 4128 reflects the recording mode information in the IT_TXT that corresponds to the recorded program in the management information.

Note the encoder/decoder 1106 encodes the video and audio signals outputted by the tuner 1105 using a track buffer, and outputs AV stream data. This encoding is performed using variable bitrates, though when examined over a lengthy period, the encoder/decoder 1106 outputs data with an effectively fixed bitrate, the value of which can be set in 0.5 Mbps units.

The recording control unit 4127 finds the bitrate that corresponds to the set value of the recording mode that is stored in the recording mode management unit 4129 and sets this bitrate in the encoder/decoder 1106 as the fixed bitrate. By doing so, the recording control unit 4127 can have the encoder/decoder 1106 encode the video and audio signals outputted by the tuner 1105.

The playback control unit 4132 has a recording mode information display unit 4133 and a recording mode information output unit 4134. On receiving a playback indication from the UI control unit 1121, the playback control unit 4132 controls the disc drive control unit 1131 to read the management information recorded on the DVD-RAM 1200 and store the management information in the management information storage unit 1130. The playback control unit 4132 also has the AV stream data recorded on the DVD-RAM 1200 read out, decoded by the encoder/decoder 1106, and outputted to the output apparatus 1210.

As another function, the playback control unit 4132 has a list of the programs that can be played back displayed on the output apparatus 1210 via the UI control unit 1121. This list is produced based on the management information.

The recording mode information output unit 4134 reads the recording mode information from the management information stored in the management information storage unit 1130. The recording mode information display unit 4133 converts the read recording mode information into a suitable format for display and adds the information to the list of programs that can be played back.

When a DVD-RAM 1200 is inserted in the disc drive 1104, the disc drive control unit 1131 reads the management information file from the DVD-RAM 1200 and stores the management information in the management information storage unit 1130, as well as informing the playback control unit 4132 that a disc has been inserted.

Data Construction

FIG. 27 shows the data construction and an example content of the recording mode table.

As shown in FIG. 27, the recording mode table stored in the recording mode management unit 4129 stores a pair of an average bitrate and a character code for each of the four recording modes that can be set by the user. These recording modes are XP (High Quality), SP (Standard Play), LP (Extended Play), and FR (Free Setting), with the character codes given in the recording mode table identifying the corresponding recording mode.

As examples, the ASCII character code representing XP (High Quality) is "0x58", the character code representing SP (Standard Play) is "0x53", the character code representing LP (Extended Play) is "0x4c", and the character code representing FR (Free Setting) is "0x46".

Note that when the user operates the buttons on the remote controller 1220 to set the recording mode "FR" (Free Setting), the user then has to make a numerical input of the desired average bitrate. The inputted number is sent from the UI control unit 1121 to the recording control unit 4127 and is stored in the recording mode management unit 4129.

FIG. 28 shows the data construction and an example content of the recording mode information that is recorded on a DVD-RAM.

As shown in FIG. 28, the recording mode information is tagged character data that is included in the IT_TXT in the management information on the DVD-RAM. This IT_TXT is composed of an IDCD tag, TXT_SZ showing the size of the text field, and the text field itself. The value of the IDCD tag is set at "0x90" that means "other" in VR standard.

The text field is composed of the following fields: a data application ID; a use; a time; a recording mode; and a bitrate. Note that the content of the text field is not defined by VR standard.

The "Data Application ID" field stores an identifier showing how the data is being applied, which is to say, 9 bytes of character string data that show how the data was recorded. As one example, "dvdvrx010" can be recorded in this field. Here, "dvdvrx" is an abbreviation for "DVD Video Recording Extension" and "010" is the version number.

The "Use" field is used for storing 2 bytes of character string data that shows how the data stored in the other fields is used. In the illustrated case, "BR" is stored as the recording mode information. In this example, "BR" is an abbreviation of "bitrate". By changing the setting of this use field, other information can be linked to programs and stored in the management information.

The "Time" field is a twelve-byte field in which the "VOB_REC_TM" of the VOB (Video Object) corresponding to the recording mode is stored. As one example, the value "20000101000" may be stored in this field. When a program is split into a plurality of VOBs due to the user pressing the pause key during recording or changing the recording mode during recording, the recording mode is set separately for each VOB.

The "Recording Mode" field is a one-byte field that stores a character code corresponding to one of the four recording modes given in the recording mode table. As one example, this field can store the value "0x58" representing the XP (High Quality) mode.

The "Bitrate" field is a three-byte field that stores a character code produced by subjecting the average bitrate corresponding to the set recording mode to a predetermined calculation. When the value stored in this three-byte field is assumed to include the three bytes a, b, and c, and the average bitrate is given as x (kbps), the predetermined calculation will be Equation 1 below if character codes are expressed in ASCII (i.e., seven-bit) format.
Equation 1

$$x=128^2 a+128b+c$$

Equation 1 enables the values of a, b, and c to be found from the average bitrate by calculating quotients and residues when dividing first by 1282 and then by 128.

As one example, when the recording mode is XP (High Quality), a is "0", b is "0x4e" and c is "0x60", so that the value "0x004e60" is stored in the bitrate field.

Note that these items in the text field are stored by the recording mode information recording unit 4128 as character codes in a character format that is indicated by the "CHRS" field in the item text field.

Operation

The following describes the operation of a program recording/playback system of this fourth embodiment that has the construction described above and handles the data described above.

The program recording/playback system performs various operations in response to various indications that the user makes by operating the remote controller 1220. The principal operations are a reception operation that is performed in response to a reception indication, a recording operation performed in response to a recording start operation and recording stop operation, and a playback operation executed in response to a DVD-RAM being inserted into the disc drive and the user giving a playback indication.

When a reception operation is performed, the UI control unit 1121 of the program recording/playback apparatus 4100 receives a reception indication including a user indication of an operation channel number via the input I/F 1108 and informs the channel conversion unit 1122. The channel conversion unit 1122 refers to the channel correspondence table in the channel correspondence table storage unit 1123, specifies the broadcast channel from the operation channel number, and informs the tuner control unit 1124 of this broadcast channel. The tuner control unit 1124 sets the broadcast channel in the tuner 1105, which is to say, the tuner control unit 1124 sets the broadcast format and broadcast frequency to tune the tuner 1105 so that a television broadcast is received. When receiving a television broadcast, the tuner 1105 outputs the video and audio signals of the received program. These signals are transmitted to the output apparatus 1210 via the output I/F 1107, with the output apparatus 1210 displaying the video of the program and outputting the accompanying audio.

The following describes the recording operation performed by the program recording/playback apparatus 4100.

Figure 29:
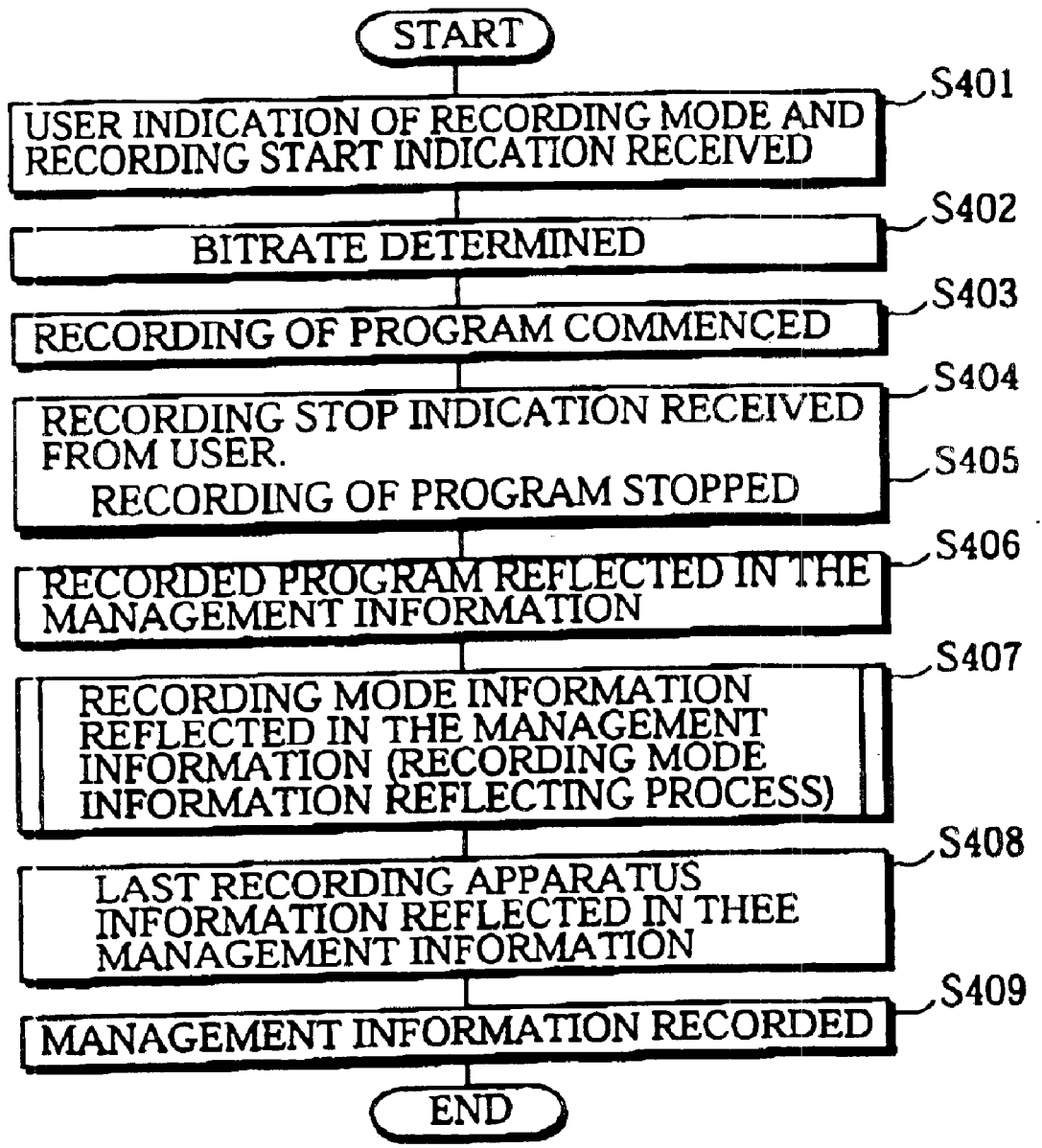
FIG. 29 is a flowchart showing the recording operation performed by the program recording/playback apparatus 4100.

FIG. 29 is a flowchart showing the recording operation performed by the program recording/playback apparatus 4100.

When the user operates the buttons on the remote controller 1220 to set the recording mode and give a recording start indication for a program, the UI control unit 1121 receives this indication (step S401) and informs the recording control unit 1127 of the recording start indication. The recording control unit 1127 stores the recording mode in the recording mode management unit 4129.

On receiving a recording start indication, the recording control unit 4127 obtains the average bitrate from the recording mode table based on the recording mode and sets the average bitrate in the encoder/decoder 1106 as the fixed rate (step S402). Note that when the set recording mode is FR (Free Setting), the recording control unit 4127 sets the bitrate indicated by the user in the encoder/decoder 1106 as the fixed rate.

Once the fixed rate has been set, the recording control unit 4127 controls the encoder/decoder 1106 so as to encode the video and audio signals outputted by the tuner 1105, and outputs an indication for the start of program recording to the disc drive control unit 1131 (step S403).

The disc drive control unit 1131 receives the indication for the start of program recording and controls the disc drive 1104 so as record the AV stream data that results from the encoding onto the DVD-RAM 1200. In this way, the recording of the program starts. Note that the disc drive control unit 1131 reads the management information file "vr_mangr.ifo" when the disc drive 1104 first accesses the DVD-RAM 1200 and stores the management information in the management information storage unit 1130. The disc drive control unit 1131 also searches for the first recordable position on the DVD-RAM 1200 and records the AV file starting at this position.

After this, if the user operates the buttons on the remote controller 1220 and inputs a recording stop indication, the UI control unit 1121 receives this recording stop indication (step S404) and informs the recording control unit 4127 of this indication. On receiving the recording stop indication, the recording control unit 4127 stops the encoding and outputs an indication for the end of program recording to the disc drive control unit 1131. On receiving this indication, the disc drive control unit 1131 controls the disc drive 1104 to stop recording AV stream data (i.e., the program) on the DVD-RAM 1200 (step S405).

After the recording of the program ends, the recording control unit 4127 reflects the address information and attribute data for the AV file corresponding to the program in the management information stored in the management information storage unit 1130 according to VR standard (step S406). The recording control unit 4127 also has recording mode information reflecting process that has the recording mode for the program that has been recorded reflected in the management information executed by informing the recording mode information recording unit 4128 of the PGI number corresponding to the recorded program or the total number of recorded PGIs at present (step S407). In this way, last recording apparatus information is reflected in the management information (step S408).

Once this information has been reflected in the management information stored in the management information storage unit 1130, the recording control unit 4127 instructs the disc drive control unit 1131 to record this management information. The disc drive control unit 1131 controls the disc drive 1104 and records the updated management information onto the DVD-RAM 1200 as "vr_mangr.ifo" (step S409).

The following describes the recording mode information reflecting process of step S407 in detail.

Figure 30:
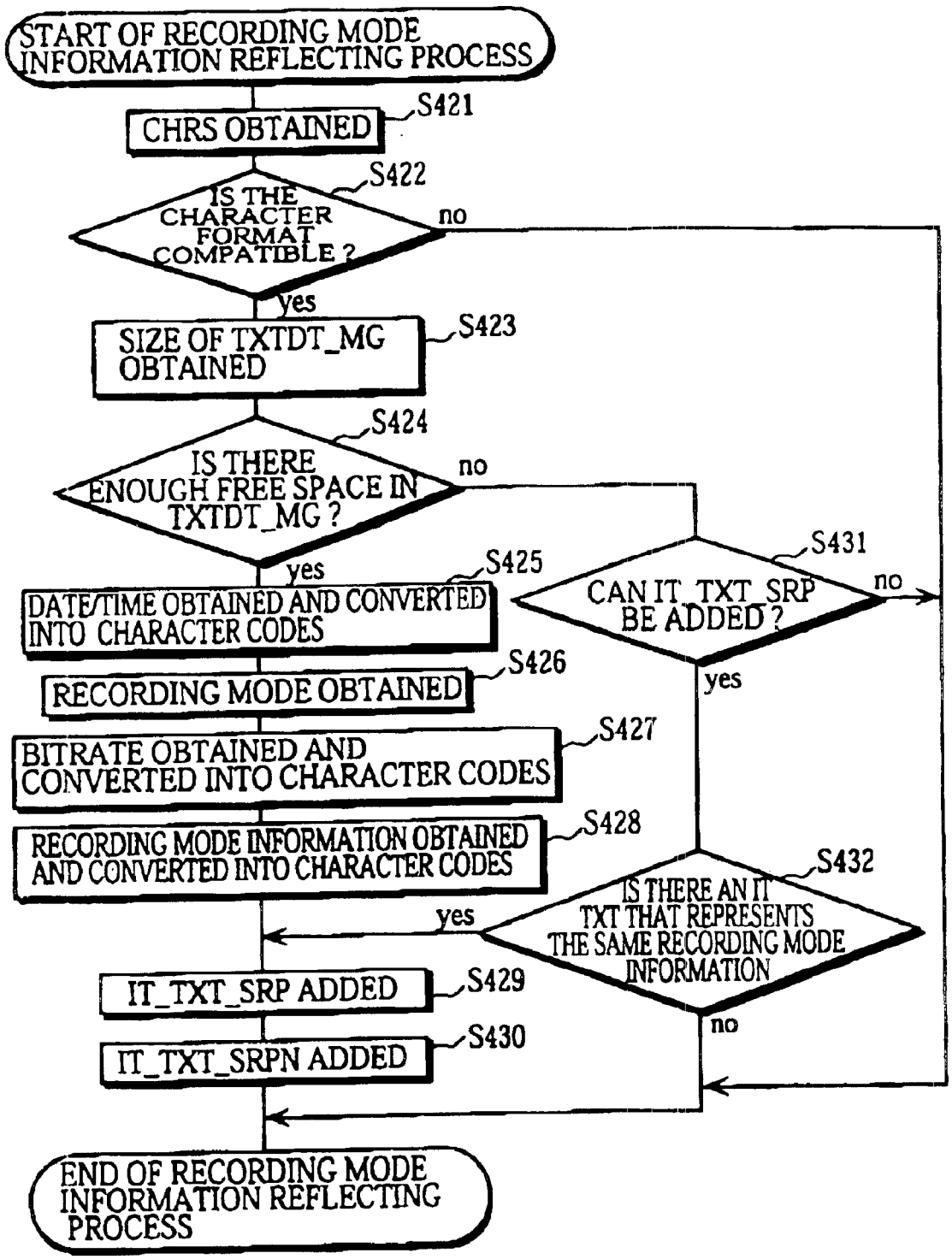
FIG. 30 is a flowchart showing the recording mode information reflecting process performed by the program recording/playback apparatus 4100 when recording a program.

FIG. 30 is a flowchart showing the recording mode information reflecting process performed by the program recording/playback apparatus 4100 when recording a program.

The recording mode information reflecting process is mainly performed by the recording mode information recording unit 4128 that is provided within the recording control unit 4127.

The recording mode information recording unit 4128 obtains CHRS from the management information in the management information storage unit 1130 (step S421) and judges whether it indicates a compatible character format (step S422). More specifically, if CHRS indicates ASCII or Shift-JIS, the recording mode information recording unit 4128 judges that the character format is compatible. On judging that the character format is not compatible in step S422, the recording mode information recording unit 4128 terminates the recording mode information reflecting process.

On judging that the character format is compatible in step S422, the recording mode information recording unit 4128 obtains the size of the item text area (TXTDT_MG) in the management information (step S423).

Since the upper limit on the size of TXTDT_MG is set at 32,768 bytes by VR standard, the recording mode information recording unit 4128 first judges whether there is enough free space in TXTDT_MG to add IT_TXT for the recording format used to record the recording mode information on the DVD-RAM (step S424). In order to add the broadcast ID information to the TXTDT_MG, there needs to be free space of a size equal to the total of the size of the recording mode information shown in FIG. 28 in the proper recording format (i.e., as IT_TXT) and the sizes of IT_TXT_SRP and IT_TXT_SRPN.

On judging that there is enough free space in step S424, the recording mode information recording unit 4128 obtains the date/time from the date/time management unit 4140 and converts it into character codes (step S425). The recording mode information recording unit 4128 next obtains the recording mode that is stored in the recording mode management unit 4129 and obtains the character codes corresponding to this recording mode from the recording mode table (step S426).

The recording mode information recording unit 4128 also refers to the recording mode table to obtain the average bitrate or, in the case of the recording mode FR (Free Setting), obtains the bitrate that was inputted by the user and stored. Using the calculation shown above as Equation 1, the recording mode information recording unit 4128 converts the obtained bitrate into character codes (step S427). The recording mode information recording unit 4128 converts this information to generate an IT_TXT which is the recording mode information given in the appropriate recording format, and has this IT_TXT reflected in the management information (step S428).

As a result, the tagged character data shown in FIG. 28 can be stored in the IT_TXT in the management information in the management information storage unit 1130.

After generating the IT_TXT, the recording mode information recording unit 4128 adds an IT_TXT_SRP corresponding to this IT_TXT in the management information (step S429), and adds an IT_TXT_SRPN for the PGI of which it is informed by the recording control unit 4127 to the management information (step S430).

On judging that there is insufficient free space in step S424, the recording mode information recording unit 4128 judges if there is enough free space to add the IT_TXT_SRP and IT_TXT_SRPN to the TXTDT_MG without adding IT_TXT (step S431). If this judgement is negative, the recording mode information recording unit 412B ends the recording mode information reflecting process without reflecting the recording mode information in the management information.

On judging that there is enough free space in step S431, the recording mode information recording unit 4128 searches the TXTDT_MG in the management information to see whether an IT_TXT that indicates the recording mode information that the recording mode information recording unit 4128 wanted to reflect in the management information is already present (step S432). If present, the recording mode information recording unit 4128 adds an IT_TXT_SRP and IT_TXT_SRPN corresponding to the IT_TXT to the management information (steps S429, S430). On finding that the IT_TXT is not present in step S432, the recording mode information recording unit 4128 ends the recording mode information reflecting process.

The following describes the playback operation performed by the program recording/playback apparatus 4100.

Figure 31:
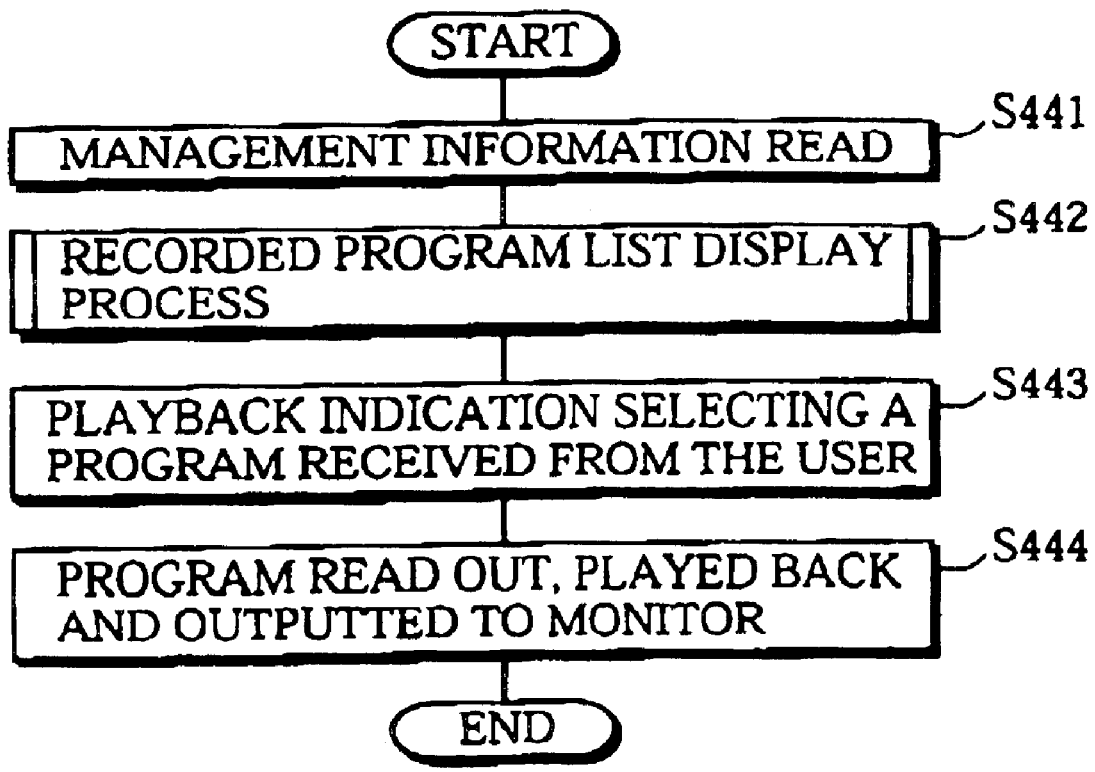
FIG. 31 is a flowchart showing the playback operation performed by the program recording/playback apparatus 4100.

FIG. 31 is a flowchart showing the playback operation performed by the program recording/playback apparatus 4100.

When a DVD-RAM 1200 is inserted in the disc drive 1104, the disc drive control unit 1131 controls the disc drive 1104 to read the management information file from the DVD-RAM 1200 and store the management information in the management information storage unit 1130, in addition to informing the playback control unit 4132 that a disc has been inserted (step S441).

On being informed of the insertion of a disc, the disc drive control unit 1131 performs the recorded program list display process that displays, based on the management information, a list of programs that are recorded on the DVD-RAM 1200 on the output apparatus 1210 (step S442).

When the user views this list and operates the buttons on the remote, controller 1220 to select a program to be played back and to input a playback indication, the UI control unit 1121 of the program recording/playback apparatus 4100 receives the user's playback indication via the input I/F 1108 and informs the playback control unit 4132 of the selected program and the playback indication (step S443).

On being informed of the selection and the playback indication, the playback control unit 1132 obtains the address information of the AV file corresponding to the selected program from the management information and has the disc drive control unit 1131 control the disc drive 1104 so as to read out the AV stream data composing this AV file from the DVD-RAM 1200. The playback control unit 1132 has the read AV stream data decoded by the encoder/decoder 1106 and the video and audio streams produced by the decoding outputted via the output I/F 1107 to the output apparatus 1210 (step S444). This enables the user to watch the selected program on the output apparatus 1210.

Figure 32:
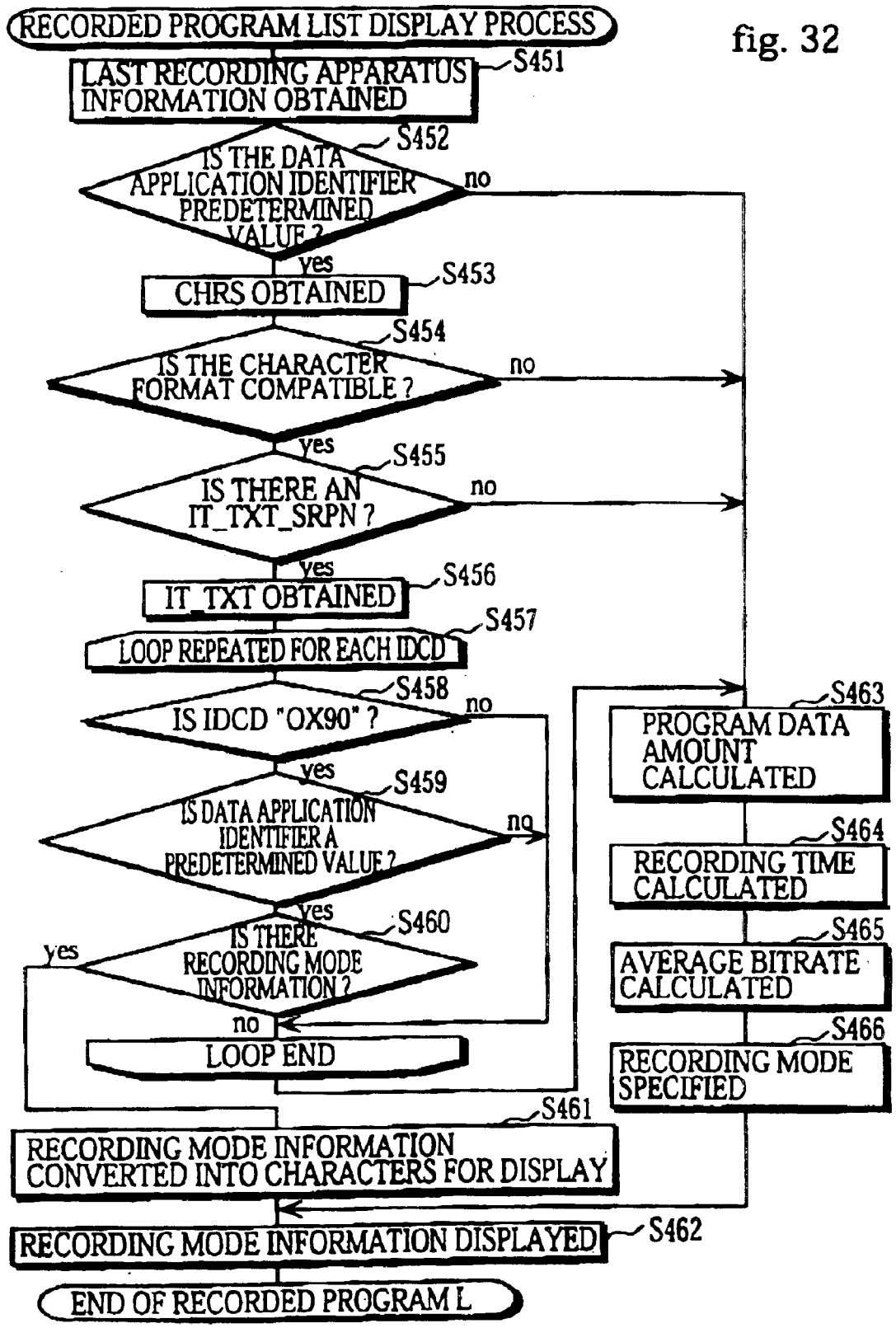
FIG. 32 is a flowchart showing the recorded program list display process performed when the program recording/playback apparatus 4100 performs the playback operation.

FIG. 32 is a flowchart showing the recorded program list display process performed when the program recording/playback apparatus 4100 performs the playback operation.

The playback control unit 4132 refers to the management information that has been read from the DVD-RAM 1200 and stored in the management information storage unit 1130, and obtains the last recording apparatus information from the LAST_MNF_ID (step S451). The playback control unit 4132 then judges whether the first nine bytes of the last recording apparatus information match a data application ID of the last recording apparatus information that is stored in the program recording/playback apparatus 4100 in advance for comparison purposes (step S452).

When the data matches, the playback control unit 4132 obtains the CHRS from the management information (step S453).

The recording mode information output unit 4134 in the playback control unit 1132 judges whether the character format shown by CHRS is compatible (step S454). If so, the recording mode information output unit 4134 judges whether there is an IT_TXT_SRPN (step S455). Note that when a plurality of programs are recorded on the disc, the processing in steps S455 to S462 is performed for each PGI corresponding to a program.

On judging in step S455 that an IT_TXT_SRPN is present, the recording mode information output unit 4134 obtains a set of tagged character data for an IT_TXT (step S456) and performs the procedure composed of steps S458 to S460 for each of the tags (step S457).

First the recording mode information output unit 4134 judges whether the IDCD is "0x90" (step S458).

On judging in step S458 that the IDCD is "0x90" which means "other" under VR standard, the recording mode information output unit 4134 judges whether the first nine bytes of the text field corresponding to this IDCD tag are equal to a predetermined value (step S459). In other words, the recording mode information output unit 4134 judges whether the first nine bytes match the data application ID in the last recording apparatus information stored in advance in the program recording/playback apparatus 4100 for comparison purposes.

On judging in step S459 that a predetermined data application ID is stored in the text fields, the recording mode information output unit 4134 judges whether the two bytes following the data application ID in the text field are "BR" (step S460).

On judging in step S458 that the IDCD field is not "0x90", on judging in step S459 that the predetermined data application ID is not stored in the text field, or on judging in step S460 that "BR" is not stored, the recording mode information output unit 4134 moves onto judging the next IDCD if another IDCD is present, or advances to step S463 if no other IDCD is present.

On judging in step S452 that the data application ID does not match, on judging in step S454 that the character format is not compatible, or on judging in step S455 that there is no IT_TXT_SRPN, the recording mode information output unit 4134 performs the processing in step S463.

In step S463, the recording mode information output unit 4134 calculates the size of the program indicated by PGI#n (step S463). The data size of this program is found from the number of packs (VOBU_SZ) of the AV streams indicated by PGI#n in the management information. Since each pack is 2,048 bytes long, the size is found through multiplication.

Following step S463, the recording mode information output unit 4134 finds the total playback time of PGC#n in seconds by calculating the total playback time of the cells that belong to PGI#n (step S464). The recording mode information output unit 4134 then divides the data size of the program that has already been calculated by this total playback time to obtain the average bitrate (step S465).

The recording mode information output unit 4134 then rounds the calculated bitrate up or down to the nearest integer to round the calculated average bitrate to a value corresponding to one of XP (High Quality), SP (Standard), or LP (Extended Play).

When the calculated average bitrate can be rounded to such a corresponding value, the recording mode information output unit 4134 informs the recording mode information display unit 4133 of the corresponding recording mode, br otherwise informs the recording mode information display unit 4133 of the recording mode FR (FreeSetting) (step S466). On receiving this indication, the recording mode information display unit 4133 adds the recording mode to the list of programs which is displayed via the UI control unit 1121 on the output apparatus 1210 (step S462). This completes the recorded program list display process.

When, in step S460, the two bytes following the data application identifier in the text field are judged to indicate "BR", this means that recording mode information is recorded, so that the recording mode information output unit 4134 reads the recording mode information and informs the recording mode information display unit 4133. On being informed of the read recording mode information, the recording mode information display unit 4133 converts the recording mode information into a suitable format for display (step S461), adds the converted recording mode to the program list, and has the program list displayed via the UI control unit 1121 on the output apparatus 1210 (step S462), thereby completing the recorded program list display process.

The recorded program list display process has the output apparatus 1210 display a screen showing a list of programs recorded on the DVD-RAM 1200 that can be selected for playback. In this case, each program is displayed together with its recording mode.

Supplementary Information

While the recording apparatus and playback apparatus of the present invention have been described by means of the embodiments given above, it should be obvious that the present invention is not limited to the details given therein. Various modifications are possible, with several representative modifications being given below.

(1) The above embodiments describe an example of a program recording/playback apparatus that has a function for receiving a program and recording it onto a recording medium, and a function for playing back programs recorded on a recording medium. However, the reception of a program, the recording of the program, and the playing back of the program do not need to be performed by a single apparatus.

The recording and/or playback apparatuses of the present invention can therefore each be realized by devices that are equipped with one or more of the above functions.

However, the construction that records broadcast ID information or recording mode information onto a recording medium and the construction that reads broadcast ID information or recording mode information from a recording medium and uses the read information need to correspond to one another. As one example, an apparatus that only records programs and cannot play back programs can be equipped with a function for recording broadcast ID information or recording mode information for a program, with this information being read and used by a dedicated playback apparatus.

(2) In the above embodiments, a DVD-RAM is used as the recording medium for recording programs and management information. As alternatives, other optical discs, magneto-optical discs, tapes, semiconductor memory and other recording media that are rewritable may be used. After recording on a recording medium that is a hard disk drive or a memory, a program and broadcast ID information or recording mode information may be transmitted via a communication network to a playback apparatus that is capable of playing back the program.

(3) The concept of a broadcast station that is a source of a television broadcast in the embodiments may be interpreted as referring to (i) a separate entity for each television broadcast or to (ii) an entity that is capable of broadcasting a plurality of television broadcasts on different frequencies. In the former case, information that identifies one out of a plurality of broadcast stations can be used to identify one television broadcast out of a plurality of television broadcasts made by the plurality of broadcast stations. In the latter case, information that identifies a given broadcast station out of a plurality of broadcast stations can be used to identify one out of the plurality of television broadcasts made by the given broadcast station.

(4) In the above embodiments, the broadcast ID information or recording mode information is recorded in IT_TXT in the management information in accordance with VR standard, so that the value of the IDCDtag is "0x90". Alternatively, a value that is "reserved" in VR standard (i.e., a value whose meaning has not been defined) may be used. However, when a reserved value is used, this may lead to problems if this reserved value is defined by a later revision of VR standard. Accordingly, it is preferable to use the value "0x90" that is already defined as "other", as shown in the above embodiments.

It is also possible to extend the VR standard and define an IDCD value for a manufacturer extension. Also, the size may be set as a fixed value, in which case the "TXT_SZ" field becomes unnecessary. An IDCD value for a manufacturer extension may be defined separately by each manufacturer, or a single IDCD value may be used, with a following field for identifying each manufacturer also being defined.

In addition to setting an IDCD tag at "0x90" and recording the broadcast ID information on a DVD-RAM in the format shown in FIG. 10, a program recording/playback apparatus may record information in another text field corresponding to an IDCD tag set at "0x60". The information recorded here is taken from the broadcast ID information and is converted into a readily understandable character string, such as "Satellite 11" showing the eleventh satellite channel. By doing so, it becomes possible for other manufacturers' apparatuses that are not compatible with the application format given as "dvdrx010" to display information relating to the television broadcasts for "Satellite 11".

(5) Before playing back a program, the above embodiments display a list of programs that can be played back, together with broadcast ID information or recording modes. However, the apparatus may first receive a user selection of a program and then display the corresponding broadcast ID information or recording mode on part of the screen image on the output apparatus 1210. Alternatively, the broadcast ID information etc. may be displayed during the playback of the selected program. A program recording/playback apparatus or playback apparatus may be equipped with its own display component, which it uses to display the broadcast ID information or recording mode during playback of a program.

The technology described in the fourth embodiment may be combined with any of the first to third embodiments. This results in a program recording/playback apparatus that is capable of (i) recording a program onto a DVD-RAM together with recording mode information and broadcast ID information, and (ii) reading and using (such as for display) the recording mode information and broadcast ID information on a DVD-RAM.

(6) The program recording/playback apparatuses described in the embodiments receive television broadcasts composed of video and audio and record the programs onto a recording medium. The programs that are received and recorded may be composed of only video, only audio, or other types of data. Also, the images composing a program may be still images instead of video. When the received programs have been subjected to compression and/or encoding, the program recording/playback apparatus may have a decoder subject the output of the tuner 1105 to a corresponding decryption and/or decoding, and may have the result outputted to the output apparatus 1210 or encoded into a suitable format for recording onto a DVD-RAM.

(7) In the above embodiments, the program recording/playback apparatus is connected to both an antenna and a cable TV cable. However, the program recording/playback apparatus may be connected to only one of these, and may be connected to only an antenna for terrestrial waves or only an antenna for satellite broadcasts. Furthermore, the reception condition may be set in accordance with the type or types of antenna to which the program recording/playback apparatus is connected.

The broadcast format of the broadcasts received and recorded by the program recording/playback apparatus is not restricted to analog broadcasts, such as analog terrestrial broadcasts. Digital broadcasts may also be received.

Note that with digital broadcasting, a plurality of television broadcasts can be multiplexed on a single frequency. In this case, the broadcast channel number should be capable of identifying a single television broadcast by specifying a frequency and the intended television broadcast on that frequency.

The program recording/playback apparatus should include a tuner and an apparatus, such as a transport decoder, for separating a specified television broadcast. The tuner control unit should also include a table for finding, from a broadcast channel number, (1) a frequency and (2) an ID for specifying a television broadcast out of the plurality of television broadcasts multiplexed on that frequency.

Based on this table, the tuner control unit specifies the frequency to be received and has the tuner receive multiplexed television broadcasts, in addition to setting an ID specifying the desired television broadcast in the transport decoder. This results in the desired television broadcast being separated from the received television broadcasts.

The tuner provided in the program recording/playback apparatus may be dedicated to the reception of a specific broadcast format, such as terrestrial waves. In this case, the broadcast format given in the broadcast ID information may be fixed as indicating this specific broadcast format.

The television broadcasts that can be indicated may be limited to a single broadcast format, in which case information relating to the broadcast format can be omitted from the broadcast ID information. As one example, only television broadcasts made in Japan using terrestrial waves may be indicated, so that the broadcast ID information can be based a pair of a reception area and a broadcast frequency or broadcast channel number corresponding to a broadcast frequency. In other words, in this case a broadcast channel can be made up of a broadcast channel number only.

(8) In the above embodiments, the user was described as inputting indications into the program recording/playback apparatus via a remote controller 1220 that emits infrared rays. The remote controller is not limited to using infrared rays, and user indications may be transmitted to the program recording/playback apparatus using radio waves. The program recording/playback apparatus may include an input device such as a keyboard and/or mouse, with the user indications being received via this input device.

(9) The sort codes described in the above embodiments may be any readily understandable information for indicating a reception area. As one example, a telephone area code corresponding to the reception area may be used.

(10) In the above embodiments, an operation channel number is used when a reception indication is received from the user. This operation channel number corresponds to a pair of a broadcast format and a broadcast channel number. Alternatively, when making a reception indication, a user may indicate a channel number having selected a classification such as a broadcast format or external input source in advance. In this case, the channel correspondence table may associate this channel number with a broadcast channel number for each of the classifications that-can be selected.

The user may directly input the broadcast format and broadcast channel number, in which case a channel conversion unit and related components for converting an operation channel number to a broadcast channel do not need to be provided. If the broadcast format is fixed, the user may directly input the broadcast channel number, in which case the program recording/playback apparatus receives a television broadcast that is broadcast on a frequency corresponding to this broadcast channel number, and then records the program for the television broadcast on a DVD-RAM together with broadcast ID information that is specified from the broadcast channel number, reception condition, and the like.

(11) In addition to the described operations, the program recording/playback apparatuses described in the embodiments may operate in the same way as an ordinary digital video recorder. As one example, when the user indicates that a program recorded on a DVD-RAM should be deleted, the program recording/playback apparatus may obtain, from the PGI in the management information, the address information for the AV file of the program to be deleted and then delete the AV file and the IT_TXT that is linked to the PGI of this program. As a result, any broadcast ID information and recording mode information that was recorded with the program will also be deleted from the DVD-RAM.

(12) The above embodiments describe an example when the nine bytes "dvdrx010" are used as the data application identifier when recording broadcast ID information and recording mode information, though any other value may be used. The length of the value is also not limited to nine bytes.

Note that while the lower three bytes of the nine bytes were described as being used to show a version number "010", the version number "011" may be used in place of "010" in a different data construction for the broadcast ID information. The program recording/playback apparatus records broadcast ID information in accordance with a format that depends on whether the version number is "010" or "011".

When the value "dvdrx010" is recorded as the data application identifier of the last recording apparatus information in the LAST_MNF_ID in the management information on the DVD-RAM, the program recording/playback apparatus may record the broadcast ID information in accordance with the format "010" that is already recorded on the disc, out of the two formats corresponding to the version numbers "010" and "011" that can be used.

For reproducing data, procedures that correspond to the different read positions used for different version numbers may be defined. The procedure used to read broadcast ID information from a DVD-RAM can be selected in accordance with the version number shown by the data application identifier.

Note that the data construction for the internal application area in the last recording apparatus information described in the embodiments, may be freely defined in accordance with the content of the internal application area. As one example, while manufacturers need to use the data construction shown in FIG. 12 for the internal application area in accordance with the application format shown by a data application identifier such as "dvdvrx010", different values can be used by different manufacturers in the internal application area.

It is also conceivably possible for different manufacturers to use data constructions for the internal application area that are completely different to the data construction shown in FIG. 12 when the application format is shown by a different data application identifier.

Note that the external application area may be located at the end of the last recording apparatus information. Also, by extending VR standard, a new area for recording the data application identifier may be defined in the management information. A program recording/playback apparatus may refer to this data application identifier and read or record broadcast ID information or recording mode information in the application format shown by the data application identifier.

The data application identifier symbolically shows the application format of data and should preferably not be an ordinary noun. While the size of this field is large, this helps prevent conflicts with other manufacturers when other application methods are used. Note that a manufacturer may disclose the data application identifier and the application format it represents to other manufacturers to prevent conflicts. An authority for exclusively assigning different data application identifiers to different manufacturers may also be used.

In the above embodiments, "BC" or "BR" is given as the content of the use field. This field is not limited to the character strings "BC" and "BR", and such character string showing the use may be omitted when the application format specified by a specific data application identifier only has one possible value. The use field may have the minimum data size for indicating the possible settings of the use.

In the recording format for recording broadcast ID information or recording mode information, the data construction of the other items that follow the data application identifier only need to conform to the application format shown by the data application identifier. Note that the example data constructions shown in FIGS. 10 and 28 conform to the application format indicated by "dvdvrx010".

(13) In the above embodiments, the broadcast ID information may also be recorded in the IT_TXT corresponding to each VOB in the same way as the recording mode information. This is effective when there is a switch of channel, such as when the user gives an indication to change the broadcast channel during a pause in recording. In other words, since a recorded program is divided into VOBs by a pause, it is effective to store date/time information for each VOB in the IT_TXT, and so store a plurality of sets of broadcast ID information for the same PGI.

When a user gives a pause indication during recording and then changes channels, a program recording/playback apparatus may record the AV streams of the new program so as to correspond to a different PGI.

(14) In the above embodiments, when broadcast ID information or recording mode information is stored in the tagged text field in the management information so as to correspond to a program, the broadcast ID information or recording mode information was described as being stored as character information in ASCII format or Shift-JIS format. In the embodiments, the suitable character information is stored in the broadcast ID table or in the recording mode table.

However, in order to record broadcast ID information or recording mode information in a character format corresponding to a different format that is indicated by CHRS in the management information, information expressed in the other character format may also be included in the broadcast ID table or recording mode table.

(15) The above embodiments describe an example where the broadcast ID information and recording mode information is stored in an item text area that is defined as having a construction, according to VR standard, that is linked to the program. However, a primary text area may be used instead. In this case, the broadcast ID information and the like that are stored in the primary text area may be displayed as simple character strings by program recording/playback apparatuses produced by other manufacturers, and in the worst possible scenario may be altered by users. However, in VR standard, the primary text area is divided into former and latter parts, so that such display and/or alteration are both thought unlikely. This is because while the former part of the primary text area is a fixed character code (ASCII code), the character code of the latter part can be defined and so is more useful. In Japan, for example, the latter part is used often so that Shift-JIS can be used, with the former part being used for arranging the broadcast ID information and the like. In this case, the IDCD and TXT_SZ are not required, though a data application identifier is necessary. Control codes such as line break codes are prohibited in VR standard, so that the recording format of the broadcast ID information and other information needs to be set without using such control codes.

(16) In the above embodiments, if the broadcast ID information and recording mode information are correct, the procedures shown in FIGS. 16 and 32 that read and use (e.g., displays) the information are mere examples. As example modifications, the procedures may include an additional process that checks the TXT_SZ and judges whether the size is below nine bytes. The process referring to the last recording apparatus information may be omitted.

(17) In the first embodiment, the size of the country field in the recording format of the broadcast ID information on a DVD-RAM was described as being three bytes, though any size that is sufficient for identifying different countries may be used. When, depending on the content of the other fields, an area in the country field for identifying each broadcast station is larger than a single country, a collective term indicating the countries may be used. Alternatively, when the area is smaller than a country, the country field may be divided and a country and region may be stored.

The recording format used to record broadcast ID information onto a DVD-RAM contains three variable-length fields, so that two fields showing the sizes of the variable-length fields are provided and used in conjunction with TXT_SZ to show the size of each of the variable-length fields. However, the variable-length fields whose sizes are stored may be changed, and a field storing a size value for all the variable-length fields may be provided. The arrangement of these fields can also be changed freely.

(18) When the provisional broadcast ID information described in the first embodiment is long, it may be displayed having been divided into sections of a suitable size. Since there is the risk of such division dividing a two-byte character into two, which can lead to a display of garbled characters, a judgement may be performed to check that the last byte to be displayed is not a former byte of a two-byte code. When this is the case, a character code for a space or a "NULL" indication may be inserted.

(19) In the first embodiment, the program recording/playback apparatus 1100 records broadcast programs that have been received via a tuner onto a DVD-RAM. However, the program recording/playback apparatus 1100 may encode video and audio signals that are inputted from an external tuner or an appliance, such as a video recorder, that can output video and audio signals, and may record the resulting AV streams onto a DVD-RAM. When a program inputted from the periphery is recorded on a DVD-RAM, the broadcast ID information can include a predetermined content, such as the broadcast station code "0x0000" and the broadcast station name "external input", to show that the program was inputted from the periphery.

(20) In the first embodiment, the reception operation and recording operation are described as being sequentially performed as a reception/recording operation that is illustrated in FIG. 13. This reception/recording operation may be commenced by a timer that is set in advance or by the reception of a reception indication, in which case recording starts as soon as a broadcast signal is received.

Since recording starts as soon as a broadcast signal is received in response to a reception indication, the tuner may be provided with a function for indicating that that the reception of the broadcast signal has stabilized following a switch to the frequency being received. Once the tuner control unit receives this kind of indication, the program recording/playback apparatus may perform the same processing as when a recording start indication has been received. When a maximum time is set for the stabilization of the tuner following a switch in the received frequency, the program recording/playback apparatus may perform the same processing as when a recording start indication has been received at a point this maximum time after the tuner control unit instructs the tuner to receive a broadcast signal.

When recording is controlled by a timer, the program recording/playback apparatus receives user settings of the recording start date/time, recording end time, and operation channel number in advance. Just before the recording start date/time is reached, the program recording/playback apparatus then performs the same processing as when a reception indication is received, when the actual recording start date/time is reached, the program recording/playback apparatus performs the same processing as when a recording start indication is received.

(21) In the first embodiment, the program recording/playback apparatus searches the broadcast ID table using the reception condition, broadcast format, and broadcast channel number to specify the broadcast station code. As an alternative, the user may directly input the broadcast station code or broadcast station name in accordance with rules that are set in advance by the operation manual, for example. The broadcast station code or broadcast station name directly inputted in this way can then be recorded on the recording medium in association with the program as the broadcast ID information.

(22) In the first embodiment, the broadcast station code is specified from the reception condition and broadcast channel using the broadcast ID table. However, the broadcast station code may be found from the sort codes showing the reception condition and broadcast channel by performing a special calculation. As one example of this calculation, when the sort code is "12" and the broadcast channel is "Channel 10" for the broadcast format "TA" (analog terrestrial waves), the broadcast station code may be "12TA10".

(23) In the first and second embodiments, the broadcast ID information is displayed as a broadcast station name, a broadcast format and broadcast channel number or as a group, a variation and an operation channel number. However, these are mere examples of the display format, and any other information that enables the user to specify the broadcast may be displayed. As one example, only the broadcast station name may be displayed. Instead of using the codes "TA", "BA", and "CA", the broadcast format may be displayed using character strings such as "terrestrial waves", "satellite broadcast" and "cable TV". When the broadcast ID information is displayed, information such as the genre and title of the corresponding program or the time/date of recording may also be read from the management information and added to the display.

The broadcast ID information recorded on a DVD-RAM by the program recording/playback apparatus does not need to have the content shown in FIG. 10, and any of (i) a broadcast station code, (ii) a broadcast station name, (iii) a set of a broadcast channel and sort codes (or the like) showing the reception condition, would be sufficient. In place of sort codes that show the reception condition, a character string showing the reception area or a character string showing the name of a cable TV service to which the user has subscribed can be used.

If it is not necessary to specify the broadcast format for a broadcast channel, only the broadcast channel needs to be specified. The broadcast station names can be any names that indicate the broadcast stations, though it is preferable to define, as the broadcast station names, character strings that are used in the broadcast ID table to identify each broadcast station in advance.

As one example, when only broadcast station codes are used as the broadcast ID information recorded on a DVD-RAM, the apparatus that plays back the programs recorded on the DVD-RAM should store a correspondence table that enables the apparatus to find the broadcast station name, reception area, and broadcast channel etc. from the broadcast station code. The apparatus may display the broadcast station name etc. found using this correspondence table to the user.

(24) In the second embodiment, the pair of a group and variation composing the broadcast ID information that is read from the management information on a DVD-RAM is used when searching the broadcast ID information conversion table to specify the broadcast channel (steps S211 to S213 in FIG. 24). However, when there is no match for the variation, the broadcast channel may be specified from entries in the broadcast ID information conversion table that have a matching group.

The group and variation do not need to have a two-level construction, so that the broadcast ID information may be constructed with a higher number of levels. In the search performed in S211, the broadcast ID information matching table may be searched in order from the highest level to the lowest level and the entry with the highest number of matching levels may be found. The multilevel construction may be determined in advance with this search in mind. When displaying the result, the operation channel number corresponding to the broadcast channel specified by the search may be identified from the channel correspondence table and displayed. Alternatively, when a multilevel search is performed for groups and variations or the like, matching entries may be displayed up to the level where their content matches the key information used for the search.

(25) The program recording/playback apparatus 2100 of the second embodiment is described as downloading the broadcast ID information correspondence table from an apparatus that has a predetermined address on an external network. However, the address of the apparatus may be inputted by a user. The downloading may be performed according to a predetermined schedule, such as when the program recording/playback apparatus 2100 is initially set up and at certain intervals thereafter.

In the same way as the broadcast ID information conversion table, the program recording/playback apparatus described in the first embodiment may obtain the broadcast ID table from an external network. When this is the case, the broadcast ID table obtained from the external network may show television broadcasts that correspond to various settings of the reception condition, or may show only the relevant information for the reception condition set in the program recording/playback apparatus.

Also, the broadcast ID information conversion table described in the second embodiment may be generated by extracting information that matches a set reception condition from the broadcast ID table described in the first embodiment.

(26) In the third embodiment, the broadcast ID information is broadcast having been multiplexed with a corresponding program. The program recording/playback apparatus separates the program and broadcast ID information and records them in an interrelated manner onto a recording medium. However, the program recording/playback apparatus may record the program and broadcast ID information on the recording medium in the multiplexed an state in which they are broadcast. In this case, during playback an apparatus that plays back programs separates the broadcast ID information and uses it when displaying a selection list of programs, for example.

(27) In the fourth embodiment, the remote controller 1220 may include a recording mode switching button for allowing the user to switch the recording mode. By pressing this button, the user can cyclically switch the recording mode between "XP (High Quality)", "SP (Standard Play)", and "LP (Extended Play)". When the user wishes to set the "FR (Free Setting)" mode, the program recording/playback apparatus may automatically calculate the bitrate in accordance with the free space remaining on a DVD-RAM.

(28) In the fourth embodiment, the recording mode is found by calculation when recording mode information is not given in IT_TXT (see FIG. 32, steps S463 to S466). In this case, however, the recording mode does not need to be displayed. While step S466 is described as determining the equivalent recording mode, the calculated bitrate may be displayed as it is. If other manufacturers disclose information such as (i) the IDCD value corresponding to a text field in which a recording mode is written, (ii) an ID for each manufacturer, and (iii) the specific notation used for the recording modes, a recording mode recorded by another manufacturer may be read and displayed even when the recording mode information shown in the fourth embodiment is not provided.

(29) The recording modes such as "XP" and "SP" in the fourth embodiment do not need to correspond to particular fixed bitrates, and may instead refer to the control methods used for determining a bitrate when data is recorded with a variable bitrate. When a program is recorded on a recording medium with a variable bitrate that is determined by a control method indicated by a recording mode selected by the user, the recording mode indicating this control method may also be recorded in the management information.

(30) The process for recording a program on a DVD-RAM together with broadcast ID information or recording mode information as the program attributes and the process reading the broadcast ID information or recording mode information from a DVD-RAM and displaying the program attributes were explained in the above embodiments using flowcharts. Computer programs that have a standard computer or an electrical appliance that is capable of executing programs perform these processes may be distributed and sold having been recorded on a recording medium or transmitted via a communications network.

This storage medium may be an IC (integrated circuit card), an optical disc, a flexible disk, or a ROM. Computer programs distributed in this way are used having been installed in a personal computer or an electrical appliance that is capable of executing programs. The personal computer or electrical appliance then executes the computer programs to realize the various functions of the program recording/playback apparatuses described in the above embodiments.

What is claimed is:

1. A recording apparatus comprising:
    reception means for receiving one broadcast signal, out of a plurality of broadcast signals, each broadcast signal being specified using a condition, the condition including a broadcast frequency and at least one other item; and
    recording means for recording
    (1) the broadcast signal received by the reception means, and
    (2) broadcast ID information based on a channel number and other information, the broadcast ID information enabling the received broadcast signal to be identified out of the plurality of broadcast signals,
    on a recording medium in an interrelated manner, wherein
    the recording medium is a rewritable optical disc,
    the recording means records data onto the recording medium in conformity with DVD Video Recording Standard, treats a part of the broadcast signal received by the reception means during a certain period as a program, and records the program and the broadcast ID information on the recording medium,
    the broadcast ID information being recorded into an IT_TXT area in a management information file on the optical disc and is linked to a recording area for the recorded program, and
    the broadcast ID information being recorded in accordance with a data application format that is shown by a data application ID recorded together with the broadcast ID information, in a text field that is appended with an IDCD value "0x90".

2. A playback apparatus for playing back a program recorded on a recording medium,
    the recording medium storing the program and broadcast ID information for the program in an interrelated manner,
    the program being a part of a broadcast signal during a certain period,
    the broadcast ID information (1) identifying the broadcast signal, out of a plurality of broadcast signals able to be specified by a condition including a broadcast frequency and at least one other item, on which the program was received, and (2) being based on the broadcast frequency and other information,
    the playback apparatus comprising:
    reading means for reading the program and at least part of the broadcast ID information related to the program;
    display means for displaying the at least part of the broadcast ID information read by the reading means; and
    playback means for playing back the program read by the reading means, wherein
    the broadcast ID information includes broadcast station ID information that (a) identifies a broadcast station that broadcasts the broadcast signal for the program on the recording medium out of a plurality of broadcast stations that broadcast the plurality of broadcast signals and (b) is specified based on a channel number and the other information,
    the reading means reads the broadcast station ID information from the recording medium,
    the display means displays the broadcast station ID information read by the reading means,
    the recording medium is a rewritable optical disc,
    the program aid management information, including an IT_TXT area that is linked to an area in which the program is recorded on the optical disc, are recorded in conformity with DVD Video Recording Standard,
    the broadcast ID information of the program is recorded in an IT_TXT area in accordance with a data application format that is shown by a data application ID recorded together with the broadcast ID information, in a text field that is appended with an IDCD value "0x90",
    the reading means judges whether the data application ID paired with the broadcast ID information, including the broadcast station ID information, matches a predetermined value, and reads the broadcast station ID information only when the data application ID matches the predetermined value,
    the management information includes a LAST_MNF_ID area, and
    the reading means judges whether a predetermined value is stored at a predetermined position in the LAST_MNF_ID area and suppresses reading of the broadcast station ID information when the predetermined value is not stored.

3. A recording apparatus comprising:
    reception means for receiving a broadcast signal;
    program recording means for recording a program which is a part of the broadcast signal received by the reception means during a certain period, on a recording medium; and
    program attribute recording means for recording program-related information, which is linked to an area in which the program is recorded, with a data construction that is defined by a predetermined standard, and recording attribute information, which shows attributes of the program and is not defined by the predetermined standard, in the program-related information with a data construction that conforms with an application format, the application format being shown by a data application ID that the program attribute recording means records as a pair with the attribute information,
    wherein the program attribute recording means records the data application ID in a last recording apparatus information area, the predetermined standard dictating that a recording apparatus that records data also records apparatus information in the last recording apparatus information area.

4. A playback apparatus for playing back a program that is recorded on a recording medium, the recording medium storing (1) a program (2) program-related information, which
   (a) is linked to an area in which the program is recorded,
   (b) has a data construction that is defined by a predetermined standard, and
   (c) includes attribute information, which shows attributes of the program and is not defined by the predetermined standard, the attribute information having a data construction that conforms with an application format, and the application format being shown by a data application ID that is recorded as a pair with the attribute information, the playback apparatus comprising:

reading means for reading the program and the attribute information:

display means for displaying the attribute information read by the reading means; and playback means for playing back the program read by the reading means, wherein the recording medium includes a last recording apparatus information area into which a recording apparatus that records data must, according to the predetermined standard, also record apparatus information, and the reading means judges whether the data application ID is recorded in the last recording apparatus information area, and only reads the attribute information on judging that the data application ID is recorded.

* * * * *